United States Patent [19]

Tanabe et al.

[11] Patent Number: 5,447,767
[45] Date of Patent: Sep. 5, 1995

[54] OPTICAL RECORDING MEDIUM, PRODUCTION THEREOF, SUBSTRATE FOR OPTICAL RECORDING MEDIUM, AND PRODUCTION THEREOF

[75] Inventors: Hiroshi Tanabe; Hiroyuki Imataki; Mizuho Hiraoka, all of Kawasaki; Kazumi Nagano; Takaya Yano, both of Fujisawa, all of Japan

[73] Assignee: Canon Kabushiki Kaisha, Tokyo, Japan

[21] Appl. No.: 922,778

[22] Filed: Jul. 31, 1992

[30] Foreign Application Priority Data

| Aug. 1, 1991 | [JP] | Japan | 3-193175 |
| Aug. 2, 1991 | [JP] | Japan | 3-194111 |
| Sep. 13, 1991 | [JP] | Japan | 3-234460 |
| Sep. 13, 1991 | [JP] | Japan | 3-234461 |
| Sep. 17, 1991 | [JP] | Japan | 3-236502 |
| Sep. 17, 1991 | [JP] | Japan | 3-236503 |
| Sep. 20, 1991 | [JP] | Japan | 3-241393 |
| Sep. 20, 1991 | [JP] | Japan | 3-241399 |
| Sep. 25, 1991 | [JP] | Japan | 3-271816 |
| Sep. 25, 1991 | [JP] | Japan | 3-271817 |
| Oct. 3, 1991 | [JP] | Japan | 3-281887 |
| Oct. 3, 1991 | [JP] | Japan | 3-281889 |
| Oct. 17, 1991 | [JP] | Japan | 3-269719 |
| Feb. 7, 1992 | [JP] | Japan | 4-055991 |

[51] Int. Cl.[6] .............................................. B32B 3/00
[52] U.S. Cl. .................................. 428/64.4; 428/457; 428/913; 428/357; 428/402; 346/135.1; 430/270; 430/945
[58] Field of Search .................. 428/64, 65, 457, 913, 428/357, 402; 430/270, 495, 945; 346/76 L, 135.1

[56] References Cited

U.S. PATENT DOCUMENTS

| 4,954,380 | 9/1990 | Kanome | 428/64 |
| 4,956,214 | 9/1990 | Imataki | 428/64 |

FOREIGN PATENT DOCUMENTS

| 0258932 | 9/1988 | European Pat. Off. |
| 0340968 | 8/1989 | European Pat. Off. |
| 59-114592 | 6/1984 | Japan |
| 60-214996 | 10/1985 | Japan |
| 61-137243 | 6/1986 | Japan |
| 63-210901 | 9/1988 | Japan |

*Primary Examiner*—Patrick J. Ryan
*Assistant Examiner*—Elizabeth Evans
*Attorney, Agent, or Firm*—Fitzpatrick, Cella, Harper & Scinto

[57] ABSTRACT

An optical recording medium provided with a substrate has a preformat on the surface thereof, a recording layer, and a protecting layer. The substrate has an electrodeposit layer arranged in a pattern corresponding to the preformat on the surface of the substrate.

58 Claims, 16 Drawing Sheets

OPTICAL RECORDING MEDIUM, PRODUCTION THEREOF, SUBSTRATE FOR OPTICAL RECORDING MEDIUM, AND PRODUCTION THEREOF

BACKGROUND OF THE INVENTION

Field of the Invention

The present invention relates to an optical recording medium which records and reproduces information optically, and a process for producing the recording medium.

Related Background Art

Known information-recording media for recording or recording/reproduction include phonograph records, recording tape, compact disks, floppy disks, optical disks, optical cards, and the like. Recently, recording systems employing an optical recording medium for optical recording and reproduction of information have attracted attention, because in these systems the recording medium is not brought into mechanical contact with the recording-reproduction head. Therefore, there is no abrasion of the head and the recording medium, and yet high-density recording and high-speed reproduction are achievable.

In recording and reproduction with such an optical recording medium, tracking needs to be controlled. Conventionally, the tracking is controlled by a tracking track portion formed on a substrate of an optical recording medium for guiding the recording and reproduction of information according to a preformat pattern, thereby permitting servo tracking to be conducted with a laser beam of the recording-reproduction apparatus.

With the preformat system, the precision of tracking control of a laser beam is improved, and quick access is achieved.

The detection of tracking tracks utilized for control of tracking is classified into three types of methods: (1) a phase difference method, in which a groove is formed in a depth d of an odd number times $\lambda/4n$, or $\lambda/8n$ ($\lambda$: a wavelength of light of recording and reproduction), and the tracking track is detected by utilizing the interference effect of light caused by phase difference at the step of the groove; (2) an amplitude method, in which the reflectivity of the tracking track is differentiated from the reflectivity of the recording layer, and the tracking track is detected by difference of the intensity of the reflected light; and (3) a combination of the above phase difference method and the above amplitude method.

Known methods of forming grooves required in the detection methods of the type (1) and the type (3) includes transfer of a preformat pattern of a stamper by injection molding or compression molding; and a so-called a "2P Process" of transferring a preformat pattern of a stamper onto a transparent resin substrate by applying a photocurable resin onto a thermosetting resin or a thermoplastic resin, closely contacting a sramper, and irradiating it uniformly with ultraviolet rays or X ray from the transparent resin side to cure the resin composition.

However, the method of transferring a groove onto a transparent resin substrate by injection molding or compression molding is disadvantageous in that the depth of the groove cannot readily be controlled to be precise and uniform over the entire face of the substrate, and the substrate itself is liable to become birefringent. Therefore, this method has not produced a satisfactory optical recording medium to reproduce uniform preformat signals. On the other hand, the 2P process is inferior in productivity.

Furthermore, the above conventional methods have disadvantages of low productivity, difficulty in maintaining high precision, and the necessity of many molds resulting in high production cost because an original plate has poor durability.

On the other hand, the detection method of type (2) is noticed because of needlessness of the strict control of the groove depth, as required for the phase difference method, in order to meet the demand for an optical recording medium to provide an excellent track traversing signal, which is required as the result of the increase of recording density and increase of speed of recording-reproduction.

Such amplitude type optical recording mediums are exemplified by an optical card disclosed in Japanese Patent Application Laid-Open Nos. 60-214996 and 61-137243. This optical recording medium conducts servo tracking by utilizing the difference of reflectivity of a light-transmissive area, and is prepared, for example, by applying onto a substrate a photosensitive material which is light-transmissive before light irradiation and which becomes light-interceptive after light irradiation, exposing it to light irradiation through a photomask having a preformat pattern, developing it to form a light-interceptive area and a light-transmissive area in the recording layer, and then forming a light-reflecting layer or a light reflective recording layer. However, with a photographic technique, the preformat formed cannot readily be improved simultaneously in both the optical concentration difference between the light-interceptive area and the light-transmissive area and in resolution. For example, more intense irradiation and a longer period of irradiation, which are used for increasing the difference of optical reflectivity, result in lower resolution accuracy of the exposed area, while a shorter developing period for improvement of the resolution of a fine preformat renders the reflectivity difference insufficient, thus giving an unsatisfactory track-traversing signal.

Further in the above optical card, the track-traversing signal is decided definitely by the difference of the reflectivity between the recording layer and the light-intercepting area (low reflectivity area). With this card, an excellent track-traversing signal cannot be obtained, for example, in the case where a low reflectivity material such as an organic dye is used as the recording layer. Therefore, this constitution is not necessarily satisfactory for a broad variety of recording layers which range from dye or pigment coating layers to vacuum-formed layers of a metal such as Te.

SUMMARY OF THE INVENTION

An object of the present invention is to provide an optical recording medium capable of giving a preformat reproduction signal with uniformity and high contrast, and production thereof.

Another object of the present invention is to provide a substrate for an optical recording medium on which preformat can be formed with high precision.

A further object of the present invention is to provide an optical recording medium which is excellent in adhesion of an electrodeposit layer to the substrate, and production thereof.

According to an aspect of the present invention, there is provided an optical recording medium provided with a substrate having a preformat on the surface thereof, a recording layer, and a protecting layer, the substrate comprising an electrodeposit layer arranged in a pattern corresponding to the preformat on the surface of the substrate.

According to another aspect of the present invention, there is provided an optical recording medium, comprising a substrate, an electroconductive layer thereon, and an electrodeposit layer in a pattern corresponding to a preformat provided on the electroconductive layer.

According to still another aspect of the present invention, there is provided an optical recording medium, comprising a substrate, and a recording layer composed of an electrodeposit layer in a pattern corresponding to a preformat provided on the substrate.

According to a further aspect of the present invention, there is provided an optical recording medium, comprising a substrate, and a preformat layer composed of an electrodeposit layer in a pattern corresponding to a preformat and a recording layer composed of another electrodeposit layer provided on a substrate.

According to a further aspect of the present invention, there is provided an optical recording medium, comprising a recording layer composed of an electrodeposit layer provided in a pattern corresponding to a preformat, the recording layer being embedded in a substrate without protruding from a surface of the substrate.

According to a still further aspect of the present invention, there is provided an optical recording medium, comprising a recording layer composed of an electrodeposit layer and a preformat layer composed of another electrodeposit layer provided in a pattern corresponding to a preformat, the the recording layer and the preformat layer being embedded in a substrate without protruding from a surface of the substrate.

According to a still further aspect of the present invention, there is provided an optical recording medium, comprising a substrate, and an electrodeposit layer formed thereon in a pattern corresponding to a preformat.

According to a still further aspect of the present invention, there is provided a process for producing an optical recording medium provided with a substrate having a preformat on the surface thereof, and a recording layer, the substrate comprising an electrodeposit layer arranged in a pattern corresponding to the preformat on the surface of the substrate; the process comprising steps of:

(a) depositing, on an original plate, an electrodeposit layer selectively in a pattern corresponding a preformat, (b) transferring the electrodeposit layer onto a substrate to prepare an optical recording medium substrate, and (c) forming a recording layer on the face of the electrodeposit layer transferred on the substrate.

According to a still further aspect of the present invention, there is provided a process for producing an optical recording medium provided with a substrate having a preformat on the surface thereof, and a recording layer, the substrate comprising an electrodeposit layer arranged in a pattern corresponding to the preformat on the surface of the substrate; the process comprising steps of:

(a) depositing, on an original plate, an electrodeposit layer selectively in a pattern corresponding to a preformat, (b) transferring the electrodeposit layer through a transfer-assisting layer onto a substrate to prepare an optical recording medium substrate, and (c) forming a recording layer on the face of the electrodeposit layer transferred on the substrate.

According to a still further aspect of the present invention, there is provided a process for producing an optical recording medium having a recording layer on an optical recording medium substrate having a preformat on the surface thereof, the process comprising steps of:

(a) depositing on an original plate an electrodeposit layer in a pattern corresponding to the preformat, (b) constructing a casting mold by use of the original plate having the electrodeposit layer, (c) preparing an optical recording medium substrate by filling a liquid resin in the casting mold, curing the liquid resin to form a substrate in integration with the electrodeposit layer, and (d) forming a recording layer on the optical recording medium substrate.

According to a still further aspect of the present invention, there is provided a process for producing an optical recording medium having on a substrate a recording layer composed of an electrodeposit layer arranged in a pattern corresponding to a preformat, the process comprising steps of:

(a) forming on an original plate an electrodeposit layer selectively in a pattern corresponding to a preformat, (b) transferring the electrodeposit layer onto a substrate to form a recording layer.

According to a still further aspect of the present invention, there is provided a process for producing an optical recording medium having on a substrate a recording layer composed of an electrodeposit layer arranged in a pattern corresponding to a preformat, the process comprising steps of:

(a) forming on an original plate an electrodeposit layer selectively in a pattern corresponding to a preformat, (b) transferring the electrodeposit layer through a transfer-assisting layer onto a substrate to form a recording layer.

According to a still further aspect of the present invention, there is provided a process for producing an optical recording medium having on a substrate a recording layer composed of an electrodeposit layer arranged in a pattern corresponding to a preformat, the process comprising steps of:

(a) depositing on an original plate an electrodeposit layer in a pattern corresponding to the preformat, (b) constructing a casting mold by use of the original plate having the electrodeposit layer, and (c) preparing an optical recording medium substrate by filling a liquid resin in the casting mold, curing the liquid resin into a substrate to form an optical recording medium in integration of the substrate with the electrodeposit layer.

According to a still further aspect of the present invention, there is provided a process for producing an optical recording medium having on a substrate a recording layer composed of an electrodeposit layer and a preformat layer composed of another electrodeposit layer which are arranged in a pattern corresponding to a preformat, the process comprising steps of:

(a) electrodepositing on an original plate the recording layer selectively in a pattern corresponding to a preformat, (b) electrodepositing on the original plate the preformat layer selectively in the pattern corresponding to the preformat, and (c) transferring the recording layer and the prefermat layer onto a substrate.

According to a still further aspect of the present invention, there is provided a process for producing an optical recording medium having on a substrate a recording layer composed of an electrodeposit layer and a prefermat layer composed of another electrodeposit layer which are arranged in a pattern corresponding to a prefermat, the process comprising steps of:

(a) electrodepositing on an original plate the recording layer selectively in a pattern corresponding to a prefermat, (b) electrodepositing on the original plate the prefermat layer selectively in the pattern corresponding to the preformat, and (c) transferring the recording layer and the prefermat layer by use of a transfer-assisting layer onto a substrate.

According to a still further aspect of the present invention, there is provided a process for producing an optical recording medium having on a substrate a recording layer composed of an electrodeposit layer and a prefermat layer composed of another electrodeposit layer which are arranged in a pattern corresponding to a preformat, the process comprising steps of:

(a) electrodepositing on an original plate the recording layer selectively in a pattern corresponding to a preformat, (b) electrodepositing on the original plate the prefermat layer selectively in the pattern corresponding to the preformat, and (c) constructing a casting mold by use of the original plate having the recording layer and the preformat layer, and (d) preparing an optical recording medium by filling a liquid resin in the casting mold, curing the liquid resin into a substrate to form an optical recording medium in integration of the substrate with the recording layer and the preformat layer.

DESCRIPTION OF THE PREFERRED EMBODIMENT

The present invention is described in detail by reference to drawings.

Figure 1A:
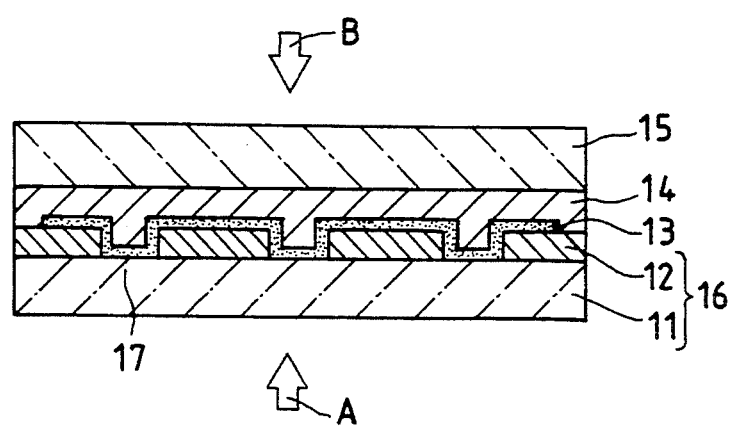
FIGS. 1A and 1B show schematic sectional views of an optical recording medium of the present invention.
Figure 1B:
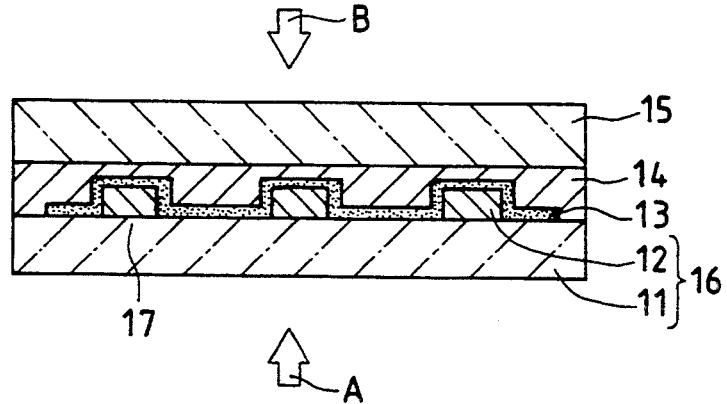

FIGS. 1A and 1B are schematic sectional views of an optical card of a first embodiment in a track-traversing direction.

In FIG. 1A, on a substrate material 11, an electrodeposit layer 12 is provided in a pattern corresponding to a preformat to form a substrate 16 for the optical recording medium. The area which is not covered with the electrodeposit layer 12 constitutes a tracking track 17 of the preformat. Further, on the surface of the preformat formed of the optical recording medium substrate 16, a recording layer 13, adhesion layer 14, and a protecting layer 15 are laminated sequentially.

FIG. 1B is a schematic sectional view of another embodiment of the optical card of the present invention. An electrodeposit layer 12 is arranged selectively on the surface of a substrate material 11 to constitute the optical recording medium substrate 16, and the electrodeposit layer 12 constitutes a tracking track 17.

The thickness of the electrodeposit layer 12 in the present invention depends on the incident direction of the light beam for recording-reproduction. For example, in the case where the light beam is introduced so as to pass through the substrate material 11 (in a direction as shown with the mark A in FIG. 1), the thickness is preferably decided to be equal substantially to the value of odd number times $\lambda/4n_{ED}$, or the value of $\lambda/8n_{ED}$ (where $\lambda$ is the wavelength of the light beam, and $n_{ED}$ is the refractive index of the electrodeposit layer). In the case where the light beam is introduced so as to pass through the protective layer (in a direction as shown with the mark B in FIG. 1), the thickness is preferably decided to be equal substantially to the value of an odd number times $\lambda/4n_{OP}$, or the value of $\lambda/8n_{OP}$ (where $n_{OP}$ is the refractive index of the adhesion layer).

In particular, in the case where the preformat is a tracking track and the tracking track is detected by a push-pull method, the thickness of the electrodeposit layer is preferably $\lambda/8n_{ED}$ or $\lambda/8n_{OP}$.

Thus, the recording layer provided as above on the substrate enables generation of preformat reproduction signals with excellent contrast by utilizing an effect of interference of light.

In this embodiment, an optical recording medium can be obtained which is capable of giving nondefective preformat reproduction signals with high contrast, since the thickness of the electrodeposit layer can be controlled uniformly and precisely by the quantity of electric current.

FIG. 2 illustrates a process for producing an optical recording medium of this embodiment.

Figure 2A:
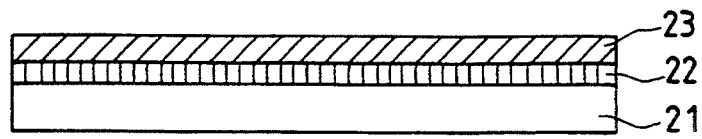
FIGS. 2A to 2F show schematically process for producing an optical recording medium substrate of the present invention.
Figure 2B:
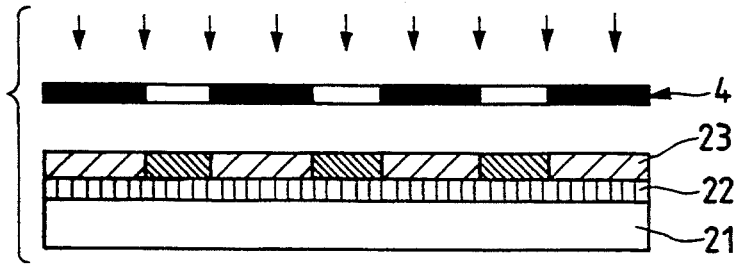

Firstly, an electroconductive layer 22 is formed on an original plate substrate 21, and further thereon a photoresist layer 23 is formed (FIG. 2A).

Figure 2C:
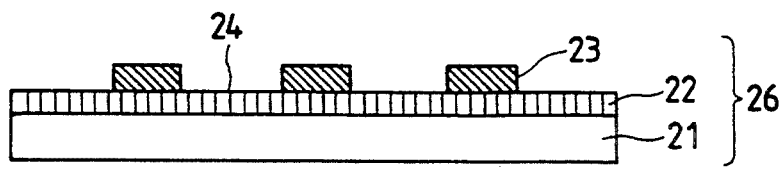

The photoresist layer 23 is exposed to light in a pattern corresponding to a preformat of the optical recording medium (FIG. 2B), and is developed to uncover the electroconductive layer in accordance with the preformat pattern (FIG. 2C).

Figure 2D:
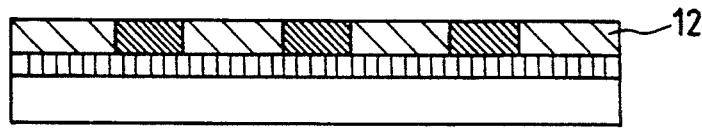
Figure 2E:
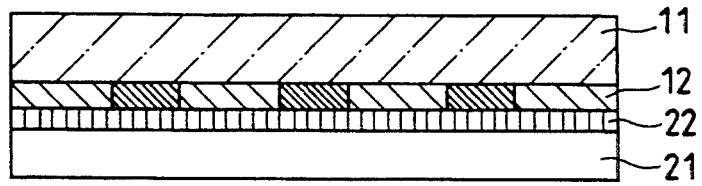
Figure 2F:
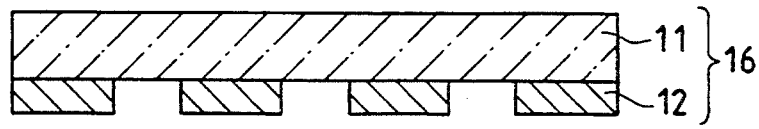

The original plate prepared as shown in FIG. 2C is immersed into an electrodeposition solution, and electrodeposition is allowed to proceed by application of DC voltage by utilizing the electroconductive layer 22 as one electrode to form an electrodeposit layer 12 on the uncovered portion 24 of the electroconductive layer (FIG. 2D). Subsequently, a substrate material 11 is brought to close contact with the electrodeposit layer 12 on the original plate (FIG. 2E), and the electrodeposit layer is transferred onto the substrate material 11. Finally the electrodeposit layer is cured to prepare an optical recording medium substrate 16 (FIG. 2F).

Onto the surface of this substrate for optical recording medium having preformat pattern 17 on the surface, a recording layer, an adhesive layer, and a protecting layer is laminated to provide an optical recording medium as shown in FIG. 1.

Thus, according to the present invention, a pattern corresponding to a fine preformat of a micron order or a submicron order can be formed with high precision, because the electrodeposit layer is formed only on the uncovered portion of the electroconductive layer 22.

The electrodepositable substance for forming the electrodeposit layer of the present invention may be any material which is soluble or dispersible in the electrodeposition solution and is ionizable therein, and is not specially limited. Metals and resins are useful therefor. The resins are preferred which are capable of adhering tightly to a resinous substrate material and having a refractive index close to that of the substrate material, because reflection of light at the interface between the substrate material and the electrodeposit layer is thereby suppressed.

The process for producing the recording medium shown in FIG. 2 of the present invention will be described in more detail.

As described above, an electroconductive layer 22 is formed firstly on an original plate substrate 21, and then a photoresist layer 23 is formed on the electroconductive layer 22.

Useful materials for the original plate substrate includes plastics such as polymethyl methacrylate, polycarbonate, polyethylene, polypropylene, polystyrene, polyvinyl chloride, cellulose triacetate, polyvinyl fluoride, polysulfone, polyether sulfone, polyetherimide, polymethylpentene, and the like; ceramics, and metals.

The electroconductive layer 22 to be utilized as an electrode in the electrodeposition may be made from any material which is capable of imparting electroconductivity to the surface of the original plate substrate. The example of the material include aluminum, copper, nickel, etc. and transparent electroconductive films such as of tin oxide and indium oxide. The electroconductive layer 22 can be formed by a method such as spraying, sputtering, vapor deposition, and lamination.

If a metal is used as the original plate substrate 21, the formation of the electroconductive layer may be omitted.

Subsequently, a photoresist layer is formed on the electroconductive layer.

The material useful for forming the photoresist layer includes photodecomposition type photosensitive resins containing a diazonium salt or an azide compound, photopolymerizable type photosensitive resins of cinnamoyl type, diazo type, azide type, acryloyl type, and the like; and other materials such as albumin, casein, glue, polyvinyl alcohol, and bichromate salt photosensitive solution, e.g., shellac.

Such photoresist may be formed on the above electroconductive layer by a known coating method such as a sprinkling method, a wheeler method, a spinner method, an immersion method, a roller coating method, a spraying method, an electrostatic spraying method, and so forth. If the photoresist is a dry film, the photoresist layer may be formed by hot pressing. The thickness of the photoresist layer is several microns.

Then the photoresist layer 23 is exposed to a pattern of light corresponding to a preformat pattern (FIG. 2B), and is developed (FIG. 2C).

The exposure to the pattern of light corresponding to a preformat pattern is conveniently conducted by irradiation of a UV ray or an electron beam through a mask 4 such as a chrome mask used for semiconductors, a photographic film, a metal mask, a slit, and so forth. Otherwise, the exposure is conducted by irradiation of an electron beam through a metal mask, or by scanning of electron beam in a pattern without using a mask.

In the development step, a soluble portion formed by exposure is eliminated by use of a solvent, namely by use of a developer. By the development, portions of the photoresist layer are removed in a pattern to form a preformat pattern, thereby uncovered portions 25 being formed, and the original plate 26 being prepared.

The term "preformat" in the present invention means a pattern of information formed preliminarily on an optical recording medium substrate. The examples therefor include tracking track in a spiral, concentric, or parallel state having a width of from 0.5 μm to 5 μm and a pitch of 1.0 μm to 15 μm for an optical disk or an optical card, and prepits such as address pits.

Figure 3:
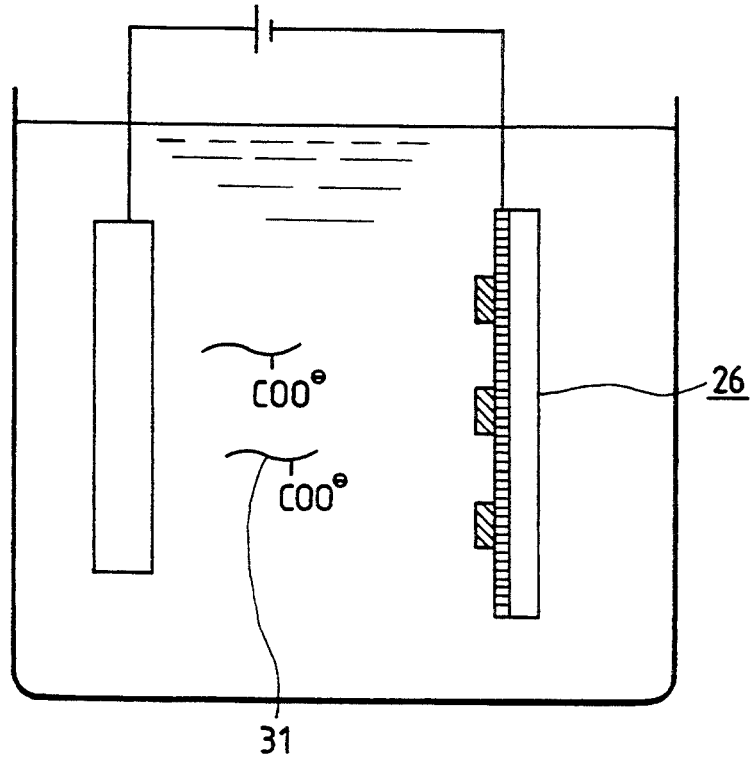
FIG. 3 shows an electrodeposition step

Then on the original plate having the uncovered portion of the electroconductive layer corresponding to the preformat, the electroconductive layer is deposited at the uncovered portion by electrodeposition in an electrodeposition solution. In this process, as shown in FIG. 3, the electroconductive layer is used as one electrode, and ionized and electrodepositable substance 31 migrates toward this electrode, insolubilizing and depositing on the electroconductive surface by reaction with proton formed by electrolysis of water on the electrode to form the electrodeposit layer.

The electrodepositable material in the present invention includes conventional resins for electrodeposition coating such as those disclosed in Japanese Patent Application Laid-Open Nos. 59-114592 and 63-210901. For example, in anion type electrodeposition, preferred are those resins and prepolymers which have an anionic functional group like a carboxyl group originally or introduced for giving a negative charge and hydrophilicity required for deposition of the resin. On the other hand, in cation type electrodeposition, preferred are those resins and prepolymers which have a cationic functional group like an amino group inherently or such a group later introduced for imparting a positive charge and hydrophilicity.

Specific examples include acrylic resins, alkyd resins, epoxy resins, polyester resins, polyamide resins, acrylmelamine resins, prepolymers of the above polymers, curable resins cured by reaction of double bonds in the molecule like polybutadiene and α,β-ethylenic unsaturated compounds, which have the above anionic or cationic functional functional group.

The above electrodepositable materials may be setting at ordinary temperature, thermosetting, or radiation-energy curing cause by UV ray or electron ray. The resin which is not self-curing is preferably used in combination with a melamine resin, a blocked polyisocyanate compound, or the like as a curing agent.

In the case where the recording light or reproducing light is introduced through the substrate, the refractive index of the electrodeposit layer is desired to be less than or approximately equal to that of the substrate for receiving the electrodeposit layer in order to minimize the reflection of light at the interface between the deposition layer-receiving substrate and the electrodeposit layer. In consideration of the fact that the refractive indexes of polycarbonate resin, polymethyl methacrylate resin and glass frequently employed as the substrate for optical recording have a refractive index respectively of 1.58, 1.48, and 1.53, a resin employed for electrodeposition has preferably a refractive index in the range of from about 1.48 to about 1.58.

A substrate of an optical recording medium is prepared by bringing a substrate material 11 into close contact with the original plate having an electrodeposit layer (FIG. 2E), transferring the electrodeposit layer onto the substate material, and curing the electrodeposit layer on the substrate material to obtain a polymer film arranged in pattern (FIG. 2F).

The transfer may be conducted by use of a rubber-coated roller to press the surface of the electrodeposit layer to the surface of the substrate.

In the process of transferring the electrodeposit layer of the original plate to the surface of the substrate material 11 in the present invention, a transfer-assisting layer 41 may be preliminarily formed on the surface of the substrate material 11 to transfer the electrodeposit layer onto the substrate material 11 by aid of the transfer-assisting layer 41 as shown in FIG. 4.

The transfer-assisting layer 41 serves to transfer the electrodeposit layer formed on the electrode of the original plate surely onto the substrate and to retain the deposition layer on the substrate.

The transfer-assisting layer may be an adhesion layer containing an adhesive or a sticking agent, or made of any other material which has the above-mentioned functions.

Specific examples of the adhesive layer as the transfer-assisting layer includes containing a photosensitive adhesive, a heat-sensitive adhesive, a pressure-sensitive adhesive, a thermoserring adhesive, a thermoplastic adhesive, a synthetic rubber, natural rubber, gelatin, paste, or the like.

The adhesive layer as the transfer-assisting layer may be in any form including a liquid, an emulsion, a sheet, a microcapsule, and the like. Among them, the liquid form of adhesives are classified into those which lose fluidity and solidify after application and those which do not solidify on use. The latter ones are called sticking agents.

The photosensitive adhesives for the adhesive or the sticking agent for the transfer-assisting layer include UV-curable adhesives which are cured on irradiation of UV light. Among them, preferred are acrylic type UV-curable adhesives, polyester type UV-curable adhesives, and epoxy type UV-curable adhesives.

The pressure-sensitive adhesives therefor include thermoplastic rubber type hot-melt adhesives.

Microcapsules may be used as the photosensitive, heat-sensitive, or pressure-sensitive adhesive. In this case, the wall of the microcapsule is made of a material which is capable of being activated by light, heat, or pressure, and the microcapsule encloses a curing agent, a crosslinking agent, a solvent, a plasticizer, or the like, whereby the capsule comes to have an adhesive function by action of light, heat, or pressure.

As the thermosetting adhesive, preferred are epoxy resin type adhesives which are crosslinked by heat, and phenol resins, resorcinol resins, urea resins, melamine resins and the like which are crosslinked by heat and pressure.

As the thermoplastic adhesive, preferred are polymers and copolymers of vinyl monomers such as vinyl acetate, acrylate esters, vinyl chloride, ethylene, acrylic acid, acrylamide, and styrene; and epoxy resins which are cured by heat and solidified by cooling.

Figure 4A:
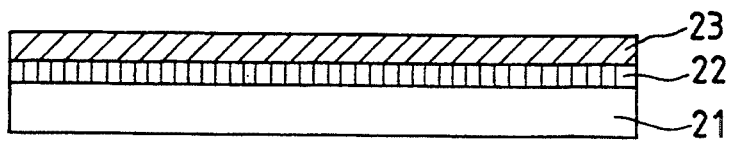
FIGS. 4A to 4F show schematically another process for producing an optical recording medium substrate of the present invention.
Figure 4B:
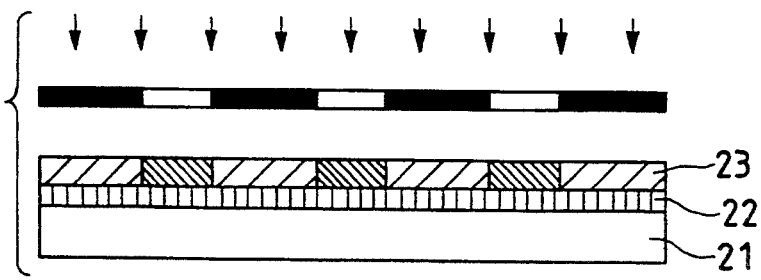
Figure 4C:
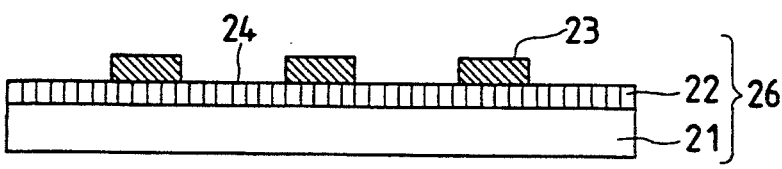
Figure 4D:
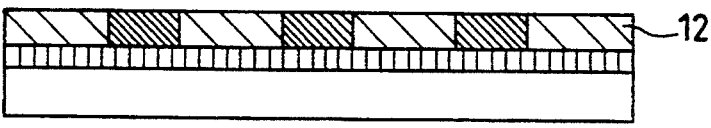
Figure 4E:
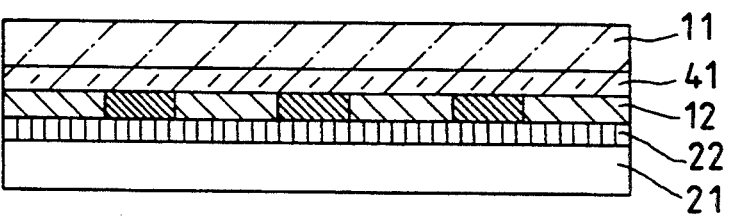
Figure 4F:
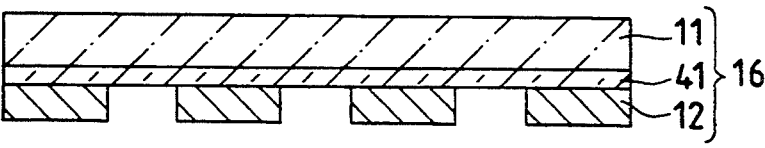

In the transferring process, the transfer-assisting layer 41 on the substrate material 11 is brought into contact with the electrodeposit layer on the original plate. If the transfer-assisting layer is a photosensitive adhesive, light is projected onto the layer in this state. Then the substrate material is separated from the original plate (FIG. 4F). Thereby the electrodeposit layer is provided on the substrate material through the transfer-assisting layer 41.

The transfer-assisting layer may be provided by coating on the substrate material. If the transfer-assisting layer is an adhesive in a sheet form, the sheet is put between the substrate material and the original plate having the electrodeposit layer to conduct transferring.

In the cases where the transfer-assisting layer is a heat-sensitive adhesive, a pressure sensitive adhesive, a heat-curable adhesive, or a thermoserring adhesive, the original plate and the substrate material are put together with the electrodeposit layer and the transfer-assisting layer held inside, and are heated, pressed, or press-heated, and than separated. In the case where the transfer-assisting layer is a sticking agent, the original plate and the substrate material put together are pressed, and then separated.

In the next step, the electrodeposit layer transferred onto the substrate material 11 in the above process is cured as mentioned above. If the electrodeposit layer is made of a photopolymerizable resin, it may separated from the substrate plate after light irradiation. The separated layer may be irradiated further to cure the layer more. If the electrodeposit layer is composed of a heat-curable resin, it may be cured either before or after the separation of the substrate. If the electrodeposit layer is composed of a pressure-curable it may be compressed with a press machine or a laminatot before separation of the substrate material.

The recording layer is formed on the transferred electrodeposit layer on the optical recording medium substrate.

The material for the recording layer includes organic dyes such as polymethine dyes, cyanine dyes, naphthoquinone dyes, and phthalocyanine dyes; metals and semimetals as inorganic materials such as magnetooptical recording films, e.g., low-melting substances like Bi, Sn, and Te, and composite compounds having As, Se, S, O, C, etc. bonded thereto, and Te-$TeO_2$, Tb-Fe-Co for recording according to phase difference; and silver halide for recording according to optical density change.

The organic dyes employed in the recording layer may be combinedly used with a stabilizer for the dyes. The stabilizer includes metal chelate compounds having a center atom like Zn, Cu, Ni, Cr, Co, Mo, Pd, and Zr, and polydentate ligand such as tetradentate ligands, e.g., $N_4$, $N_2O_2$, $N_2S_2$, $S_4$, $O_2S_2$, and $O_4$; other tetradentate type compounds having a tridentate ligand, e.g., $N_2O$, $NO_2$, $NS_2$, $O_3$, and NOS combined with another ligand such as bidentate ligands, e.g., water, ammonia, halogen, phosphine, amine, alumine, olefin, etc.; combination of two bidentate ligands, e.g., $N_2$, NO, $O_2$, $S_2$, etc.; biscyclopentadienyl ligand; cyclopentadienyl-tropyrinium; and combinations thereof. The stabilizer further includes aromatic amines and diamines, nitrogen-containing aromatic compounds and onium salts thereof such as aminium salts, diimmonium salts, pyridium salts, imidazolium salt, monolinium salts, salts of aromatic oxygen containing compounds, e.g., pyrylium salts, and the like.

The stabilizer is suitably selected in consideration of its compatibility with the dye and the coating solvent.

A plurality of stabilizers may be combinedly used. The ratio of the combination is suitably decided depending on the coating application property of the dye composition, stability of the coating film, optical properties (reflectivity and transmissivity), recording sensitivity, and so forth.

The amount of the stabilizer to be added may be in a range of from several % to 50% by weight based on the dye. A smaller amount of addition will not give a sufficient stabilizing effect, while excessively larger amount of addition causes reduction of the sensitivity because of the decrease of the absolute amount of the heat-mode-recording material. Therefore, the amount of addition is preferably in the range of from 10 to 30% by weight, particularly preferably in an amount of about 20% by weight.

The recording layer may be prepared by a wet coating such as roll coating, wire bar coating, air knife coating, calender coating, dip coating, and spray coating, or by a dry coating such as vapor deposition, and sputtering.

Subsequently, a protecting layer is laminated through an adhesion layer on the optical recording medium substrate having the recording layer depending on the practical use.

The adhesive used for the adhesion layer in the present invention, includes conventionally employed adhesives such as polymers and copolymers of vinyl acetate, acrylate esters, vinyl chloride, ethylene, acrylic acid, acrylamide or the like; thermoplastic adhesives, e.g., polyamides, polyesters, epoxy resins, etc.; adhesivies like amino resins (urea resins and melamine resins), phenol resins, epoxy resins, urethane resins, thermoserring vinyl resins; and rubber type adhesives e.g., natural rubber, nitrile rubber, chlorinated rubber, silicone rubber, etc. In particular, hot-melt type adhesives are applied by a dry process, and are preferable in continuous mass production. UV-curable type adhesives are also suitable in view of the improvement in mass production.

The adhesion is conducted by lamination, hot-pressing, radiation curing, or the like method depending on the kind of the adhesive.

The substrate material and the protecting layer may be of any material which has high light transmissivity at the side of introduction of recording and/or reproduction light. The material includes glass and plastics: the plastics including acrylic resins, polyester resins, polycarbonate resins, vinyl resins, polysulfone resins, polyimide resins, polyacetal resins, polyolefin resins, polyamide resins, and cellulose derivatives.

In the case where the substrate material or the protective layer need not be light-transmissive, materials capable of protecting mechanically and chemically the recording layer are preferred, including plastics, glass, metals, ceramics, papers, and composits thereof.

In the case where signals are detected by utilizing transmitted light, it is preferred that the substrate plate, the protecting layer, and the adhesion layer after adhesion are transparent to the recording/reproducing light.

In the above-described method, the original plate after the transfer of an electrodeposit layer 12 onto a substrate material can be used repeatedly, thus mass production of optical recording medium is feasible with high performance at low cost.

Another method of production of an optical recording medium of the present invention is described by reference to FIG. 5B.

Figure 5A:
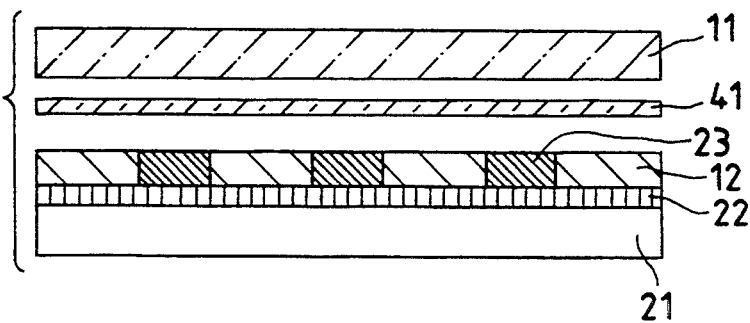
FIGS. 5A and 5B show schematically still another process for producing an optical recording medium substrate of the present invention.
Figure 5B:
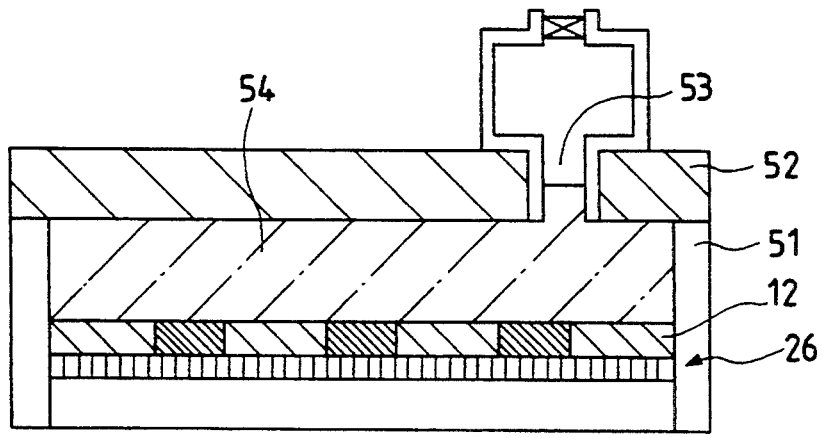

In this method, a casting mold unit shown in FIG. 5B is prepared by use of the original plate 26 having the electrodeposit layer 12 provided through the steps shown in FIGS. 2A to 2D. Into the unit, a liquid transparent resin is filled, and the resin is solidified or cured. Then the solidified or cured resin is released from the unit, thus an optical recording medium substrate being formed which has the preformat of the electrodeposit layer 12 on the simultaneously formed substrate material 11. In FIG. B, the numeral 51 indicates a spacer; 52, a metal plate or a glass plate having a mirror-finished face; 53, an inlet for filling the liquid resin; and 54, a liquid resin filled in the unit.

In this embodiment, the resin for forming the substrate material of the optical recording medium may be any resin which is liquid before curing or polymerization. The examples of the resin include epoxy resins, methyl methacrylate resins, diethylene glycol resins, bisallyl carbonate resins, unsaturated polyester resins, and any other resins which are useful as a substrate of an information-recording medium.

The substrate material is desired to be curable in the same curing method as the resin material of the electrodeposit layer. In other words, if the electrodeposit layer is made from a thermoserring resin, a thermosetting material is used for the substrate material. Thereby the formation of the substrate material 11, curing of the electrodeposit layer 12, and transfer of the electrodeposit layer 12 onto the substrate material 11 are practicable surely and efficiently.

In the cast molding process, the original plate 26 having been used can be used repeatedly, which allows the efficient production of optical recording medium substrate plate at low cost.

On to the optical recording medium substrate plate, a recording layer, and a protecting layer are suitably laminated to produce an optical recording medium as illustrated in FIGS. 1A and 1B.

A still another process for producing an optical recording medium of the present invention is described by reference to FIG. 6.

Figure 6A:
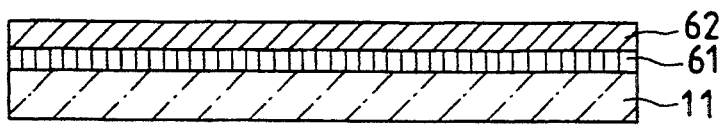
FIGS. 6A to 6F show schematically still another process for producing an optical recording medium substrate of the present invention.
Figure 6B:
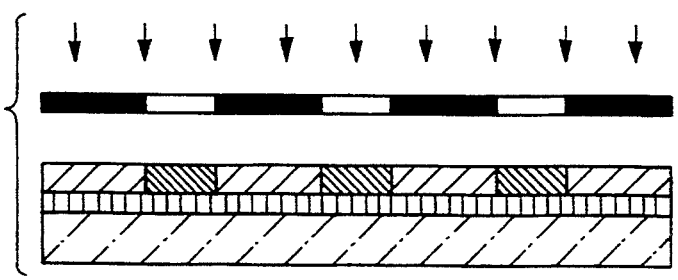
Figure 6C:
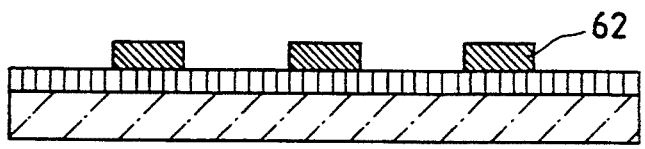
Figure 6D:
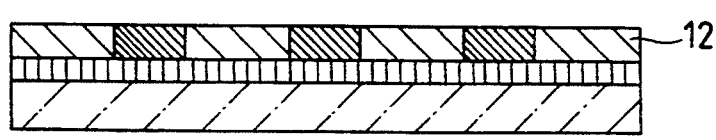
Figure 6E:
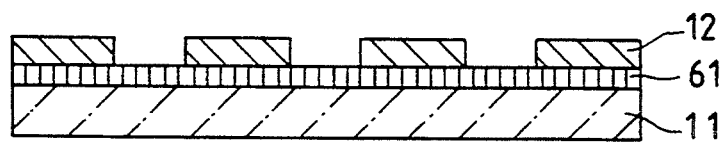
Figure 6F:
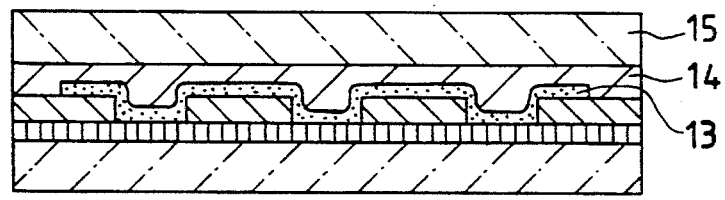

On a substrate material 11, a transparent electrode 61 is formed which has high transmissivity to the light for recording and reproduction such as tin oxide and indium oxide (FIG. 6A). On the transparent electrode, an insulating substance such as a photoresist 62 is applied, and is exposed to light irradiation in a pattern corresponding to the preformat pattern. The electrode is uncovered in the pattern by development (FIGS. 6B and 6C). Then an electrodeposit layer 12 is deposited by electrodeposition by using the transparent electrode as one of the electrodes, and the photoresist is removed off (FIGS. 6D and 6E). Further thereon, a recording layer 13, an adhesion layer 14, and a protecting layer 15 are laminated (FIG. 6F) to obtain the optical recording medium of the present invention.

In the case where a transparent electrode is employed, if the resin for the electrodeposit layer is a cationic resin, the transparent resin has to be used as the cathode in electrodeposition, which causes reduction reaction at the transparent electrode made of oxide, resulting damage of the transparent electrode. Therefore, the resin for the electrodeposit layer is preferably composed of an anionic resin.

A second embodiment of the optical recording medium of the present invention is described below.

The second embodiment of the optical recording medium of the present invention is the one having a preformat pattern on a surface of a substrate and further thereon a recording layer, wherein the preformat comprises an electrodeposit layer, and the electrodeposit layer exhibits a reflectivity different from the prescribed reflectivity of the recording medium toward an information recording beam or an information reproducing beam introduced to the optical recording medium.

FIG. 9 shows a schematic sectional view in a track-traversing direction of the optical card of the second embodiment of the present invention.

In FIG. 9, a substrate material 91 together with a preformat 97 thereon composed of an electrodeposit layer 92 constitute an optical recording medium substrate 96. On the surface of the optical recording medium substrate having formed preformat, a recording layer 93, an adhesion layer 94, and a protecting substrate plate 95 are laminated sequentially.

Figure 9A:
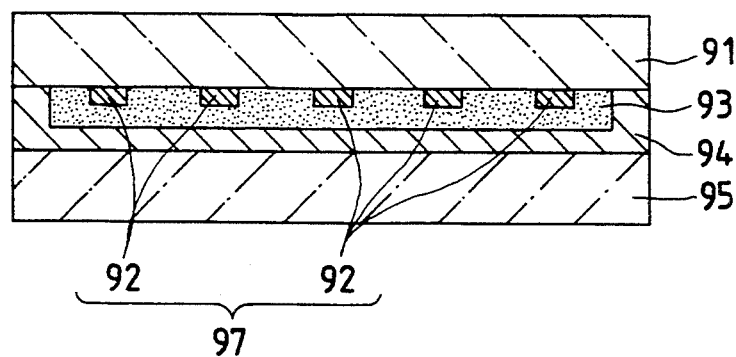
FIGS. 9A and 9B show schematic sectional views of still another optical recording medium of the present invention.
Figure 9B:
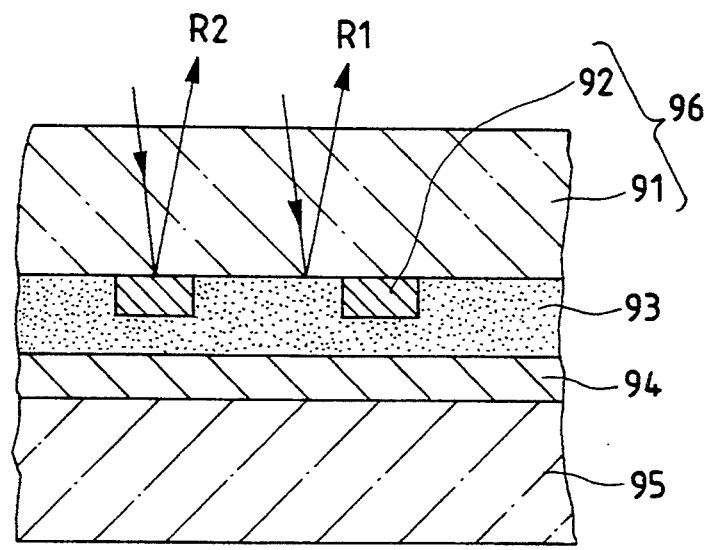
Figure 10A:
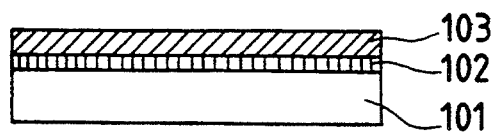
FIGS. 10A to 10F show schematically still another process for producing an optical recording medium substrate of the present invention.
Figure 10B:
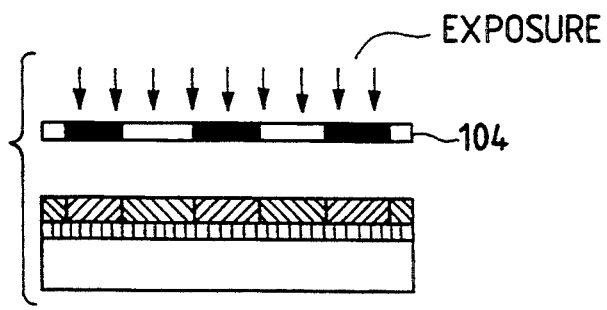
Figure 10C:
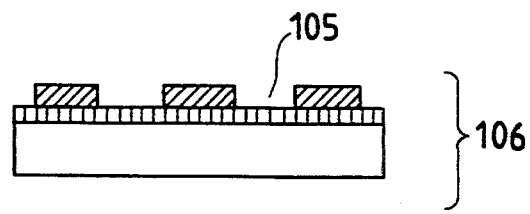
Figure 10D:
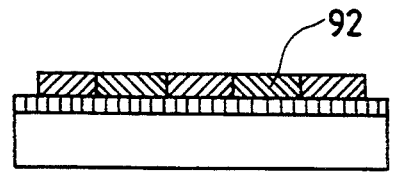
Figure 10E:
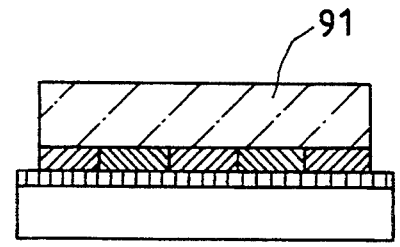
Figure 10F:
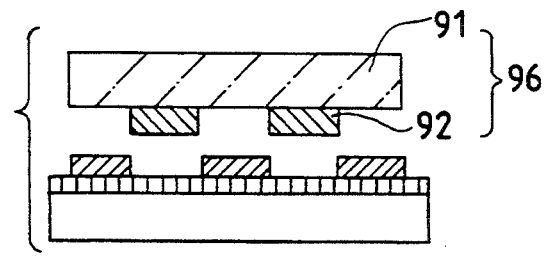

The electrodeposit layer 92 forming the preformat 97 is has a reflectivity $R_2$ different from the reflectivity $R_1$ of the recording layer 93 toward the information recording beam or the information reproducing beam introduced to the optical card as shown in FIG. 9B when $R_1$ is the prescribed reflectivity of the recording layer 93 to the light beam for reproducing information and $R_2$ is the reflectivity of the electrodeposit layer 92 which is formed preformat.

FIG. 10 shows the process for producing the optical recording medium of the present invention. Firstly, an electroconductive layer 102 is formed on an original plate substrate 101, and further on the electroconductive layer 102, a photoresist layer 103 is formed (FIG. 10A). The photoresist layer 103 is exposed to light irradiation through a mask 104 in a pattern corresponding to the preformat of the optical recording medium (FIG. 10B). The irradiated layer is developed to uncover the electroconductive layer in accordance with the preformat (105, FIG. 10C). The resulting original plate 106 is immersed in a electrodeposition solution, and electrodeposition is conducted by using the electroconductive layer 102 as one of the electrodes to deposit an electrodeposit layer 92 on the electroconductive layer (FIG. 10D). Then a substrate material 91 is brought into close contact with the electrodeposit layer 92 on the original plate (FIG. 10E), thereby the electrodeposit layer is transferred onto the substrate material 91. Finally the resin in the electrodeposit layer is crosslinked to cure the electrodeposit layer, thus an optical recording medium substrate 96 is obtained (FIG. 10F).

Subsequently, a recording layer, an adhesion layer, and a protecting layer are laminated on the surface of the optical recording medium substrate having a preformat 97, thus an optical recording medium as shown in FIG. 9A.

According to this embodiment, a fine preformat is precisely formed in a micron order or a submicron order since the electrodeposit layer is formed only at the irradiated area of the electroconductive layer 102 and film thickness is controllable by quantity of the electric current in the electrodeposition.

Furthermore, reflectivity of the electrodeposit layer can be adjusted by selecting suitably the material to be deposited on the electroconductive layer as the depositable substance or a co-depositable substance. Thus an optical recording medium can be obtained which gives excellent track-traversing signal.

In the present invention, the reflectivity $R_2$ of the electrodeposit layer 92 and the reflectivity $R_1$ of the recording layer 93 are considered to be substantially different if the values of $R_1$ and $R_2$ satisfy the relation below.

$$(R_1 - R_2)/R_1 \geq 0.3 \text{ (if } R_1 \wedge R_2\text{)},$$

or $$(R_2 - R_1)/R_2 \geq 0.3 \text{ (if } R_2 \wedge R_1\text{)}$$

preferably, $$(R_1 - R_2)/R_1 \geq = 0.35 \text{ (if } R_1 \wedge R_2\text{)},$$

or $(R_2-R_1)/R_2 \geq 0.35$ (if $R_2 \wedge R_1$)

When the above relation is satisfied, track servo is conducted with high precision.

The electrodepositing substance for forming the electrodeposit layer of this embodiment is not specially limited, but may be any substance which is soluble or dispersible in the electrodeposition solution and is ionizable in the electrodeposition solution. Metals and resins are useful therefor. In particular, resins are preferred because of the ease of controlling the reflectivity of the electrodeposit layer according to the kind of the recording layer.

Conventional resins for electrodeposition paints are useful as the electrodepositing resin in the present invention. For the anionic electrodeposition paint, preferred are resins and prepolymers which have or modified to have an anionic functional group like a carboxyl group for imparting an negative charge and hydrophilicity for depositing the resin. For the cationic electrodeposition paint, preferred are resins and prepolymers which have, or modified to have, a cationic functional group like an amino group for imparting an positive charge and hydrophilicity for depositing the resin.

Specifically, the resins include those having the above-mentioned anionic functional group or a cationic group such as acrylic resins, epoxy resins, polyester resins, polyamide resins, acryl-melamine resins, and alkyd resins, and prepolymers thereof; and further include those which come to be cured by reaction of double bond in the molecule such as polybutadiene type resin and $\alpha,\beta$-unsaturated ethylenic compounds.

The electrodepositing resins may be coldcurable, heat-curable, radiation-curable (UV- or electron-beam-curable). The resins which are not self-crosslinking may be used by mixing with a melamine resin, a blocked polyisocyanate compound, or the like.

For controlling the reflectivity of the preformat, for example, the aforementioned resin is dispersed with a powdery substance having a high reflectivity in an electrodeposition solution. Electrodeposition is conducted in this dispersion to deposit the resin together with the high-reflectivity particles onto the electroconductive resin (hereinafter referred to "co-deposition") to obtain an electrodeposit layer having a high reflectivity. This electrodeposit layer is transferred onto a substrate material 91 to prepare an optical recording medium substrate having a preformat of high reflectivity. In such constitution, the recording layer has preferably a reflectivity of 5 to 40%, more preferably 10 to 25%, to the light of the wavelength of 780 to 830 nm.

On the contrary, an electrodeposit layer having a low reflectivity is obtained by conducting electrodeposition in a dispersion of a low-reflectivity particles, which has high absorbance to recording- or reproducing-beam, with the above resin in an electrodeposition solution to co-deposit them on the electroconductive layer. This electrodeposit layer is transferred onto a substrate material 91 to prepare an optical recording medium substrate having a preformat of low reflectivity.

In this invention, the substance having a high reflectivity which can be co-deposited onto the electrodeposit layer is not limited, but may be any substance which is capable of imparting a reflectivity higher than that of the recording layer to the electrodeposit layer. For example, when the recording layer is made from an organic material, preferred are highly reflective metal or alloy particles such as of Al, Cr, Ni, Ag, and Au. The size of the particles are to be within the range such that the particles are deposited uniformly on the electrodeposition and the precision of the preformat is not impaired. In view of the dispersibility in the electrodeposition solution and uniformity in the electrodeposit layer, the average particle diameter is preferably in the range of from 0.01 to 0.5 $\mu$m. Particularly preferred are ultrafine metal particles which has an average particle diameter of from 0.01 to 0.1 $\mu$m obtained by hot plasma evaporation because secondly coagulation is not caused in a solution.

The substance having a high reflectivity may be a nonmetallic powder coated at the surface by a metal (hereinafter referred to as "metallized powder"). Such powder may be of any material which is capable of imparting to the electrodeposit layer a reflectivity different from that of the recording layer, and is not specially limited. The powder includes powdery ceramic plated with a metal (metallized ceramic powder) and powdery natural mica plated with a metal (metallized natural mica), powdery resins coated with a metal, and mixtures thereof, including powdery ceramic or powdery natural mica coated at the surface with Cu, Ni, Ag, Au, Sn, or the like. The metallization of the surface of the powdery material is preferably conducted by use of Cu, Ag, or Ni in view of the cost, and suitably according to non-electrolytic plating.

The powdery ceramic or the powdery natural mica preferably has an average diameter in a range of from 0.05 to 0.5 $\mu$m, more preferably from 0.2 to 0.3 $\mu$m, in consideration of the surface area contributing the surface activity, the dispersibility in a electrodeposition paint, and formation of a fine preformat with high precision.

The ceramics in the present invention include aluminum oxide, titanium nitride, manganese nitride, tungsten nitride, tungsten carbide, lanthanum nitride, aluminum silicate, molybdenum disulfide, titanium oxide, and silicic acid. The natural mica includes frogovite mica, sericite mica, and muscovite mica. Such metallized powder, which has a specific gravity lower than that of metal, improves more effectively the reflectivity than the metal powder, compared at the same content by weight.

Surface-metallized resin powder may also be used as the metallized nonmetallic powder. Such powder can be prepared by forming a reflective layer of metal, e.g., copper, silver, gold, and nickel on a surface of the powder of a resin such as a fluororesin, a polyethylene resin, an acrylic resin, a polystyrene resin, a nylon resin, etc. in the same manner as in the case of ceramics. The resin powder also has preferably an average diameter of from about 0.05 to about 0.5 $\mu$m.

The nonmetallic powder coated with a metal is preferred since the handling thereof is easier than the aforementioned metallic powder. In particular, the metallized ceramic powder and the metallized natural mica powder is advantageous in that the powder enables crosslinking of the resin by a lower energy in the process of crosslinking the resin in the electrodeposit layer.

The reason is not clear why the electrodeposit layer having the metallized ceramic powder or the metallized natural mica powder or a mixture thereof co-deposited causes crosslinking with a lower energy. However, it is assumed that the surface of the powder is kept active to a certain extent by interaction between the surface of ceramic or natural mica and the plated metal, being different from the readily oxidizable metal powder, whereby the active surface serves as a crosslinking site to accelerate the crosslinking of the resin in the electrodeposit layer.

The thickness of the metal plating on the surface of the nonmetal powder is preferably in a range of from 0.03 to 0.2 μm, preferably from 0.05 to 0.1 μm to achieve the high reflectivity of the surface and acceleration of crosslinking of the resin.

The material having low reflectivity to be co-deposited in the electrodeposit layer may be any material which is capable of imparting to the electrodeposit layer a reflectivity lower than that of the recording medium, and is not specially limited. In the case where the recording layer comprises a metal, an alloy, or a high-reflective organic dye, the substance may be selected from usual dyes and pigment that have a reflectivity lower than the recording layer. In particular, for the purpose of obtaining large difference of reflectivity to conduct servo control with higher precision, a material having a reflectivity of nearly zero such as carbon black is highly desirable.

This constitution is suitably employed when the recording layer has the reflectivity in a range of from 10 to 60%, more preferably from 15 to 60% to the light of the wavelength of 780 to 830 nm. The particle of low reflectivity preferably has an average particle diameter in a range of from 0.01 to 0.5 μm.

The material having a high reflectivity or a low reflectivity is contained (amount of co-deposition) in the electrodeposit layer in such a content that the material causes substantial difference of reflectivity from the recording layer but does not impair the adherence of the electrodeposit layer to the substrate material. Specifically, the content is preferably in a range of from 2 to 75%, more preferably from 5 to 40%, still more preferably from 8 to 25% by weight in a cured electrodeposit layer. When a metallized powder is employed as the high-reflective material, the content is preferably in a range of from 1 to 40%, more preferably from 5 to 30% by weight in consideration of the reflectivity and the properties of the coating film.

The electroconductive particle can be identified by an X-ray microanalyzer, and the amount of co-deposition can be measured by thermogravimetry.

Another method of controlling the reflectivity of the electrodeposit layer in this invention is to disperse light-scattering particles in the electrodeposit layer. In this method, the light-scattering particulate material to be co-deposited with an electrodepositing resin onto the electrode of an original plate is preferably selected from the materials which scatter and/or irregularly reflect light at the interface with the deposited resin to lower the reflectivity of the electrodeposit layer 92. The difference of the reflectivity from that of the electrodeposited resin is preferably not less than 0.05, more preferably not less than 0.2. The specific examples include glass beads, lead-containing glass beads, particulate diamond, hollow glass beads, and the like. The hollow glass beads are particularly preferred since the beads has interfaces between the resin and the particle and between the glass and air, thereby causing greater scattering and irregular reflection.

The particulate material is suitably selected from those which give reflectivity difference from the electrodeposit resin and neither dissolve in nor react with the electrodeposited resin or paint. The average particle diameter of the above light-scattering particles is preferably in a range of from 0.05 to 0.5 μm, more preferably from 0.05 to 0.2 μm in order not to impair the precision of the preformat.

The content (amount of co-deposition) of the light-scattering particles in the electrodeposit layer 92 is preferably in a range of form 5 to 50%, more preferably from 10 to 30%, still more preferably from 15 to 25% by weight in the cured electrodeposit layer in consideration of adherence of the electrodeposition layer to the substrate material and flexibility of the electrodeposit layer required for flexible optical recording medium such as an optical card.

The co-deposited particles can be identified by an X-ray microanalyzer, and the amount of the co-deposition can be measured by thermogravimetry.

This constitution is suitably employed when the recording layer has the reflectivity in a range of from 10 to 60%, more preferably from 15 to 40% to the light of the wavelength of 780 to 830 nm.

The average particle diameter of the particles incorporated in the electrodeposit layer in the present invention can be measured by a laser-diffraction/scattering type of a particle size distribution analyzer (trade name: LA-700, made by Horiba Seisakusho K.K.).

Still another method of controlling the reflectivity of the electrodeposit layer in this embodiment is to make the electrodeposit layer porous for providing light-scattering property of the layer. The porosity of the electrodeposit layer can be attained by mixing to an electrodeposition paint a foaming compound which foams on light irradiation and/or heating such as zinc chloride double salts with p-diethylaminobenzenediazonium chloride, p-dimethylaminobenzenediazonium chloride, etc., azodicarbonamide, and dinitropentamethylenetetramine, then depositing it together with the electrodeposition resin onto an electrode, and then foaming the foaming compound by heating or light-irradiation of the electrodeposit layer at the time of transferring to a substrate material and/or after transferring to a substrate material. In this case, the pores may be closed or opened. The ratio of the foamed cells, namely the void ratio is preferably in a range of from 10 to 50%, more preferably from 15 to 35%, still more preferably from 20 to 30% by volume to achieve sufficient light-scattering property of the electrodeposit layer without causing embrittlement of the layer.

The void ratio is measured according to the equations below:

$$\{(a \times b)/c\} + \{(a \times d)/e\} = x$$

Void ratio $= 100 - x$ where
a: (specific gravity of test specimen) $\times 100$,
b: content of electrodeposition paint,
c: specific gravity of electrodeposition paint,
d: content of foaming compound, and
e: specific gravity of foaming compound This constitution is suitably employed, when the reflectivity of the recording layer is in a range of from 10 to 60%, particularly 15 to 40% to the light of wavelength of 780 to 830 nm.

The process for preparing the optical recording medium shown in FIG. 10 of the present invention is described in detail.

The original plate 106 is prepared in the same manner as in the original plate 26 employed in the optical recording medium of the aforementioned first embodiment of the present invention, so that the description thereof is omitted here.

Figure 11:
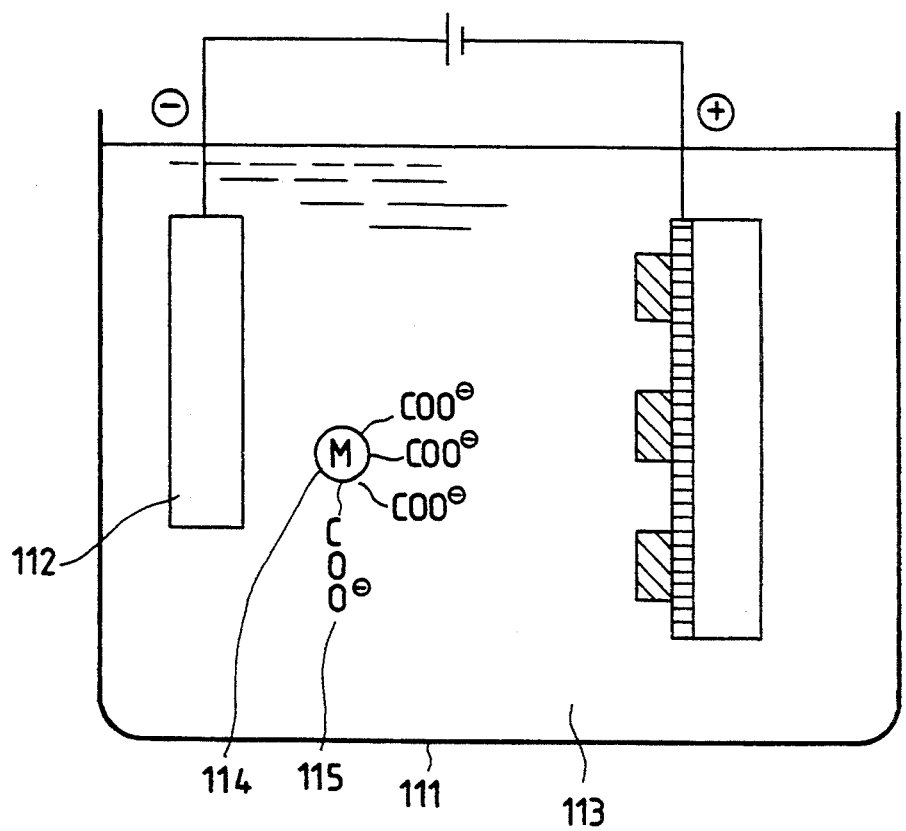
FIG. 11 explains another electrodeposition step.

An original plate 106, which has been prepared as above and has an electroconductive layer uncovered in a pattern corresponding to a preformat pattern, is subjected to electrodeposition in an electrodeposition solution 113 to deposit an electrodeposit layer onto the uncovered portion of the electroconductive layer. In the electrodeposition, as shown in FIG. 11, the electrodeposit layer is formed by using the electroconductive layer as one electrode, applying voltage between the electrode and another electrode 112 to cause migration of the electrodeposition resin material 115 which is ionized in the electrodeposition to the electrode and to deposit the material on the electroconductive layer surface.

If a particulate material 114 having a higher reflectivity or a lower reflectivity, a light-scattering particles, or a foaming compound is added together with the electrodepositing resin into the electrodeposition solution, and then the particles is deposited with the electrodepositing resin onto the electrode, thereby the electrodeposition layer being formed which has a high reflectivity or a low reflectivity.

The reason why the resin 115 and the particles 114 deposit simultaneously is considered as below. The electrodepositing resin has a functional group bonded thereto which is ionized in the electrodeposition solution. On application of a DC voltage between the article to be coated and the counter electrode, the resin is attracted to the article to be coated and deposits thereon. The resin is adsorbed around the electroconductive particles in the electrodeposition solution, so that the particles also migrates to the electrode (the article to be coated) with the migration of the resin to the electrode, and deposits simultaneously with the resin to form a coating film.

The thickness of the electrodeposit layer is preferably such that the layer has a reflectivity different from that of the recording medium when the layer has been transferred on a substrate material. Specifically the layer is formed in a thickness ranging from 0.01 $\mu$m to 10 $\mu$m. Onto the original plate having thus formed electrodeposition layer, a substrate material 91 is made to adhere closely (FIG. 10E) to transfer the electrodeposit layer onto the substrate material. Then the electrodeposit layer is cured to prepare an optical recording medium substrate.

The transfer is practiced by bringing the surface of the electrodeposit layer into contact with the surface of the substrate. The pressure may be applied by means of a rubber-coated roller.

In the above transferring step, the electrodeposit layer 92 may be transferred onto the substrate material 91 through a transfer-assisting layer as described before, thereby the precision of the transfer of the electrodeposit layer being improved further. The constitution employing the transfer-assisting layer is preferred for the optical recording medium of the second embodiment having an electrodeposit layer which is liable to become brittle by incorporation of co-depositing material.

A photopolymerizable resin as the electrodepositing material may be exposed to light irradiation before transferring onto the substrate. If further curing of the electrodeposit layer is desired, the layer is exposed again to light irradiation after transferring to the substrate.

A thermosetting resin as the electrodepositing material may be cured by heat treatment before or after the transfer to the substate.

A pressure-curing material as the electrodepositing material may be transferred to the substrate by applying pressure by means of a press machine or a laminator.

The recording layer is formed on the transferred electrodeposit layer thus prepared on the optical recording medium substrate.

The material for the recording medium includes organic dyes such as polymethine dyes, cyanine dyes, naphthoquinone dyes, and phthalocyanine dyes; inorganic materials of metals and semimetals such as low-melting substances of Bi, An, Te, etc. and composite compounds thereof with As, Se, S, O, C, etc.; magnetooptical recording films such as Te-TeO$_2$ type, and Tb-Fe-Co type which conduct recording by phase transition; silver halides which conduct recording in response to optical density change; and so forth.

In the present invention, it is preferred to select a material which is capable of forming a recording layer having reflectivity different from that of the electrodeposit layer.

For example, the metals and alloys of high reflectivity among the above mentioned materials for recording mediums such as Bi, Sn, Te, and Te-Fe-Co contain preferably a low-reflectivity substance in the electrodeposit layer, while organic dyes of low reflectivity such as polymethine dyes and cyanine dyes contain preferably a high-reflectivity substance in the electrodeposit layer.

Figure 12:
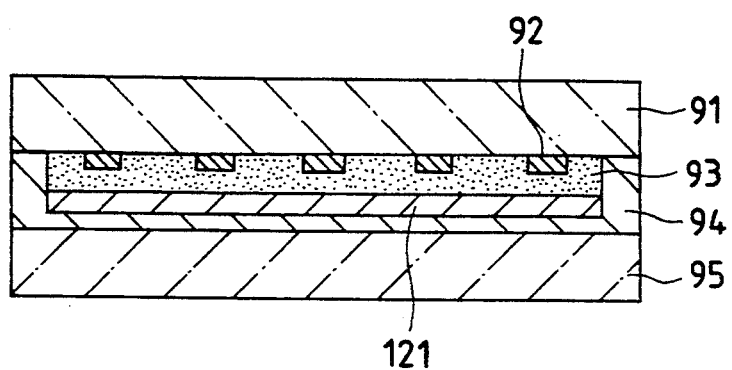
FIG. 12 shows a schematic sectional view of still another optical recording medium of the present invention.

An optical recording medium is obtainable which is capable of giving sufficient track-traversing signal and giving excellent contrast of recording in the case where the electrodeposition layer is made to have high reflectivity and the recording layer is made to have low reflectivity, and further a reflecting layer 121 exhibiting reflectivity of about 60% such as of Al and Au is formed as shown in FIG. 12.

In this construction, when the recording layer has reflectivity of 10 to 60%, in particular 10 to 40% to light of wavelength of 780 to 830 nm, the reflectivity of the recording pit portion rises, whereby influences of dirts and scratches for recording or reproducing can be avoided.

In another process for producing an optical recording medium of the second embodiment of the present invention can be prepared as below. A casting mold unit similar to the one shown in FIG. 5B is constructed by use of an original plate having an electrodeposit layer and having been obtained through the steps of FIG. 10A to 10D; a substrate material is molded therein by casting and simultaneously the electrodeposit layer 92 is transferred to form an optical recording medium substrate in one step. By this process, the resulting optical recording medium substrate exhibits less birefringence and has precisely formed preformat. On this substrate, a recording layer, a reflecting layer, and a protecting substrate are formed suitably to obtain an optical recording medium as shown in FIG. 9 or FIG. 12.

Figure 15A:
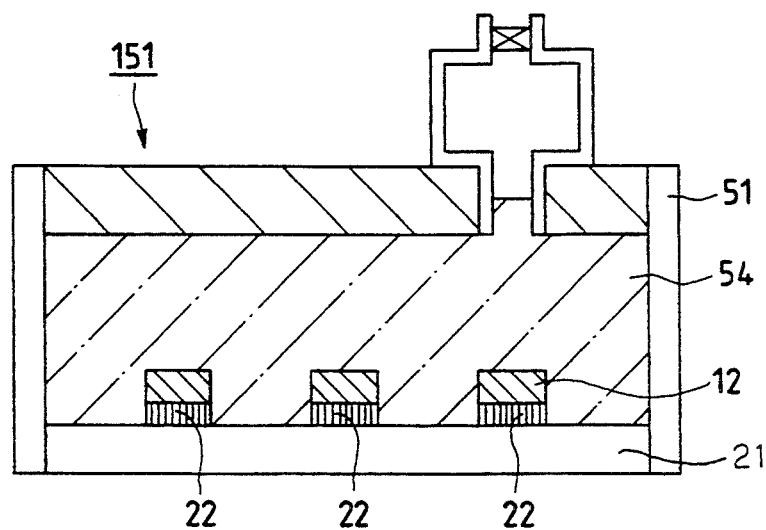
FIGS. 15A to 15C show schematically still another process for producing an optical recording medium of the present invention.
Figure 15B:
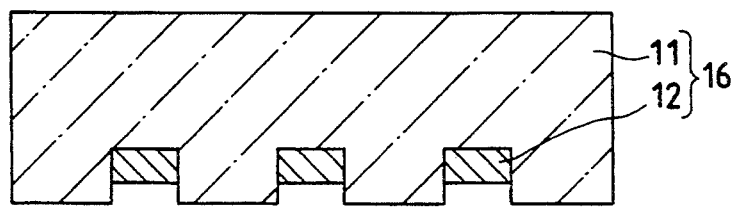
Figure 15C:
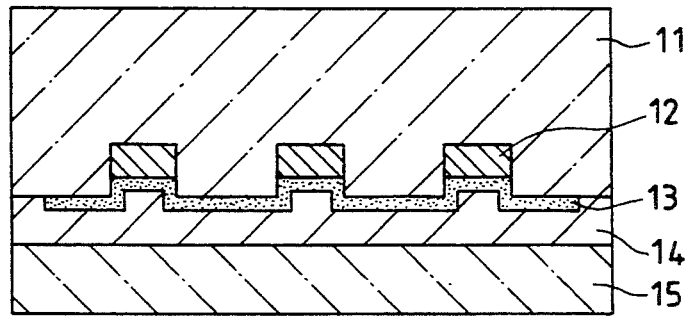

As a modification of the above production process, the electroconductive layer 22 itself is formed in a pattern corresponding to the preformat on the original plate substrate 21 as shown in FIG. 15A; an electrodeposit layer 12 is deposited on the electroconductive layer; a casting mold unit 151 is constructed by use of the original plate; and therewith an optical recording medium substrate and an optical recording medium are produced as shown in FIG. 15B and FIG. 15C. The optical recording medium substrate thus prepared has the electrodeposit layer 12 embedded in the substrate material as shown in FIG. 15B. Thereby exfoliation of the electrodeposit layer from the substrate material is prevented effectively. Therefore, this is one of the preferred constitution of the optical recording medium of the second embodiment of the present invention in which the electrodeposit layer is liable to be brittle owing to incorporation of the co-depositing substance.

A still another method for producing an optical recording medium of the present invention is described below by reference to FIG. 13.

Figure 13A:
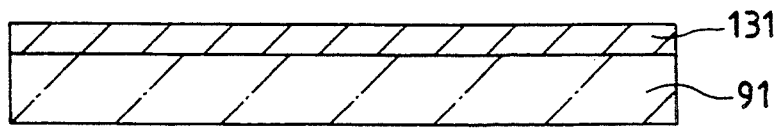
FIGS. 13A to 13E show schematically still another process for producing an optical recording medium of the present invention.

Firstly, a transparent electrode 131 which exhibits large transmittance to the light beam for recording and reproducing information is formed from a material such as tin oxide and indium oxide on a substrate material 91 (FIG. 13A).

Figure 13B:
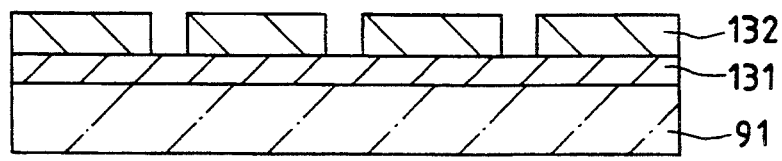
Figure 13C:
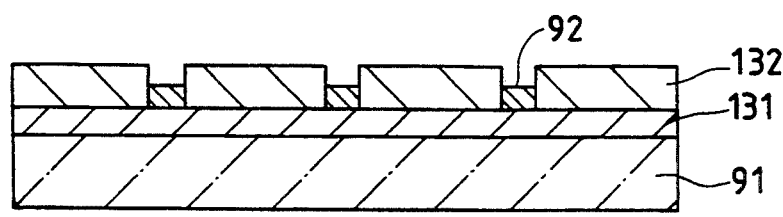
Figure 13D:
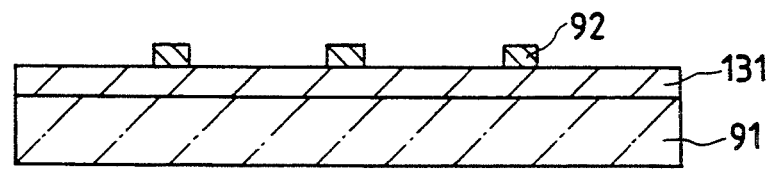
Figure 13E:
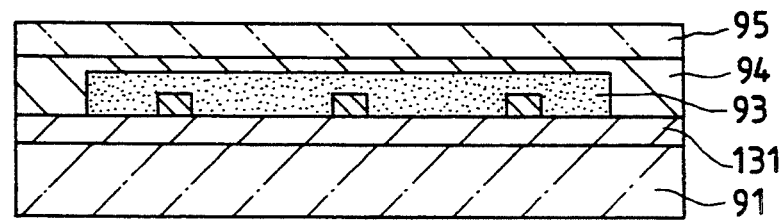

On the transparent electrode, an insulating material 132 such as a photoresist is applied. The insulating material is exposed to light irradiation in a pattern corresponding to a preformat, and is developed to uncover the electrode in the pattern (FIG. 13B).

Then, electrodeposition is conducted by employing the transparent electrode as the one of the electrodes to deposit an electrodeposit layer 92; the photoresist is removed (FIGS. 13C and 13D); and on the face of the formed electrodeposit layer, a recording layer, an adhesion layer, and protecting layer are laminated (FIG. 13E) to complete an optical recording medium of the present invention.

Figure 16:
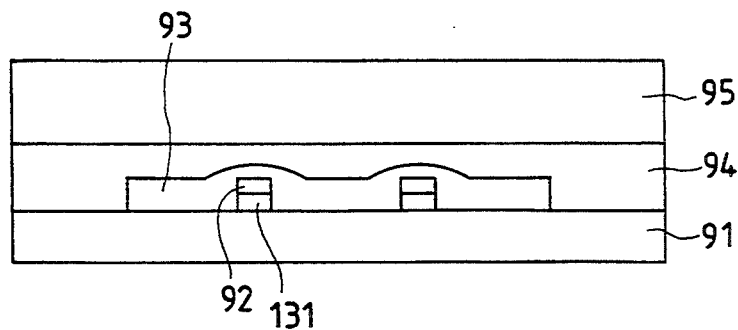
FIG. 16 shows a schematic sectional view of still another optical recording medium of the present invention.

In this constitution also, the transparent electrode itself may be formed in a pattern, and onto the patterned transparent electrode, the electrodeposit layer is deposited. With the resulting substrate material, the optical recording medium as shown in FIG. 16 can be prepared.

A third embodiment of the recording medium of the present invention is described below.

In this embodiment, the information recording medium has an electroconductive recording layer or reflecting layer, and an electrodeposit layer is provided on the recording layer or the reflecting layer.

Figure 17A:
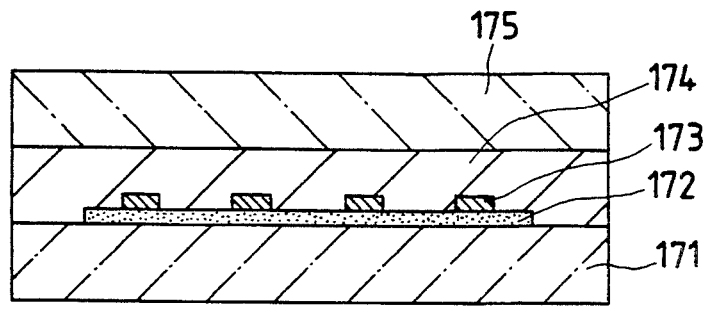
FIGS. 17A and 17B show schematic sectional views of still another optical recording medium of the present invention.
Figure 17B:
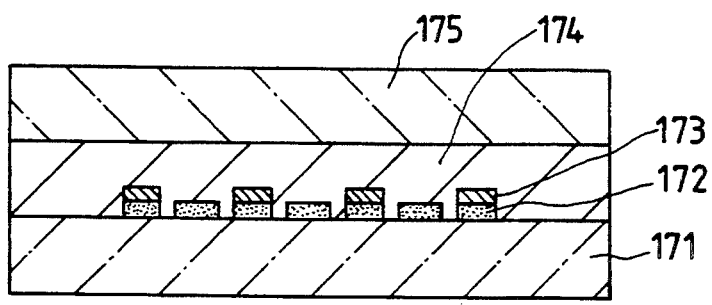

FIGS. 17A and 17B show schematic sectional views of the optical recording medium of the third embodiment of the present invention. As shown in the drawings, the recording medium comprises a substrate 171, an electroconductive recording layer or reflecting layer 172, an electrodeposit layer 173, an adhesion layer 174, and a protecting substrate 175.

Figure 18:
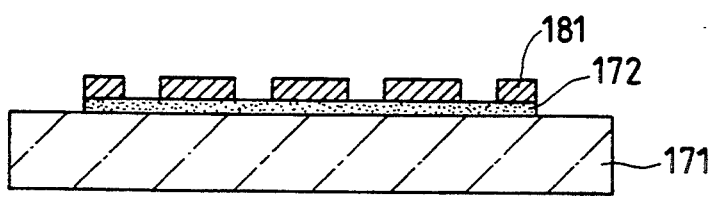
FIG. 18 shows a schematic sectional view of an original plate for producing an optical recording medium shown in FIG. 17A.
Figure 19:
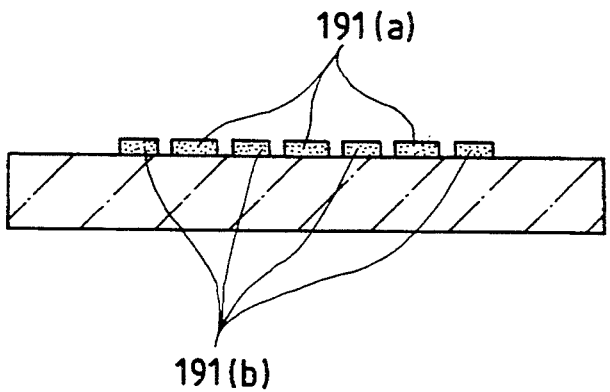
FIG. 19 shows a schematic sectional view of an original plate for producing an optical recording medium shown in FIG. 17B.

The optical recording medium of FIG. 17A may be prepared by forming a resist pattern 181 corresponding to a preformat on the surface of the electroconductive recording layer (or reflecting layer) 172 on the substrate 171 as shown in FIG. 18; immersing this substrate in an electrodeposition paint; conducting electrodeposition with the electroconductive recording layer (or reflecting layer) 171 employed as the one of the electrodes; washing the substrate having the electrodeposit layer with water; curing the electrodeposit layer; lifting off the resist layer; and overlaying a protecting substrate on the above-mentioned substrate at the side of the electrodeposit layer.

The optical recording medium of FIG. 17B may be prepared by patterning an electroconductive recording layer (or reflecting layer) into a recording region 191(a) and a preformat region 191(b); immersing the substrate in an electrodeposition paint; conducting electrodeposition with the preformat region 191(b) of the electroconductive recording layer employed as the one of the electrodes; washing the substrate having the electrodeposit layer with water; curing the electrodeposit layer; and overlaying a protecting substrate on the above-mentioned substrate at the side of the electrodeposit layer.

The electroconductive recording layer or the electroconductive reflecting layer in the present invention has preferably electroconductivity sufficient for deposition of the electrodeposition resin on application of electric current for electrodeposition.

When the electroconductive layer is employed as the recording layer, it comprises an electroconductive material capable of recording, such material including metals, metal oxides, carbon, and electroconductive polymers: specifically metals such as Au, Cu, Al, and Te, metal oxides such as TeO, carbon such as carbon black, and electroconductive polymers such as polyacetylene, polypyrrole, polythiophene, and polyaniline.

On the other hand, when the electroconductive layer is employed as the reflecting layer, it comprises a reflective material having electroconductivity: such material including metals, metal oxides, and electroconductive polymers: specifically metals such as Au, Cu, Ni, and Al, and electroconductive polymers such as polyacetylene, polypyrrole, and polyphenylene.

The electrodeposit layer, in the present invention, is desired to have reflectivity different much more from that of the recording layer (or reflecting layer). The reflectivity of the electrodeposit layer can be controlled by incorporating a particulate material having high reflectivity, a particulate material having low reflectivity, or light-scattering particles into the electrodeposit layer, or otherwise making the electrodeposit layer porous. In this embodiment, when the electroconductive recording layer or the electroconductive reflecting layer has reflectivity in a range of from 10 to 60%, in particular, from 20 to 60% to light of the wavelength of from 780 to 830 nm, the electrodeposit layer has preferably lower reflectivity.

A fourth embodiment of the optical recording medium of the present invention is described below. In this embodiment a recording layer composed of an electrodeposit layer is arranged in a pattern corresponding a preformat on a substrate.

Figure 20:
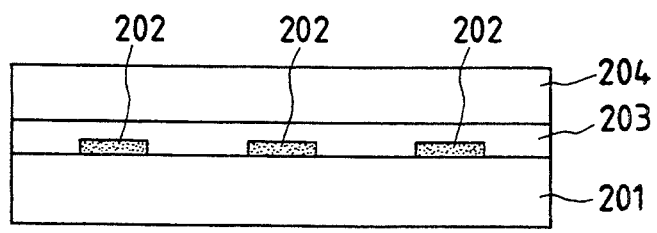
FIG. 20 shows a schematic sectional view of still another optical recording medium of the present invention.

FIG. 20 shows a schematic sectional view of an optical recording medium of this embodiment. In FIG. 20, the medium comprises a substrate 201, a recording layer 202 composed of an electrodeposit layer arranged in a pattern corresponding to a preformat on the substrate, an adhesion layer 203, and a protecting substrate 204.

The optical recording medium of this embodiment can be prepared according to any of the above-described method in which a preformat is formed of an electrodeposit layer on the aforementioned substrate.

The recording layer composed of the electrodeposit layer in this embodiment may be formed by conducting electrodeposition by use of an electrodeposition paint containing a particulate material to constitute the recording material. The particulate material to constitute the recording material includes organic dyes such as polymethine dyes, cyanine dyes, naphthoquinone dyes, anthraquinone derivatives, chromanium compounds, azo compounds, phthalocyanine pigments, and carbon black; inorganic materials of metals and semimetals such as low-melting substances of Bi, Sn, Te, etc. and composite compounds thereof with As, Se, S, O, C, etc.;

Te—TeO$_2$ type substances which conduct recording by phase transition; and silver halides which conduct recording in response to optical density change; and so forth. Further, materials for magnetooptical recording and heat-sensitive recording are also useful for the recording layer. As the recording material dispersed in the electrodeposition paint in this embodiment, phthalocyanines are preferred, since they exhibit relatively high reflectivity and have sufficient dispersibility in the electrodeposition paint.

The recording material is contained in the recording layer composed of the electrodeposit layer at a content in a range of from 5 to 50%, more preferably from 10 to 40%, still more preferably from 20 to 35% by weight in consideration of the recording sensitivity of the recording layer (electrodeposit layer), the film properties of the electrodeposit film such as flexibility and adhesiveness. The content of the recording material in the electrodeposit layer can be measured by thermogravimetry when the recording material is electroconductive, and by light transmittance when the recording medium contains an organic dye or pigment.

Figure 21A:
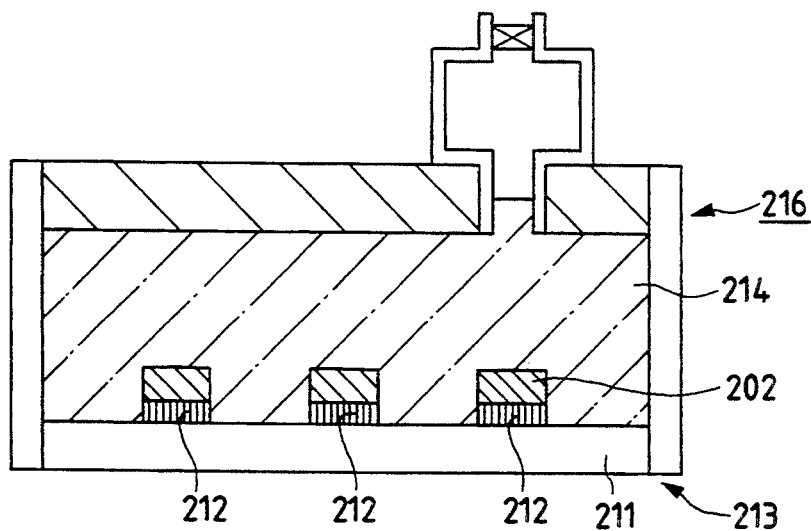
FIGS. 21A to 21C show schematically still another process for producing an optical recording medium of the present invention.
Figure 21B:
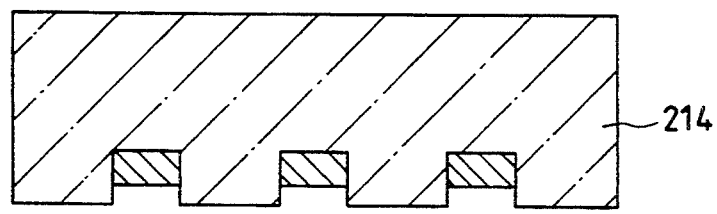
Figure 21C:
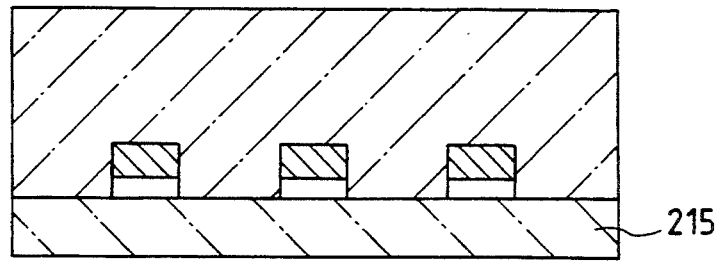

In one method of production for this embodiment, an optical recording medium is produced, as shown in FIGS. 21A, 21B, and 21C, by arranging an electrode layer 212 in a pattern on an original plate substrate 211, depositing an electrodeposit layer 202 for a recording layer, constructing a casting mold unit 216 by use of the original plate 213, filling a liquid resin 214 into the unit, curing the resin, and releasing the mold, thus transferring the electrodeposit layer 202 onto the substrate 214. According to this method, high recording sensitivity can be obtained without retarding the information recording even when a protecting layer 215 is provided on the substrate, since vacant spaces are formed on the recording layer.

A fifth embodiment of an optical recording medium of the present invention has a preformat layer composed of an electrodeposit layer and a recording layer composed of an electrodeposit layer formed respectively on a substrate.

Figure 22A:
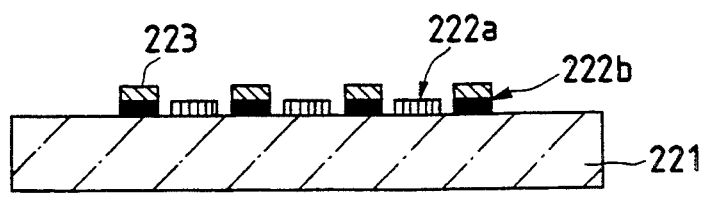
FIGS. 22A to 22D show schematically still another process for producing an optical recording medium of the present invention.
Figure 22B:
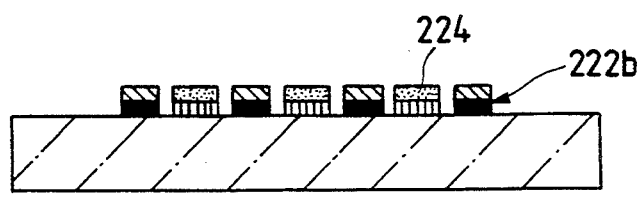
Figure 22C:
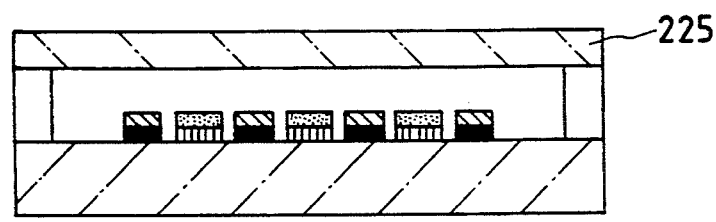
Figure 22D:
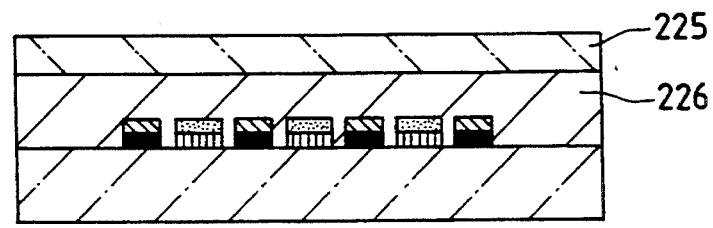

FIGS. 22A and 22B illustrate schematically a process for producing an optical recording medium of the fifth embodiment. As shown in the drawings, an electroconductive layer 222 (e.g., a transparent electrode composed of In$_2$O$_3$ or the like) is formed on a substrate 221. From the electroconductive layer, an electroconductive pattern 222a for electrodepositing a recording layer and another electroconductive pattern 222b for electrodepositing a preformat layer are formed by use of photolithography. The substrate 221 is immersed in an electrodeposition paint for preformat layer formation, and a preformat layer 223 is deposited by employing the electroconductive pattern 222b as the one of the electrodes. Then, the substrate 221 is immersed in another electrodeposition paint for recording layer formation, and a recording layer 224 is deposited by employing the electroconductive pattern 222a as the one of the electrodes. Thereafter the preformat layer and the recording layer is cured. If necessary, a protecting substrate 225 is provided with interposition of a spacer as shown in FIG. 22C, or with interposition of an adhesion layer 226 as shown in FIG. 22D. Thereby a recording medium having both a preformat layer composed of an electrodeposit layer and a recording layer composed of an electrodeposit layer is prepared. In preparing the optical recording medium, the reflectivity of the preformat layer and that of the recording layer are preferably controlled so as to make larger the reflectivity difference. The methods for controlling the reflectivity of the electrodeposit layer is already described above.

In another process for this fifth embodiment, an optical recording medium may be prepared by providing an original plate having a preformat layer composed of an electrodeposit layer and a recording layer formed on an original plate substrate in the same manner as described by reference to FIGS. 22A and 22B, bringing the original plate into direct contact with a substrate material or into indirect contact with it by interposition of a transfer-assisting layer, and transferring the electrodeposition layer onto the substrate material.

Figure 23:
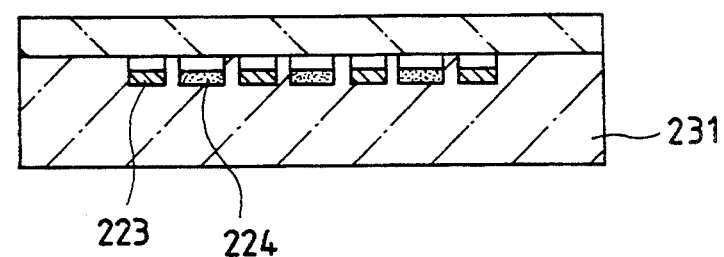
FIG. 23 shows a schematic sectional view of still another optical recording medium of the present invention.

In still another process, an optical recording medium having an electrodeposit layer 223, 224 embedded in a substrate 231 as shown in FIG. 23 may be prepared by constructing a casting mold unit by use of the above-mentioned original plate having a preformat layer composed of an electrodeposit layer and a recording layer composed of an electrodeposit layer as shown in FIG. 21, and filling a liquid resin into this mold, solidifying or curing the resin.

Figure 24A:
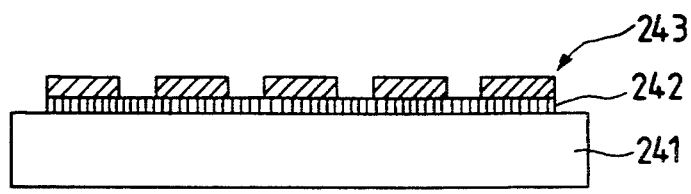
FIGS. 24A to 24F show schematically still another process for producing an optical recording medium of the present invention.
Figure 24B:
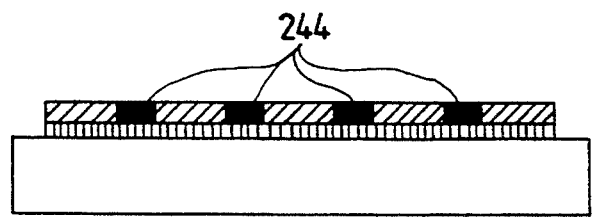

In a further process for the fifth embodiment, an optical recording medium may be prepared as below. On an original plate substrate 241, an electroconductive layer 242 is formed. Thereon a resist pattern 243 is formed corresponding to a preformat (FIG. 24A). Then the original plate is immersed in an electrodeposition paint for preformat layer formation, and electrodeposition is conducted by employing the electroconductive layer 242 as the one of the electrodes to deposit a preformat layer 244. The layer is washed with water and is cured (FIG. 24B). The original plate, after the resist pattern is lifted off (FIG. 24C), is immersed in an electrodeposition paint, and electrodeposition is conducted by employing the electroconductive layer 242 as the one of the electrode to deposit a recording layer 245. At this time the preformat layer has been cured to become insulating, so that the recording layer does not deposit on the preformat layer (FIG. 24D). Then a substrate material 246 is brought into close contact with the preformat layer 244 and the recording layer 245 with or without interposition of a transfer-assisting layer, and the preformat layer 244 and the recording layer 245 are transferred onto the substrate material. If necessary, a protecting substrate is provided on the preformat layer 244 and the recording layer 245 with interposition of an adhesion layer to bond closely or to form air gaps on the recording layer 245.

Figure 24C:
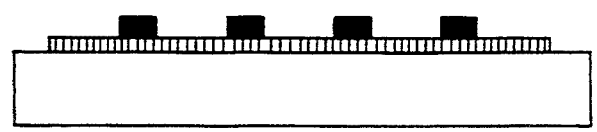
Figure 24D:
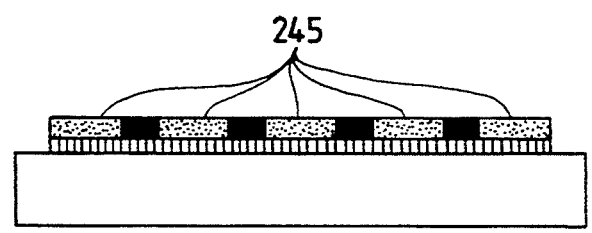
Figure 24E:
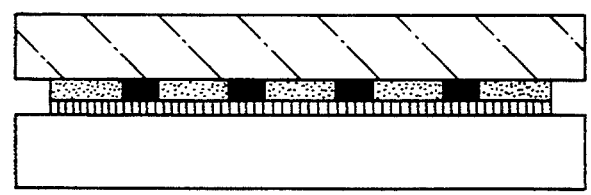
Figure 24F:
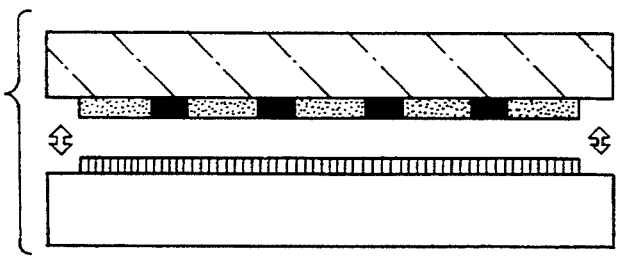

In a still further method, a casting mold unit is constructed by use of the original plate of FIG. 24C, thereby the formation of the substrate material and the transfer of the preformat layer 244 and the electrodeposit layer 245 are conducted in one step.

In this embodiment, if the recording layer has low reflectivity, for example, reflectivity of 5 to 40% to the light of wavelength of from 780 to 830 nm, the preformat layer has preferably reflectivity substantially higher than that of the recording layer. Specifically, when phthalocyanine is incorporated into the recording layer, the preformat layer preferably contains a powdery metal or a powdery metallized material. On the contrary, when the recording layer has high reflectivity, for example, reflectivity of from 10 to 60% to the light of wavelength of from 780 to 830 nm, the preformat layer has preferably reflectivity substantially lower than that of the recording layer. Specifically, when Te is incorporated into the recording layer, the preformat layer preferably contains a light-scattering particulate material or carbon black, or the electrodeposit layer is made porous. Incidentally, the wording of "substantially higher (or lower) reflectivity" is defined already.

As described above, an optical recording medium capable of giving preformat reproducing signal with high contrast is provided according to the present invention by employing, for patterning, an electrodeposition layer which can be controlled in layer thickness and/or reflectivity by applied quantity of electric current or the kind and amount of an additive.

Further, an optical recording medium having a preformat of high precision can be prepared with extreme ease.

Furthermore, the original plate can be used repeatedly, so that the mass productivity of the recording medium is greatly improved.

EXAMPLES

The present invention is described in more detail by reference to Examples without limiting the invention in any way.

The methods of measurement for data shown in Examples are shown below.

Contrast Ratio

Figure 7A:
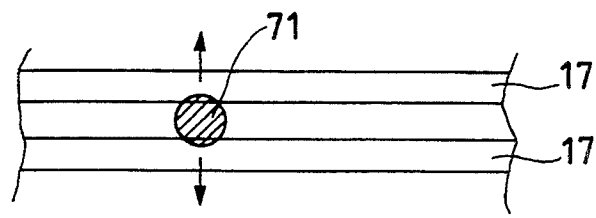
FIGS. 7A and 7B explain a method of evaluation of an optical card of the present invention.
Figure 7B:
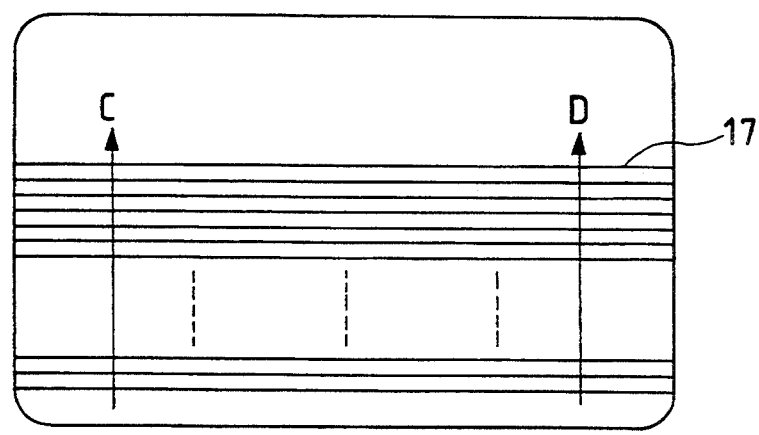
Figure 8:
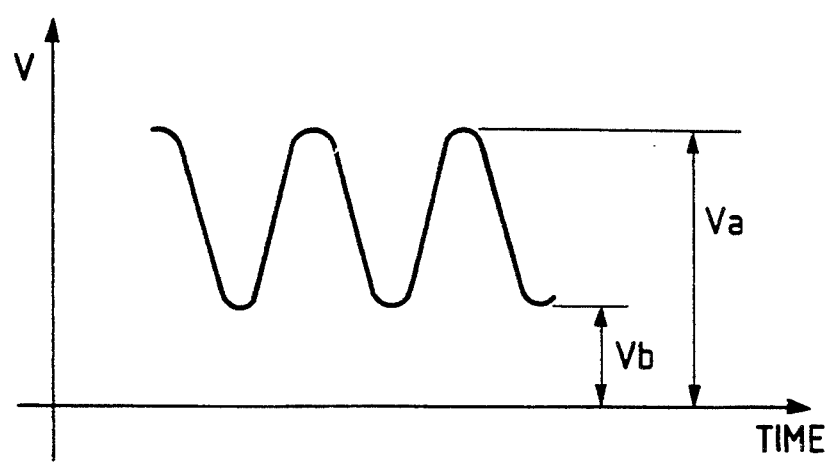
FIG. 8 shows a method of calculation of a track-traversing signal.

The intensity of reflected light is detected by oscilloscope while the laser spot 71 traverses the tracking track 17 (FIG. 7). The contrast is obtained from the detected wave form of the reflected light (a track-traversing signal: FIG. 8). Here, Va represents output voltage when the laser spot is at the intermediate position between two tracking tracks 17, and Vb represents the output voltage when the laser spot is on the tracking track 17.

Contrast ratio $= (Va - Vb)/(Va)$
Wavelength of laser beam: 830 nm
Power of laser beam: 0.5 mW (Optical disks)/0.27 mW (Optical cards)
Spot diameter (on recording face): 1.6 μm (Optical disks)/3 μm (Optical cards)
Incident direction of laser beam: Substrate side

Content of Recording material

The electroconductive powdery material dispersed in the electrodeposit layer was determined by a thermogravimetric analyzer (trade name: Thermal Analysis System 7 Series, made by Perkin-Elmer Co.), and the organic dye or pigment in the electrodeposit layer was determined by measuring light transmittance.

Example 1

An optical disk of 350 mm in diameter having a preformat constituted of an electrodeposit layer was prepared according to the procedure below.

A glass plate (size: 400 mm×400 mm, thickness: 5 mm) mirror-finished at one face was employed as the original plate substrate. Copper was vacuum-deposited on the mirror face side of the glass plate to form an electroconductive layer of 0.5 mm thick.

A photoresist (trade name: WAYCOAT HPR204, made by Fuji Hanto Electronics Technology Co.) was applied on the surface of the electroconductive layer to give a dry thickness of 700 Å by means of a roll coater, and was pre-baked at 100° C. for 20 minutes.

The photoresist layer was subjected to pattern exposure by UV ray irradiation through a photomask attached tightly to the photoresist layer. The photomask had a pattern corresponding to concentric tracking tracks of 0.6 μm in width and 1.6 μm in pitch formed as a preformat by means of an electron beam writing apparatus.

After the exposure, the photoresist on the exposed area was dissolved off by immersing a developer solution (LSI developer solution, made by Fuji Hanto Electronics Technology Co.). Then post-baking was conducted at 100° C. for 20 minutes. Thus an original plate 26 was prepared.

A cationic electrodeposition solution was prepared as below. An organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with deionized water to a concentration of 15% by weight to obtain an electrodeposition solution.

The original plate 26 was immersed into this electrodeposition solution. By employing the electroconductive layer as the cathode and the metal vessel of the bath as the positive electrode, DC voltage of 5–10V was applied for one minute. The original plate was taken out, washed with water sufficiently, and dried to obtain an electrodeposit layer 12.

The surface of the electrodeposit layer 12 formed in a pattern on the original plate 26 was brought into contact with a polycarbonate resin substrate material of 350 mm diameter and 1.2 mm thick, and the electrodeposit layer was transferred onto the substrate material by means of a rubbercoated roller.

The transferred electrodeposit layer was exposed to light entirely from the top by means of a high pressure marcuric lamp at an intensity of 200 mJ/cm$^2$ to cure the electrodeposit layer 12. The resulting preformat pattern layer had a thickness of 700 Å.

On this preformat pattern, a tellurium oxide recording layer 21 was formed to a thickness of 300 Å by sputtering. Thereon a protecting substrate 15 made of a polycarbonate resin (diameter: 350 mm, inside diameter: 28 mm, thickness: 1.2 mm) was sticked with interposition of an adhesion layer 14 of ethylenevinyl acetate copolymer type to prepare an optical disk.

With this optical disk, track-traversing signals were measured by means of an optical disk tester (trade name: OMS-2000, made by Nakamichi Co.) with a laser beam of wavelength of 830 nm). In the measurement, the optical disk was rotated at 600 rpm, and the optical head was fixed (by cutting the track servo) at positions of the radiuses of 150 mm (r150), 70 mm (r70), and 30 mm (r30). By utilizing the eccentricity of the disk, the track-traversing signals were measured at each position. As the results, little variation was observed as shown in Table 1. Therefore, the optical disk was found to give tracking signals with uniformity and high contrast.

Example 2

An optical disk as shown in FIG. 1B was formed in the same manner as in Example 1, in which the tracking tracks were formed by the region having no electrodeposit layer 12.

With this optical disk, the track-traversing signal was measured in the same manner as in Example 1. The results are shown in Table 1.

Example 3

An optical disk similar to that of Example 2 was prepared in a similar manner as in Example 2. The electrodeposition solution used was an acryl-melamine resin (trade name: Hani Bright C-IL, made by Hani Kasei K.K.) diluted to a solid concentration of 15% by weight. In this electrodeposition solution, an electrodeposit layer was deposited in a thickness of 800Å on an original plate at a bath temperature of 25° C. and pH 8–9 by employing the electroconductive layer of the original plate as the anode and a stainless steel plate as the counter electrode and by applying voltage of 5–10 V for one minute. The electrodeposition layer was transferred onto an optical disk substrate material made of polycarbonate of 350 mm in diameter, 28 mm in inside diameter, and 1.2 mm in thickness, and cured by heating in an oven kept at 96° C. for about 120 minutes to obtain an optical disk in which electrodeposit-lacking regions are the tracking tracks.

On the preformat-formed face of the substrate, a 3 wt % solution of the polymethine dye shown below in diacetone alcohol was applied by spin coating to form a recording layer of 1000 Å thick. Then an UV-curable adhesive containing plastic beads (0.5 mm in diameter) is applied on the inner periphery portion and the outer periphery portion in a width of 1 mm. Thereon a protecting substrate (350 mm in diameter, 28 mm in inside diameter, 1.2 mm in thickness) made of a polycarbonate resin was laminated, and the outer and inner periphery portions were irradiated with UV light. Thus an optical disk was completed.

This optical disk was subjected to measurement of the contrast in the same manner as in Example 1. The results are shown in Table 1.

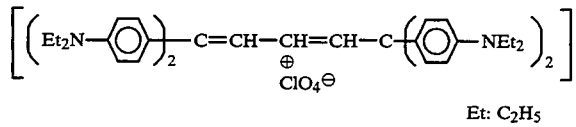

Et: $C_2H_5$

Comparative Example 1

An optical disk substrate was prepared by injection molding: the disk substrate being in a size of 350 mm in outside diameter, 28 mm in inside diameter, and 1.2 mm in thickness and having track grooves of 0.6 μm in width, 1.6 μm in pitch and 800 Å in depth on the surface. On this substrate, a recording layer and a protecting layer were formed in the same manner as in Example 1 to complete an optical disk.

This optical disk was measured for the track-traversing signals at the positions of r150, r70, and r30 in the same manner as in Example 1. The average values of the track-traversing contrast at r150, r70, and r30 are shown in Table 1.

Comparative Example 2

A polycarbonate disk mirror-finished on the both faces in a size of 350 mm in outside diameter, 28 mm in inside diameter, and 1.2 mm in thickness was prepared by injection molding. On this substrate, a 2P layer was formed from the photo-curable resin composition having the components below, and by a 2P forming process. An optical disk substrate was prepared which has spiral track grooves of 0.6 μm in width, 1.6 μm in pitch, and 800 Å in depth.

Photo-curable Resin Composition
Neopentylglycol diacrylate 70 parts by weight
Bisphenol type epoxy acrylate 30 parts by weight [bifunctional acrylate prepared by adding acrylic acid to Epicoat 828 (trade name, made by Yuka Shell Epoxy K.K.]
Benzoin isopropyl ether 1 part by weight This optical disk substrate was dried at 120° C. for 3 hours to remove any residual monomer and to complete the polymerization.

The recording layer and the protecting layer were laminated in the same manner as in Example 3 to complete an optical disk.

This optical disk was observed regarding the track-traversing signals in the same manner as in Example 1. The average values of the track-traversing contrast at each position are shown in Table 1.

Example 4

An original plate substrate was prepared by vacuum depositing copper on a mirror-finished face of glass plate (size: 100 mm × 100 mm, thickness: 5 mm) having been mirror-finished at one face to form an electroconductive layer of 0.5 mm thick on the plate.

A photoresist (trade name: WAYCOAT HPR204, made by Fuji Hanto Electronics Technology Co.) was applied on the surface of the electroconductive layer to give a dry thickness of 1300 Å by means of a roll coater, and was pre-baked at 100° C. for 20 minutes to form a photosensitive layer.

The photoresist layer was subjected to pattern exposure by UV ray irradiation through a photomask attached tightly to the photosensitive layer. The photomask had a pattern corresponding to a preformat pattern for a linear tracking track pattern of 3 μm in width and 12 μm in pitch for an optical card, the pattern being written by an electron beam writing apparatus.

After the exposure, the photoresist on the exposed area was dissolved off by immersion in a developer solution (LSI developer solution, made by Fuji Hanto Electronics Technology Co.). Then post-baking was conducted at 100° C. for 20 minutes. Thus an original plate was prepared.

Then electrodeposit layer 12 was deposited on the original plate in an electrodeposition solution which was a 15 wt % solution of an acryl-melamine resin (trade name: Hani Bright C-IL, made by Hani Kaset K.K.) at a bath temperature of 25° C. and pH 8–9 by employing the electroconductive layer of the original plate as the anode and a stainless steel plate as the counter electrode and by applying voltage of 15–20 V for one minute.

The electrodeposition layer was transferred onto an optical card substrate material made of polymethyl methacrylate of 54 mm wide, 85 mm long, and 0.4 mm thick. Thus an optical card substrate was obtained in which the tracking tracks are formed by regions where the electrodeposit layer of about 1380 Å thick was not formed. It was observed by optical microscopy (×2000) that the electrodeposit layer was transferred precisely onto the substrate material.

On this substrate, a solution of the polymethine dye used in Example 3 at a concentration of 3% by weight in diacetone alcohol was applied by spin coating to form a recording layer of 1000 Å thick.

On the recording layer, a hot-melt adhesive film of ethylene-vinyl acetate copolymer type, and a protecting substrate made of polymethyl methacrylate in a size of 54 mm in width, 85 mm in length, and 0.3 mm in thickness were laminated and heat pressed through hot rolls at a surface temperature of 110° C. to complete an optical card.

With this optical card, track-traversing signals were observed by scanning of a light beam to cross the tracking tracks as shown by the arrow marks C and D in FIG. 7. The maximum value, the minimum value and the average value of the contrast of the track-traverse signal are shown in Table 2.

Comparative Example 3

A optical card substrate was prepared by transferring stripe-shaped track grooves of 3 μm in width and 12 μm in pitch by a compression method onto a surface of a substrate material made of polymethyl methacrylate in a size of 54 mm in length, 85 mm in width, and 0.4 mm in thickness.

With this optical substrate, an optical card was prepared in the same manner as in Example 4, and track-traversing signals were observed in the same manner as in Example 4. As the results, the signals were observed to fluctuate. The values of contrast of the track-traversing signals are shown in Table 2.

The optical card substrate prepared in the same manner as in Example 4 was evaluated in adhesion between the electrodeposit layer and the substrate material by flection test as below.

Figure 14A:
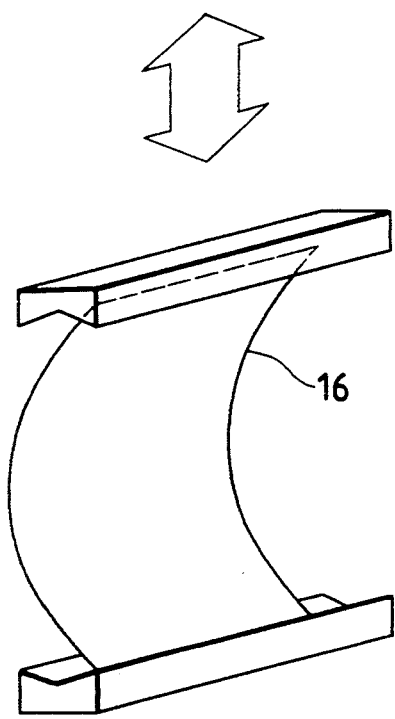
FIGS. 14A and 14B explain schematically a flection test of an optical card of the present invention.
Figure 14B:
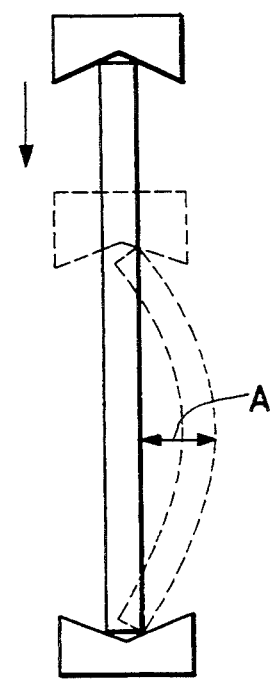

The short sides of the optical card substrate was held as shown in FIG. 14A. The card was flexed as shown in FIG. 14B where the degree of flection of the middle portion of the card as indicated by the symbol A is 20 mm. This flection was repeated 250 times. Thereafter the long sides of the card substrate was held in the same manner and the card was flexed 250 times to cause the flexion A of 10 mm. The state of the electrodeposit layer at the surface of the optical card was examined by optical microscopy. No peeling of the electrodeposit layer was observed.

Example 5

An original plate having an electrodeposit layer was prepared in the same manner as in Example 1.

An optical disk substrate was prepared by applying on the surface of a glass disk of 350 mm in diameter, 28 mm in inside diameter, and 1.2 mm in thickness a UV-curable resin (trade name UVX-SS120, made by Three Bond K.K.) by spin coating in a thickness of 2 to 4 μm as a transfer-assisting layer, placing the above original plate on the substrate material to bring the electrodeposit layer into contact with the uncured transfer-assisting layer, and curing both the transfer-assisting layer and the electrodeposit layer by light irradiation from the glass substrate material side by means of a high-pressure mercury lamp (120 W/cm) at an irradiation intensity of 500 mJ/cm$^2$, and then separating the original plate and the substrate material.

The thickness of the electrodeposit layer transferred onto the substrate material was 700 Å. As the result of observation of the optical disk substrate by optical microscopy (×2000), the electrodeposit layer 12 was found to be precisely transferred from the original plate 26.

Subsequently on this preformat pattern, Tellurium oxide recording layer 21 was formed by sputtering in a thickness of 300 Å. Thereon, a protecting glass substrate 15 (350 mm in diameter, 28 mm in inside diameter, 1.2 mm in thickness) was bonded to complete an optical disk through an adhesive layer 14 made of ethylene-vinyl acetate copolymer.

The resulting optical disk was evaluated in the same manner as in Example 1. The results are shown in Table 3-(1).

Example 6

An original plate having an electrodeposit layer was prepared in the same manner as in Example 4.

An optical card substrate was prepared by applying on the surface of an optical card substrate made of polycarbonate of 54 mm in width, 85 mm in length, and 0.4 mm in thickness a UV-curable resin (trade name UVX-SS120, made by Three Bond K.K.) by spin coating in a thickness of 2 to 4 μm as a transfer-assisting layer, placing the above original plate on the substrate material to bring the electrodeposit layer into contact with the uncured transfer-assisting layer, curing both the transfer-assisting layer and the electrodeposit layer by light irradiation from the glass substrate material side by means of a high-pressure mercury lamp (120 W/cm) at an irradiation intensity of 500 mJ/cm$^2$ and additional heating in an oven at 96° C. for about 120 minutes, and then separating the original plate and the substrate material. Thus an optical card substrate was obtained which has an electrodeposit layer of 1380 Å thick and in which the tracking tracks are formed by the electrodeposit-layer-lacking regions.

It was observed by optical microscopy that the electrodeposit layer was transferred precisely from the original plate 26.

On the face of this substrate at the side of the transferred electrodeposit layer, the cyanine dye having the structure shown below was applied to form a recording layer

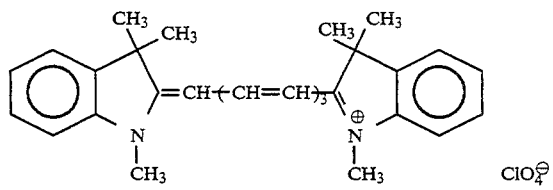

On the recording layer, a hot-melt adhesive film of ethylene-vinyl acetate copolymer type, and a protecting substrate made of polymethyl methacrylate in a size of 54 mm in width, 85 mm in length, and 0.3 mm in thickness were laminated and heat pressed through hot rolls at a surface temperature of 110° C. to complete an optical card.

The resulting optical card was evaluated in the same manner as in Example 4. The results are shown in Table 3-(2).

The optical card substrate prepared in the same manner as in Example 6 was evaluated for adhesion between the electrodeposit layer and the substrate material by flection test as below.

The short sides of the optical card substrate was held as shown in FIG. 14A. The card was flexed as shown in FIG. 14B where the degree of flexion of the middle portion of the card as indicated by the symbol A is 25 mm. This flection was repeated 300 times. Thereafter the long sides of the card substrate was held in the same manner and the card was flexed 300 times to cause the flexion A of 15 mm. The state of the electrodeposit layer at the surface of the optical card was observed by optical microscopy. No peeling of the electrodeposit layer was observed.

Example 7

An optical card original plate 106 was prepared in the same manner as in Example 4 except that the dry thickness of the photoresist layer was 0.1 μm.

A cationic electrodeposition solution was prepared as below. An organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The resulting organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with deionized water to a solid concentration of 10% by weight.

To the 100 part by weight of the electrodeposition resin composition prepared as above, 25 parts by weight of powdery nickel having an average particle diameter of 0.1 μm was added, and the powdery nickel was dispersed by means of a ball mill for 30 hours. Then the dispersion was diluted with deionized water to a concentration of 1.5% by weight to obtain an electrodeposition solution. The original plate 106 was immersed in this electrodeposition solution, and DE voltage of 30 V was applied for one minute by employing the electroconductive layer 102 as the cathode and the metallic bath vessel as the anode. The original plate was taken out, washed sufficiently with water, and dried, thus electrodeposit layer 92 being obtained in a thickness of 2 μm.

The surface of the electrodeposit layer 92 formed in a pattern on the original plate 106 was brought into contact with an acrylic resin substrate material 91 in a size of 100 mm×100 mm and 0.4 mm thick, and the electrodeposit layer 92 was transferred onto the polymethylmethacrylate substrate material by means of a rubber-coated roller.

Then substrate material was wholly exposed to light irradiation with a high-pressure mercury lamp from above at an intensity of 200 mJ/cm$^2$ (exposed face) to cure the electrodeposit layer 12. The amount of deposition of nickel in the electrodeposit layer was 25% by weight On the face having a preformat pattern on the substrate, 3 wt % solution of a polymethine organic dye IR820 (made by Nippon Kayaku Co., Ltd.) in diacetone alcohol was applied by spin coating, and dried to obtain a recording layer 93 having a thickness of 1000±50 Å.

On this recording layer, an acrylic resin substrate of 0.3 mm thick was bonded by use of a hotmelt type ethylene-vinyl acetate adhesive. The resulting article was cut by laser to prepare an optical card of 54 mm in width, 86 mm in length and 0.76 mm in thickness. The amount of the deposited carbon black in the electrodeposit layer was 20% by weight.

Example 8

An optical card was prepared in the same manner as in Example 7 except that 15 parts by weight of carbon black having an average particle diameter of 0.05–0.1 μm was used in place of the powdery nickel in the electrodeposit layer.

Example 9

A preformat pattern was formed on an acrylic substrate in the same manner as in Example 8. On the face of the substrate having the formed preformat pattern, a thin Te-Cu-Pb metal film was vapordeposited in a thickness of 300 Å by sputtering by use of a sputtering target of Te-Cu-Pb alloy at an Ar gas pressure of $5\times10^{-2}$ torr with an applied voltage of 400 V for 90 seconds to form a recording layer 93.

From this article, an optical card is prepared in the same manner as in Example 8.

Example 10

An original plate for an optical card was prepared in the same manner as in Example 4, in which dry thickness of the photoresist was 2 μm.

10 parts by weight of alumina having an average particle diameter of 0.3 μm coated with electroless-plating nickel in a thickness of 0.1 μm was dispersed in 100 parts by weight of a curing-agentcontaining acryl-melamine resin (trade name: Hani Bright C-IL, made by Hani Kasei K.K.) by means of a ball mill for 30 hours. The dispersion was diluted with a deionized water to a concentration of 15% by weight for use for electrodeposition solution. With this electrodeposition solution, an electrodeposition layer 12 containing alumina was deposited on the original plate by employing the electroconductive layer of the original plate as the anode and a stainless steel plate as the counter electrode at a bath temperature of 25° C. at pH 8–9 by application of voltage of 30 V for one minute. The original plate having the electrodeposit layer was brought into contact with a transparent polycarbonate substrate material of 0.4 mm thick. The electrodeposit layer was transferred onto the polycarbonate substrate material by use of a rubber-coated roller. The electrodeposit layer transferred onto the polycarbonate substrate material was cured in an oven at 97° C. for 60 minutes to prepare an optical card substrate having a preformat pattern composed of the electrodeposit layer of 2 μm thick. The amount of the deposited nickel in the electrodeposition layer was 15% by weight.

On the optical card substrate, the cyanine dye represented by the formula below:

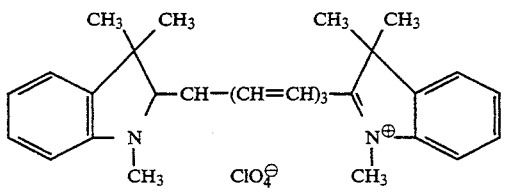

was applied in a thickness of 1000 Å as the recording layer on the preformat-pattern face, and further thereon a polycarbonate substrate of 0.3 mm thick was bonded as the protecting layer through a vinyl acetate type hot-melt adhesive. This article was punched out to obtain an optical card of 54 mm in width and 86 mm in length.

Example 11

An original plate for an optical card was prepared in the same manner as in Example 4.

20 parts by weight of powdery nylon having an average particle diameter of 0.2 μm coated with electroless-plating silver in a thickness of 0.05 μm was dispersed in 100 parts by weight of an acrylmelamine resin (trade name: Hani Bright C-IL, made by Hani Kasei K.K.) by means of a ball mill for 30 hours. The dispersion was diluted with deionized water to a solid concentration of 15% by weight for use for electrodeposition solution. In this electrodeposition solution, an electrodeposit layer containing the powdery nylon plated with silver was deposited on the original plate by employing the electroconductive layer of the original plate as the anode and a stainless steel plate of 0.5 mm thick as the counter electrode at a bath temperature of 25° C. at pH 8-9 by application of voltage of 30 V for one minute. The amount of the deposited powdery nylon plated with silver in the electrodeposition layer was 25% by weight.

The original plate having the electrodeposit layer was brought into contact with an amorphous polyolefin substrate material of 0.4 mm thick. The electrodeposit layer was transferred onto the substrate material by use of a rubber-coated roller. The electrodeposit layer transferred onto the substrate material was cured in an oven at 100° C. for 120 minutes to prepare an optical card substrate having a preformat pattern composed of the electrodeposit layer of 2 μm thick.

On the face of this substrate having the formed preformat pattern, TeO was vapor deposited in a thickness of 300 Å as the recording layer, and further thereon an amorphous polyolefin substrate of 0.3 mm thick was bonded as the protecting layer through an epoxy adhesive. This article was cut in a size of 54 mm in width and 85 mm in length to prepare an optical card.

Example 12

An optical substrate for an optical card having a preformat constituted of an electrodeposit layer was prepared according to the procedure below.

A polymethyl methacrylate resin plate (100 mm long, 100 mm wide, 0.4 mm thick) was employed as the original plate substrate. On this plate, a transparent electrode 102 of indium oxide was formed by sputtering.

A photoresist (trade name: WAYCOAT HPR204, made by Fuji Hanto Electronics Technology Co.) was applied on the surface of the indium oxide film to give a dry thickness of 0.1 μm by means of a roll coater, and was pre-baked at 100° C. for 20 minutes to form a photoresist layer 103.

The photoresist layer was subjected to pattern exposure by UV ray irradiation through a photomask attached tightly to the photoresist layer. The photomask 104 had a linear pattern of 3 μm in width and 12 μm in pitch corresponding to preformat pattern for tracking track for an optical card in pitch by means of an electron beam writing apparatus.

After the exposure, the photoresist on the exposed area was dissolved off by immersing a developer solution (LSI developer solution, made by Fuji Hanto Electronics Technology Co.). Then the uncovered indium oxide film was removed by etching, and remaining photoresist was removed by a remover. Thus an original plate 26 having a transparent electrode in a pattern was prepared.

20 parts by weight of carbon black having an average particle diameter of 0.07 μm was dispersed in 100 parts by weight of a curing-agent-containing acryl-melamine resin (trade name: Hani Bright C-IL, made by Hani Kasei K.K.) by means of a ball mill for 30 hours. The dispersion was diluted with a deionized water to a solid concentration of 15% by weight for use for electrodeposition solution. With this electrodeposition solution, an electrodeposit layer 92 containing carbon black was deposited on the original plate by employing the transparent electrode of the original plate as the anode and a stainless steel plate as the counter electrode at a bath temperature of 25° C. at pH 8-9 by application of voltage of 30 V for one minute. Thus an original plate was obtained which has an electrodeposit layer 92 containing carbon black in a pattern. A transparent polycarbonate substrate material 91 of 0.4 mm thick was laminated with interposition of an ethylene-ethyl acrylate copolymer hot-melt sheet as the transfer-assisting layer onto the above original plate having the electrodeposit layer. The laminated matter was passed through a laminator at a roller temperature of 130° C., and then the substrate material 91 was separated from the original plate 106. The substrate having the transferred electrodeposit layer was heated in an oven at 97° C. for 60 minuted to cure the transferred layer to obtain an optical card substrate having a preformat pattern constituted of the electrodeposit layer of 2 μm thick. The content of the carbon black in the electrodeposit layer was 25% by weight.

The face of the optical card substrate having the preformat was observed by optical microscopy, and it was found that the electrodeposit layer was transferred with high precision from the original plate to the substrate material.

On face of the optical card substrate having the formed preformat, the cyanine dye represented by the formula below:

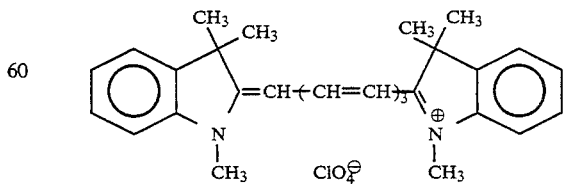

was applied as the recording layer on the preformat-pattern face, and further thereon a polymethyl methacrylate substrate of 54 mm wide, 85 mm long, and 0.3 mm thick as the protecting substrate and an ethylene-ethyl acrylate copolymer type hot-melt adhesive were laminated. This article was hot-pressed through a hot roll having a surface temperature of 110° C. to obtain an optical card.

Example 13

An original plate substrate was prepared by vacuum-depositing copper on a mirror-finished face of glass plate of 5 mm thick having been mirror-finished at one face to form an electroconductive layer of 0.5 mm thick on the plate.

A photoresist (trade name: WAYCOAT HPR204, made by Fuji Hanto Electronics Technology Co.) was applied on the surface of the electroconductive layer to give a dry thickness of 0.5 μm by means of a roll coater, and was pre-baked at 100° C. for 20 minutes to form a photosensitive layer.

The photoresist layer was subjected to pattern exposure by UV ray irradiation through a photomask attached tightly to the photosensitive layer. The photomask had a pattern corresponding to a preformat pattern for a spiral tracking track pattern of 0.6 82 m in width and 1.6 μm in pitch for an optical disk, the pattern having being written by an electron beam writing apparatus.

After the exposure, the photoresist on the exposed area was dissolved off by immersion in a developer solution (LSI developer solution, made by Fuji Hanto Electronics Technology Co.). Then, post-baking was conducted at 100° C. for 20 minutes. Thus an original plate was prepared.

A cationic electrodeposition solution was prepared as below. A organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The resulting organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with deionized water to a solid concentration of 10% by weight. To the 100 part by weight of the resin composition prepared as above, 10 parts by weight of natural mica which has an average particle diameter of 0.2 μm and had been plated with 0.1 μm-thick electroless-plated gold was added, and the mica was dispersed by means of a ball mill for 30 hours. Then the dispersion was diluted with deionized water to a concentration of 5% by weight to obtain an electrodeposition solution. The original plate was immersed in this electrodeposition solution, and DC voltage of 30 V was applied for one minute by employing the electroconductive layer of the original plate as the cathode and a 0.5 mm-thick stainless steel plate as the counter electrode. The original plate was taken out, washed sufficiently, and dried. Thus an electrodeposit layer deposited in a pattern was obtained which contained gold-plated natural powdery mica.

With the original plate having the electrodeposit layer, a transparent substrate material of polymethyl methacrylate of 5 inches in diameter and 1.2 mm in thickness was brought into close contact, and the electrodeposit layer was transferred to a substrate material. Then the original plate was separated. The substrate material was exposed to UV irradiation with a high pressure mercury lamp at an intensity of 200 mJ/cm$^2$ to cure the electrodeposit layer on the substrate material. Thus a substrate for an optical disk was obtained which had a preformat pattern constructed of an electrodeposit layer of 1 μm thick. The content of the gold-plated powdery mica was 15% by weight.

On the face of the substrate having a preformat pattern, the anthraquinone derivative shown by the formula below:

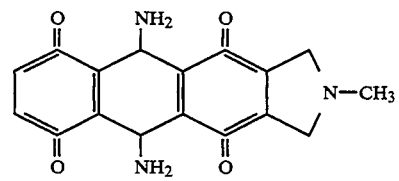

was formed in a thickness of 1200 Å, and further thereon a substrate made of polymethyl methacrylate was bonded with interposition of a spacer of 0.3 mm thick by use of a silicone type adhesive to complete an optical disk.

Example 14

An InO$_2$ thin film was formed in a thickness of 350 Å by sputtering on a methyl methacrylate resin substrate of 350 mm in diameter and 1.2 mm in thickness.

On the InO$_2$ thin film, a photoresist (trade name: WAYCOAT HPR204, made by Fuji Hanto Electronics Technology K.K.) was applied in a thickness of 2 μm by a spinner, and the applied photoresist was pre-baked at 100° C. for 20 minutes. The photoresist layer was scanned with UV ray in a pattern corresponding to a preformat pattern, and was developed to prepare an original plate having a resist pattern of an uncovered transparent electrode in spiral of 0.6 μm in width and 1.6 μm in pitch.

Separately an electrodeposition solution was prepared by dispersing 25 parts by weight of powdery Ag having an average particle diameter of 0.2 μm in 100 parts by weight of an acryl-melamine resin (trade name Hani Bright C-IL, made by Hani Kasei K.K.) by means of a ball mill for 30 hours, and diluting the dispersion with deionized water to a solid content of 15% by weight.

The original plate was immersed in this electrodeposition solution, and an electrodeposit layer 12 was deposited by conducting electrodeposition by employing the transparent electrode as the anode and a stainless steel plate as the counter electrode. The electrodeposit layer was washed with water, and cured by heat treatment in an oven at 130° C. for 60 minutes. Thus an optical disk substrate was obtained. The thickness of the electrodeposition layer forming the proformat pattern was about 3000 Å. The Ag content in the electrodeposit layer was 25% by weight. The reflectivity of the electrodeposit layer was about 60-70%. On the face of the optical disk substrate having the proformat pattern, phthalocyanine was vapor-deposited as a recording layer in a thickness of 1000 Å. Thus an optical disk was completed.

Example 15

An optical disk was prepared in the same manner as in Example 14 except that 20% by weight of carbon black having an average particle diameter of 0.07 μm was dispersed in place of the powdery Ag in the electrodeposition solution, and TeO was vapor-deposited as the recording layer in a thickness of 400 Å. The content of carbon black in the electrodeposit layer was 25% by weight

Example 16

An optical disk of 350 mm in diameter having a preformat constituted of an electrodeposit layer was prepared according to the procedure below.

A glass plate (size: 400 mm×400 mm, thickness: 5 mm) mirror-finished at one face was employed as the original plate substrate. Copper was vacuum-deposited on the mirror-face side of the glass plate to form an electroconductive layer of 0.5 mm thick.

A photoresist (trade name: WAYCOAT HPR204, made by Fuji Hanto Electronics Technology Co.) was applied on the surface of the electroconductive layer to give a dry thickness of 700 Å by means of a roll coater, and was pre-baked at 100° C. for 20 minutes.

The photoresist layer was subjected to pattern exposure by UV ray irradiation through a photomask attached tightly to the photoresist layer. The photomask had a pattern corresponding to concentric tracking tracks of 0.6 μm in width and 1.6 μm in pitch formed as a preformat by means of an electron beam writing apparatus.

After the exposure, the photoresist on the exposed area was dissolved off by immersing a developer solution (LSI developer solution, made by Fuji Hanto Electronics Technology Co.). Then post-baking was conducted at 100° C. for 20 minutes. Thus an original plate 106 was prepared.

A cationic electrodeposition solution was prepared as below. A organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with deionized water to a volatile matter content of 90%.

In the 100 part by weight of the electrodeposition resin composition prepared as above, 10 parts by weight of powdery alumina having average particle diameter of 0.3 μm plated with electroless-plated gold in a thickness of 0.1 μm was dispersed by means of a ball mill for 30 minutes. The dispersion was diluted with deionized water to a solid concentration of 15% by weight for use for electrodeposition solution. The original plate was immersed into this electrodeposition solution. An electrodeposit layer containing the powdery alumina plated with gold was deposited in a pattern on the original plate by employing the electroconductive layer of the original plate as the cathode and a 0.5 mm-thick stainless steel plate as the counter electrode by application of voltage of 30 V for one minute. Thus an original plate was prepared which has an electrodeposit layer that contains gold-plated powdery alumina in a pattern.

Separately, on a disk substrate material made of glass of 350 mm in diameter, 28 mm in inside diameter, and 1.2 mm thick, a UV-curable resin (trade name UVX-SS120, made by Three Bond K.K.) was applied by spin coating in a thickness of 2–4 μm as the transfer-assisting layer. The substrate material was superposed on the original plate with the resins uncured such that the electrodeposit layer was brought into contact with the transfer-assisting layer. Then the transfer-assisting layer and the electrodeposit layer were both cured by irradiation of light with a metal halide lamp at 120 W/cm at an intensity of 500 mJ/cm$^2$ from the glass substrate side. The substrate material was separated from the original plate, thus completing an optical disk substrate. The thickness of the electrodeposit layer on the substrate material was 1 μm. The optical disk substrate was observed with an optical microscope, and found that the electrodeposit layer 12 was transferred precisely onto the original plate 26. The content of powdery alumina plated with gold in the electrodeposit layer was 18% by weight.

On the face of the optical disk substrate having the preformat, a recording layer was formed by applying a 3 wt % solution of a polymethine dye (trade name: IR-820, made by Nippon Kayaku Co., Ltd.) in diacetone alcohol in a thickness of 1000 Å. Thereon a protecting substrate made of glass of 350 mm in diameter, 28 mm in inside diameter, and 1.2 mm in thickness was bonded with interposition of a spacer of 0.3 mm thick through a silicone type adhesive to complete an optical disk.

Example 17

An optical card was prepared in the same manner as in Example 7 except that, after formation of the recording layer from IR820 in Example 7, Al was vapor-deposited thereon in a thickness of 200 Å.

Example 18

An optical disk was prepared in the same manner as in Example 13 except that, after formation of the anthraquinone film as the recording layer in Example 13, Au was vapor-deposited thereon in a thickness of 150 Å.

The reflectivities of the recording layers and the preformat pattern portions (electrodeposit layers) of the optical cards and optical disks were measured by condensing and projecting laser light of wavelength of 830 nm onto the layers from the substrate side at a beam diameter of 3 μm for the cards and 0.5 μm for the disks. The positions of the light projection were nine spots randomly selected on the face of the cards and the disks. The average values of the reflectivities are shown in the Table below provided that the reflectivity of total reflection mirror is 100%.

The values of the contrast in Table 4 were calculated by the formula below:

$$(R_2 - R_1)/(R_2), \text{ if } R_2 > R_1$$

$$(R_1 - R_2)/(R_1), \text{ if } R_1 > R_2$$

The contrast values of the track-traversing signals were measured of the optical cards of Examples 7 to 12 and 17 in the same manner as in Example 4. The results are shown in Table 5-(1).

The contrast values of the track-traversing error signals of the optical disks of Examples 13 to 16 and 18 were measured in the same manner as in Example 1. The results are shown in Table 5-(2).

Example 19

An optical card substrate was prepared in the same manner as in Example 12 except that the amount of the deposition of carbon black in the electrodeposit layer was 70% by weight.

Reference Example 1

An optical card substrate was prepared in the same manner as in Example 19 except that the amount of the deposition of carbon black in the electrodeposit layer was 85% by weight.

The optical card substrates of Example 19 and Reference Example 1 were subjected to flection test as below.

The short sides of the optical card substrate was held as shown in FIG. 14A. The card was flexed as shown in FIG. 14B where the degree of flexion of the middle portion of the card as indicated by the symbol A is 15 mm. This flection was repeated 200 times. Thereafter the long sides of the card substrate was held in the same manner and the card was flexed 200 times to cause the flexion A of 5 mm. The state of the electrodeposit layer at the surface of the optical card was observed by optical microscopy. As the result, no peeling of the electrodeposit layer was observed with the optical card substrate of Example 19, while some cracks were observed at the surface of the electrodeposit layer of the optical card of Reference Example 1.

Reference Example 2

An optical card was prepared in the same manner as in Reference Example 1 except that the transfer-assisting layer was not provided. As the result of the flection test as in Reference Example 1, a part of the electrodeposit layer was found to have come off.

Example 20

An optical card original plate was prepared in the same manner as in Example 4 except that the dry thickness of the photoresist was 5 μm.

A cationic photosensitive electrodeposition resin composition was prepared as below. An organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with pure water to a volatile matter content of 90%.

To 80% by weight of the electrodeposition resin composition prepared as above, 20% by weight of glass beads having an average particle diameter of 0.05 μm was mixed to prepare a cationic electrodeposition paint.

The aforementioned original plate was immersed in the cationic electrodeposition paint containing the glass beads, and voltage of 30 V was applied for one minute between the electroconductive layer as the cathode and the metallic bath vessel as the anode. Then the original plate was taken out and washed sufficiently with water. The resin adhering to the electrode having been used for application of voltage became insoluble and was not washed off by water. After washing with water, the original plate was dried to obtain an electrodeposit layer.

On the face of the original plate having electrodeposit layer, a substrate made of polymethyl methacrylate of 100 mm wide, 100 mm length, and 0.4 mm thickness was laminated, and brought in close contact with the electrodeposit layer by means of a rubber-coated roll. The electrodeposit layer was entirely irradiated from above with a high-pressure mercury lamp at an intensity of 200 mJ/cm$^2$ to cure the electrodeposit layer. Thus an optical card substrate having a transferred preformat was obtained. The resulting electrodeposit layer had a thickness of 0.1 μm, and contained glass beads at a content of 25% by weight.

Then on the face of the substrate having the preformat pattern, a 3.0 wt % solution of an organic dye IR820 (made by Nippon Kayaku Co., Ltd) in diacetone alcohol was applied by spin-coating to prepare a recording layer having a dry thickness of 100±5 nm.

On this recording layer, an acrylic resin substrate of 0.3 mm thick was bonded by use of a hot-melt type ethylene-vinyl acetate adhesive. The resulting article was cut by laser to complete an optical card of 54 mm in width, 86 mm in length and 0.76 mm in thickness.

Example 21

An original plate for an optical card was prepared in the same manner as in Example 20.

A cationic photosensitive electrodeposition resin composition was prepared as below. An organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80%, and neutralized with 0.5 equivalent of acetic acid, and further diluted with pure water to a volatile matter content of 90%.

To 80% by weight of the electrodeposition resin composition prepared as above, 20% by weight of glass beads having an average particle diameter of 0.05 μm was mixed to prepare a cationic electrodeposition paint.

The aforementioned original plate was immersed in the cationic electrodeposition paint containing the glass beads, and voltage of 30 V was applied for one minute between the electroconductive layer as the cathode and the metallic bath vessel as the anode. Then the original plate was taken out and washed sufficiently with water. After washing, the original plate was dried to obtain an electrodeposit layer. The content of the glass beads in the electrodeposit layer is 25% by weight.

The original plate having the electrodeposit layer and a transparent substrate material made of polymethyl methacrylate of 0.4 mm thick having the electrodeposit layer were put together with the electrodeposit layer inside and with a sheet of ethylene-ethyl acrylate copolymer held therebetween. The combined sheets were bonded by means of a laminator at a roller temperature of 130° C.

The substrate material was then separated from the original plate, whereby the electrodeposit layer was transferred onto the transparent substrate material of polymethyl methacrylate. The transferred electrodeposit layer was cured by heating in an oven at 90° C. for 60 minutes, thereby an optical card substrate being obtained.

On the electrodeposit layer side of the optical card substrate, a layer of the cyanine dye represented by the structural formula below was provided as the recording layer:

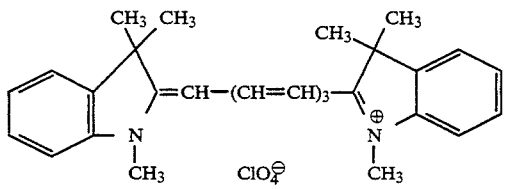

Thereon, a polymethyl methacrylate plate of 0.3 mm thick was bonded with interposition of a hot-melt adhesive composed of an ethylene-ethyl acrylate copolymer. The resulting article was punched in a size of a card of 54 mm wide and 86 mm long. Thus an optical card was completed.

Example 22

An original plate for an optical card was prepared in the same manner as in Example 20.

A cationic photosensitive electrodeposition resin composition was prepared as below.

An organic polymer was prepared as a binder by copolymerization of N,N-diethylaminoethyl methacrylate, styrane, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

To 80% by weight of the electrodeposition resin composition prepared as above, 20% by weight of glass beads having an average particle diameter of 0.1 μm was mixed to prepare a cationic electrodeposition paint.

The aforementioned original plate was immersed in the cationic electrodeposition paint, and voltage of 30 V was applied for one minute between the electroconductive layer as the cathode and the metallic bath vessel as the anode. Then the original plate was taken out and washed sufficiently with water. After washing, the original plate was dried to obtain an electrodeposit layer thereon.

With the original plate having the patterned electrodeposit layer, a casting mold unit as shown in FIG. 5B was constructed. Therein a liquid epoxy resin of the blending composition below was filled, and cured at 100° C. for 10 hours to cure the epoxy resin and the electrodeposit layer. The glass bead content in the electrodeposit layer was 25% by weight.

Blending Composition
Bisphenol A type epoxy resin: 100 parts by weight
Methylhexahydrophthalic anhydride: 88 parts by weight
2-Ethyl-4-methylimidazole: 0.5 parts by weight
2,6-Di-t-butyl-p-cresol: 1.0 part by weight The epoxy resin formed integrally with the electrodeposit layer was removed from the casting mold. Then the projection of the resin corresponding to the inlet of the resin was cut off by means of a sander. Thus an optical card substrate was obtained which is made of a transparent epoxy resin composition having a transferred electrodeposit layer of preformat.

The substrate exhibited only a little birefringency caused by molding strain since it was formed by cast molding. The phase difference in the substrate of 100×100 mm was 0.1–5 nm (double paths).

On the face of this preformat, a 3.1% by weight solution of organic dye IR820 (made by Nippon Kayaku Co., Ltd.) in diacetone alcohol was applied by spin coating, and was dried to form a recording layer of a thickness of 1000±50 Å. On the recoring layer, an ethylene-vinyl acetate copolymer type adhesive and a protecting layer composed of a vinyl chloride resin (0.3 mm thick) were successively laminated. These were bonded by hot press. Thus an optical card was completed.

Example 23

An original plate for an optical card was prepared in the same manner as in Example 20.

An electrodeposition resin composition was prepared by mixing 100 parts by weight of a curing-agent-containing acryl-melamine resin (trade name Hani Bright C-IL, made by Hani Kasei K.K.) and 20 parts by weight of an aqueous 10% solution of azodicarbonamide as a blowing agent. With this composition, electrodeposition was conducted by applying voltage of 30 V for one minute between the patterned original plate as the anode and a 0.5 mm-thick stainless steel plate as the counter electrode at a bath temperature of 25° C. and pH 8–9. The electrodeposit layer formed had a thickness of 2.5 μm. By washing with water after the electrodeposition, a patterned original plate was provided which had a preformat pattern composed of an electrodeposit layer containing a foaming ink. By using the resulting patterned original plate having the deposit, a casting mold unit was constructed as shown in FIG. 5B. In this mold unit, the liquid epoxy resin having the blending composition below was filled, and was cured at 100° C. for 10 hours.

Blending Composition
Bisphenol A type epoxy resin: 100 parts by weight
Methylhexahydrophthalic anhydride: 88 parts by weight
2-Ethyl-4-methylimidazole: 0.5 parts by weight
2,6-Di-t-butyl-p-cresol: 1.0 part by weight The cast-molded matter was removed from the casting mold. The projection of the resin corresponding to the inlet of the resin was cut off by means of a sander. Thus an optical card substrate was obtained which is made of a transparent epoxy resin composition having a transferred electrodeposit layer of preformat. In this stage, the electrodeposit layer slightly foamed owing to the heat of cast molding. The deposit layer was further allowed to foam by heating in an oven at 150° C. for 60 minutes. Thus an optical card substrate was provided which had an electrodeposit layer of void ratio of 30%.

The substrate exhibited only a little birefringency caused by molding strain since it was formed by cast molding. The phase difference in the substrate of 100×100 mm was 0.1–5 nm (double path).

On the face of this preformat, a 3.0% by weight solution of organic dye IR820 (made by Nippon Kayaku Co., Ltd.) in diacetone alcohol was applied by spin coating, and was dried to form a recording layer of a thickness of 100±5 nm. On the recoring layer, an ethylene-vinyl acetate copolymer type adhesive and a protecting layer composed of a vinyl chloride resin (0.3 mm thick) were successively laminated. Thus an optical card was completed.

Example 24

An original plate for an optical card was prepared in the same manner as in Example 20.

An electrodeposition resin composition was prepared by mixing 100 parts by weight of a curing-agent-containing acryl-melamine resin (trade name Hani Bright C-IL, made by Hani Kasei K.K.) and 20 parts by weight of an aqueous 10% solution of azodicarbonamide as a blowing agent. With this composition, electrodeposition was conducted by applying voltage of 30 V for one minute between the patterned original plate as the anode and a 0.5 mm-thick stainless steel plate as the counter electrode at a bath temperature of 25° C. and pH 8–9. The electrodeposit layer formed had a thickness of 2.5 μm. By washing with water after the electrodeposition, an original plate was provided which had a preformat composed of an electrodeposit layer containing a foaming ink. A 0.4 mm-thick transparent polycarbonate substrate material was brought into contact with the original plate having the electrodeposit layer, and the electrodeposit layer was transferred onto the polycarbonate substrate material by means of a rubber-coated roller. The substrate having the transferred electrodeposit layer was heated in an oven at 150° C. for 60 minutes to allow the electrodeposit layer to foam. Thus an optical card substate was completed which had an electrodeposit layer having a void ratio of 30%.

On the electrodeposit layer side of the substrate, a layer of the cyanine dye represented by the structural formula below was provided as a recording layer in a thickness of 1000 Å:
Thereon, as a protecting layer, a polycarbonate substrate of 0.3 mm thick was bonded with interposition of a hot-melt adhesive of a vinyl acetate copolymer type. The resulting article was punched in a size of a card of 54 mm wide and 86 mm long. Thus an optical card was completed.

Example 25

An $In_2O_3$ thin film was formed in a thickness of 500 Å by sputtering on a methyl methacrylate resin substrate of 0.4 mm thick, 10 cm long, and 6 cm wide.

On the $In_2O_3$ thin film, a photoresist (trade name: WAYCOAT HPR204, made by Fuji Hanto Electronics Technology K.K.) was applied in a thickness of 2 μm by a spinner, and the applied photoresist was pre-baked at 100° C. for 20 minutes. The photoresist layer was then exposed to UV light in a preformat pattern, and developed to form a resist pattern in stripe of 12 μm in pitch and 3 μm in width.

By utilizing the resist pattern as the mask, the $In_2O_3$ layer was etched by argon plasma to form a pattern of the transparent electrode.

An electrodeposition paint was prepared by mixing and dispersing 80% by weight of an anionic acryl-melamine resin (trade name: Hani Bright C-IL, made by Hani Kasei K.K.) and 20% by weight of phthalocyanine having particle diameters of 0.1 to 0.3 μm and diluting the resulting dispersion with deionized water to a solid content of 15% by weight. The above patterned transparent electrode substrate was immersed into this electrodeposition paint. Electrodeposition was conducted by employing the transparent electrode as the anode. The substrate having the electrodeposit was washed with water and heat-treated at 97° C. for 60 minutes for curing to form an electrodeposit layer of 3 μm wide. On the back face of the transparent electrode having the patterned preformat pattern layer, TeO layer was formed as a recording layer in a thickness of 300 Å by sputtering. Thereon a 0.3 mm-thick methyl methacrylate resin plate as a protecting substrate was bonded with an adhesive. The resulting article was cut in a size of 86 mm long and 54 mm wide to complete an optical card. The phthalocyanine content in the electrodeposit layer was 25% by weight.

The optical cards of Examples 20 to 25 were subjected to measurement of reflectivities of the recording layers and of the preformat pattern portion (electrodeposit layer) at randomly selected nine spots for each card by projecting laser light of wavelength of 830 nm condensed to a beam diameter of 3 μm. As shown in Table 6, sufficient difference of the reflectivity was observed between the recording layer and the electrodeposit layer.

The optical cards of Examples 20 to 25 were subjected to measurement of the track-transversing signal in the same manner as in Example 4. The maximum values, the minimum values, and the average values of the track-traversing signal were shown in Table 7. As shown in the table, uniform track signals were obtained.

Further the optical cards of Examples 20 to 25 were subjected to measurement of flection test in the same manner as in Example 4. The occurrence of peeling of the electrodeposit layer from the substrate was examined with an optical microscope (magnification: 2000×). The results are shown in Table 7.

Example 26

An optical card was prepared in the same manner as example 23 except that the void ratio of the electrodeposition layer was controlled to be 45%.

Reference Example 3

An optical card was prepared in the same manner as example 23 except that the void ratio of the electrodeposition layer was controlled to be 60%.

The optical card substrates of Example 24 and Reference Example 3 were subjected to flection test as below.

The short sides of the optical card substrate was held as shown in FIG. 14A. The card was flexed as shown in FIG. 14B where the degree of flexion of the middle portion of the card as indicated by the symbol A is 15 mm. This flection was repeated 150 times. Thereafter the long sides of the card substrate was held in the same manner and the card was flexed 150 times to cause the flexion A of 5 mm. The state of the electrodeposit layer at the surface of the optical card was examined by optical microscopy. As the result, no peeling of the electrodeposit layer was observed in the optical card substrate of Example 24, while a part of the electrodeposit layer came off in the optical card of Reference Example 3.

Example 27

A transparent electrode of indium oxide was formed by sputtering on a methyl methacrylate resin substrate of 0.4 mm thick.

On the resulting InO₂ layer, a resist mask was formed according to a photolithography technique. By utilizing this mask, the InO₂ was etched directly to pattern the transparent electrode into an optical disk preformat corresponding to a spiral tracking track of 0.6 μm in width and 1.6 μm in pitch. This was used as an original plate.

An electrodeposition paint was prepared by mixing and dispersing 80% by weight of an anionic acryl-melamine resin (trade name: Hani Bright C-IL, made by Hani Kasei K.K.) and 20% by weight of particulate diamond having an average particle diameter of 0.2 μm and diluting the resulting dispersion with deionized water to a solid content of 15% by weight. The original plate was immersed into this electrodeposition paint. Electrodeposition was conducted by employing the electrode of the original plate as the anode. The substrate having the electrodeposit was washed with water and heat-treated at 97° C. for 60 minutes for curing to form an electrodeposit layer of 0.3 μm. A glass disk substrate which had been optically polished on both faces and washed was superposed on this electrodeposit layer, and the electrodeposit layer was transferred onto the glass substrate by rubber coated roller to complete an optical disk substrate. The electrodeposit layer contained the diamond at a content of 25% by weight. On the face the substrate at the side having the transferred electrodeposit layer, phthalocyanine was vapor-deposited as a recording layer, thereby an optical disk being completed having a recording layer having refectivity of 14–16%.

Example 28

An optical disk original plate was prepared in the same manner as in Example 1.

An electrodeposition resin composition was prepared by mixing 100 parts by weight of a curing-agent-containing acryl-melamine resin (trade name Hani Bright C-IL, made by Hani Kasei K.K.) and 20 parts by weight of an aqueous 10% solution of N,N'-dinitrosopentamethylenetetramine as a blowing agent. With this composition, electrodeposition was conducted by applying voltage of 30 V for one minute between the patterned original plate as the anode and a 0.5 mm-thick stainless steel plate as the counter electrode at a bath temperature of 25° C. and pH 8–9. The electrodeposit layer formed was 2.5 μm. By washing with water after the electrodeposition, an original plate was provided which had a preformat composed of an electrodeposit layer containing a foaming ink.

A UV-curable resin (trade name UVX-SS120, made by Three Bond K.K.) was applied on a glass substrate in a shape of a disk of 5 inches in diameter and 1.2 mm in thickness. This resin-coated substrate was put together so as to have the electrodeposit layer and the adhesive layer inside. This superposed article was heated at 150° C. for 60 minutes to cure and bond the adhesive layer and the electrodeposit layer. Then the electrodeposit layer was separated and transferred from the original plate glass substrate to complete an optical disk provided with an electrodeposit layer having a void ratio of 30%.

On the transferred electrodeposit layer side of the disk substrate, a layer of the anthraquinone derivative represented by the structural formula below:

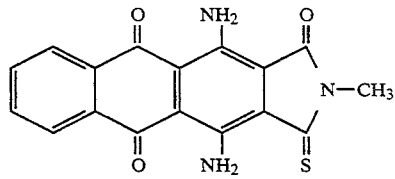

was provided as a recording layer in a thickness of 1100 Å so as to show the reflectivity of 20% to light of wavelength of from 780 to 830 nm. Thereto, as a protecting layer, a glass substrate of 1.2 mm thick was bonded with interposition of a spacer of 0.3 mm thick with a silicone type adhesive to complete an optical disk.

The contrast of track-traversing signals of the optical disks of Examples 27 and 28 was measured in the same manner as in Example 1. As shown in Table 8, the disks exhibited uniform track-traversing signals with high contrast.

Example 29

A transparent electrode of InO₂ (indium oxide) was formed in a thickness of 350 Å by sputtering on a glass substrate of 0.5 mm thick, 10 cm long, and 6 cm wide.

On the formed InO₂ layer, a resist pattern was formed corresponding to a tracking track in stripe of 3 μm wide and 12 μm pitch. By utilizing this resist pattern as the mask, the InO₂ was removed by etching with hydrochloric acid, and the resist was lifted off. Thus an optical card original plate was prepared which has, on a glass substrate, an InO₂ pattern in stripes of 3 μm wide and 12 μm pitch.

An electrodeposition paint was prepared by mixing and dispersing 100 parts by weight of an acryl-melamine resin (trade name: Hani Bright C-IL, made by Hani Kasei K.K.) and 10 parts by weight of alumina of an average particle diameter of 0.3 μm and covered with nonelectroplated nickel of 0.1 μm thick, and diluting the resulting dispersion with deionized water to a solid content of 5% by weight. With this electrodeposition paint, electrodeposition was conducted by employing the InO₂ layer of the original plate as the anode and a stainless plate as the counter electrode at a bath temperature of 25° C. and pH of 8–9 by application of voltage of 30 V for one minute. Thus an original plate was prepared which has electrodeposit layer in a pattern containing nickel-plated alumina.

With the original plate having the electrodeposit layer formed thereon, a casting mold cell as shown in FIG. 15 was constructed. Therein a epoxy resin of the blending composition below was filled, and cured at 100° C. for 10 hours.

Blending Composition
Bisphenol A type epoxy resin: 100 parts by weight
Methylhexahydrophthalic anhydride: 88 parts by weight
2-Ethyl-4-methylimidazole: 0.5 parts by weight 2,6-Di-t-butyl-p-cresol: 1.0 part by weight The cured matter was released from the casting mold cell. Then the projection of the resin corresponding to the resin inlet 6 was cut off by means of a sander. Thus an optical card substrate was obtained which comprises a transparent epoxy resin composition and a transferred recording layer.

The substrate exhibited only a little birefringency caused by molding strain since it was formed by cast molding. The phase difference in the substrate was 0.1–5 nm (double paths).

The electrodeposit layer contained the nickel-plated alumina at a content of 10% by weight.

The resulting optical card substrate was subjected to a flection test. The short sides of the optical card substrate was held as shown in FIG. 14A. The card was flexed as shown in FIG. 14B where the degree of flection of the middle portion of the card as indicated by the symbol A is 25 mm. This flection was repeated 500 times. Thereafter the long sides of the card substrate was held in the same manner and the card was flexed 500 times to cause the flection A of 15 mm. The state of the electrodeposition at the surface of the optical card was observed by optical microscopy. No peeling of the electrodeposit layer was observed.

Example 30

An electroconductive Te layer was formed as a recording layer in a thickness of 300 Å on a methyl methacrylate resin substrate of 0.3 mm thick, 10 cm long, and 6 cm wide.

On the formed TeO layer, a photoresist (trade name: WAYCOAT HPR204, made by Fuji Hanto Electronics Technology K.K.) was applied in a thickness of 2 μm by a spinner, and the applied photoresist was pre-baked at 100° C. for 20 minutes. The photoresist layer was then exposed to UV light in a preformat pattern, and developed to form a resist pattern in stripes of 12 μm in pitch and 9 μm in width.

A preformat pattern layer constituted of the electrodeposit layer was formed by conducting electrodeposition by employing as the electrode the electroconductive layer having the resist pattern insulating layer.

An electrodeposition paint was prepared by mixing and dispersing 80% by weight of an anionic acryl-melamine resin (trade name: Hani Bright C-IL, made by Hani Kasei K.K.) and 20% by weight of phthalocyanine having particle diameter of 0.1 to 0.3 μm and diluting the resulting dispersion with deionized water to a solid content of 15% by weight. The above patterned TeO-coated substrate was immersed into this electrodeposition paint. Electrodeposition was conducted by employing the TeO layer as the anode. The substrate having the electrodeposit was washed with water and heat-treated at 97° C. for 60 minutes for curing to form an electrodeposit layer of 3 μm wide. The content of the phthalocyanine in the electrodeposit layer was 25% by weight.

The resulting substrate having a patterned preformat pattern layer was bonded by an adhesive to a transparent substrate composed of methyl methacrylate resin of 0.4 mm thick, and was cut into an optical card size, thus an optical card being completed.

Example 31

In the optical card of Example 30, Al was sputtered to form a reflecting layer of 500% thick in place of the recording layer of TeO. On the reflecting layer, a resist pattern was formed which corresponds to modulated information.

A cationic electrodeposition resin composition was prepared as below. An organic polymer was prepared as a binder by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

To 80% by weight of the electrodeposition resin composition prepared as above, 20% by weight of carbon black having particle diameters of 0.5 to 1 μm was dispersed to prepare an electrodeposition solution.

The substrate having the patterned electroconductive layer prepared above was immersed in the electrodeposition solution, and voltage of 30 V was applied for one minute by employing the Al of the electroconductive layer as the cathode to form an electrodeposit layer. Then the original plate was taken out and washed sufficiently with water. The resin was cured by irradiation with a high-pressure mercury lamp (200 mJ/cm$^2$) to prepare on optical card substrate having an electrodeposit layer of 3.0 μm thick. The electrodeposit layer contained the carbon black at a content of 30% by weight.

The resulting substrate having a patterned preformat pattern layer was bonded by an hot-melt adhesive sheet of an ethylene-vinyl acetate copolymer to a transparent substrate composed of methyl methacrylate resin of 0.4 mm thick, and was cut into an optical card size. Thus an optical card being completed.

Example 32

Al was vapor-deposited in a thickness of 300 Å as an electroconductive layer on a glass plate of 0.5 mm thick, 10 cm long, and 6 cm wide.

On the Al layer, a photoresist (trade name: WAYCOAT HPR204, made by Fuji Hanto Electronics Technology K.K.) was applied in a thickness of 2 μm by a spinner, and the applied photoresist was pre-baked at 100° C. for 20 minutes. The photoresist layer was then exposed to UV light in a preformat pattern, and developed to form a resist pattern in stripes of 12 μm in pitch and 9 μm in width.

On this resist pattern, SiO$_2$ was sputtered in a thickness of 200 Å and then the resist was lifted off, thereby an original plate having an insulating SiO$_2$ layer formed on the electroconductive Al layer.

A cationic photosensitive resin composition was prepared as below. An organic polymer was prepared by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

To 80% by weight of the electrodeposition resin composition prepared as above, 20% by weight of phthalocyanine having particle diameters of 0.1 to 0.3 μm as a recording material was added and dispersed therein to prepare an electrodeposition paint for recording layer formation.

The substrate having the patterned electroconductive layer prepared above was immersed in the electrodeposition paint, and DC voltage of 30 V was applied for one minute by employing the Al of the electroconductive layer as the cathode to form an electrodeposit layer. Then the original plate was taken out and washed sufficiently with water. Thus an original plate for an optical card was provided.

The original plate having the electrodeposit layer was bonded to a transparent substrate made of polymethyl methacrylate of 0.4 mm thick with the electrodeposit layer held inside by an ethylene-ethyl acrylate copolymer sheet by means of a laminatot at a roller temperature of 130° C.

Then the substrate was separated from the original plate to transfer the electrodeposit layer to the transparent polymethyl methacrylate substrate. The substrate having the transferred electrodeposit layer was treated for curing with a high-pressure mercury lamp (200 mJ/cm$^2$). Further thereon, a substrate made of polymethyl methacrylate of 0.3 mm thick was bonded as a protecting layer by use of a hot-melt adhesive composed of an ethylene-ethyl acrylate copolymer. The resulting article was punched out in a card size of 54 mm wide and 86 mm long. Thus an optical card was completed which has a recording layer (phthalocyanine layer) of 9 μm wide arranged thereon. The content of the phthalocyanine in the recording layer of the optical card was 35% by weight.

Example 33

An original plate having an electrodeposit layer was prepared in the same manner as in Example 32. With this original plate, a casting mold unit as shown in FIG. 5B was constructed.

A liquid resin having the blending composition shown below was filled into the mold unit, and was cured at 120° C. for 10 hours to prepare an optical card substrate. The birefringency caused a phase difference of 0.1 to 3 nm.

Blending Composition
Methyl methacrylate: 70 parts
t-Butyl methacrylate: 25 parts
Polyethylene glycol dimethacrylate (molecular weight: 620): 5 parts A transparent substrate (0.4 mm thick) was prepared as described above.

On this transparent substrate, a substrate made of an acrylic resin of 0.4 mm thick formed by the cast molding but having no signal groove was bonded with a hot-melt type adhesive by means of a laminator. Thus an optical card was completed.

Example 34

A transparent electrode of InO$_2$ was formed by sputtering on a glass substrate of 0.5 mm thick, 10 cm long, and 6 cm wide.

On the InO$_2$ layer, a resist mask was formed by a similar photolithography technique as in Example 33. By utilizing the mask, InO$_2$ was etched directly to pattern the transparent electrode, thereby optical card original plate being prepared.

An electrodeposition paint for formation of a recording layer was prepared by mixing and dispersing 80% by weight of an anionic acryl-melamine resin (trade name: Hani Bright C-IL, made by Hani Kasei K.K.) and 20% by weight of phthalocyanine having particle diameter of 0.1 to 0.3 μm as a recording material, and diluting the resulting dispersion with deionized water to a solid content of 15% by weight. The above original plate was immersed into this electrodeposition paint for recording layer formation. Electrodeposition was conducted by employing the transparent electrode as the anode. The electrodeposited matter was washed with water and heat-treated at 97° C. for 60 minutes for curing to form an electrodeposit layer of 3 μm.

With this original plate having the electrodeposit layer, a casting mold cell was constructed as shown in FIGS. 4 and 5. Therein an epoxy resin of the blending composition below was filled, and cured at 100° C. for 10 hours.

Blending Composition
Bisphenol A type epoxy resin: 100 parts by weight
Methylhexahydrophthalic anhydride: 88 parts by weight
2-Ethyl-4-methylimidazole: 0.5 parts by weight
2,6-Di-t-butyl-p-cresol: 1.0 part by weight The cured matter was released from the casting mold cell. Then the protrusion of the resin corresponding to the inlet of the resin was cut off by means of a sander. Thus an optical card substrate was obtained which is made of a transparent epoxy resin composition having a transferred recording layer.

The substrate exhibited only a little birefringency caused by molding strain since it was formed by cast molding. The phase difference in the substrate was 0.1–5 nm (double paths).

The substrate was bonded to a protecting substrate (a methyl methacrylate resin of 0.3 mm thick) with a hot-melt type adhesive containing carbon black of an average particle size of 0.1 μm. The bonded article was cut into an optical card size (86 mm×54 mm). Thus an optical card was completed. The content of the phthalocyanine in the electrodeposit layer was 25% by weight.

Example 35

Al was vapor-deposited in a thickness of 300 Å as an electroconductive layer on a substrate made of a methyl methacrylate resin of 0.3 mm thick, 10 cm long, and 6 cm wide.

On the Al layer, a photoresist (trade name: WAY-COAT HPR204, made by Fuji Hanto Electronics Technology K.K.) was applied in a thickness of 2 μm by a spinner, and the applied photoresist was pre-baked at 100° C. for 20 minutes. The photoresist layer was then exposed to UV light in a preformat pattern, and developed to form a resist pattern in stripes of 12 μm in pitch and 7 μm and 2 μm in width.

By utilizing this resist pattern as the mask, the electroconductive layer was etched to form an electroconductive Al layer patterned for an recording layer and for preformat layer formation. A recording layer composed of the electrodeposit layer and the preformat layer composed of the electrodeposit layer were formed on the surfaces of this patterned respective electroconductive layers.

In this Example a cationic photosensitive resin composition was prepared as below. An organic polymer was prepared by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

For recording layer formation, to 80% by weight of the electrodeposition resin composition prepared as above, 20% by weight of phthalocyanine having particle diameters of 0.1 to 0.3 μm as a recording material was dispersed to prepare an electrodeposition paint. On the other hand, for preformat layer formation, 30% by weight of particulate nickel of a particle diameter of 0.1 μm was dispersed in the same resin composition as a electrodeposition paint.

The substrate having the patterned electroconductive layer prepared above was immersed in the electrodeposition paint for recording layer formation, and DC voltage of 30 V was applied for one minute by employing the electroconductive layer as the cathode to form an electrodeposit layer. Then the substrate was immersed in the electrodeposition paint for preformat layer formation, and the same procedure was practiced. The original plate was washed sufficiently with water. Then the electrodeposit layer was cured by irradiation with a high-pressure mercury lamp (200 mJ/cm$^2$) to form a recording layer and a preformat layer each having a thickness of 3.0 μm.

The original plate having the patterned recording layer and the preformat pattern layer was bonded to a transparent substrate made of polymethyl methacrylate of 0.4 mm thick by use of an adhesive. The resulting article was cut in an optical card size to complete an optical card.

In the above optical card, the content of the phthalocyanine in the recording layer was 25% by weight, and the content of Ni in the preformat layer was 35% by weight.

Example 36

A copper layer was formed in vacuum as an electroconductive layer in a thickness of 0.8±0.2 μm on a glass plate of 0.4 mm thick and 5 inches square. This electroconductive layer was patterned by etching in the same manner as in Example 35 by the photolithography technique by use of the photoresist.

An optical card original plate having a recording layer composed of an electrodeposit layer and a preformat layer composed of an electrodeposit layer was prepared by forming the electrodeposit layer in the same manner as in Example 35.

A substrate material of polymethyl methacrylate of 0.4 mm thick, 10 cm long, and 6 cm wide was brought into contact with the face of the electrodeposit layer on the original plate. The electrodeposit layer was cured and transferred onto the substrate material by irradiation of light from a high-pressure mercury lamp (200 mJ/cm$^2$).

The transparent substrate material having the transferred electrodeposit layer was bonded to a protecting substrate (methyl methacrylate resin of 0.3 mm thick) with interposition of an adhesive layer, and the bonded article was cut into an optical card size (86 mm×54 mm) to complete an optical card.

Example 37

A glass plate of 5 mm thick, 100 mm long, and 100 wide was mirror-finished on the one face. On the mirror-finished face, Al was vapor-deposited in a thickness of 300 Å as an electroconductive layer.

On the Al layer, a photoresist (trade name: WAYCOAT HPR204, made by Fuji Hanto Electronics Technology K.K.) was applied in a thickness of 2 μm by a spinner, and the applied photoresist was pre-baked at 100° C. for 20 minutes. The photoresist layer was then exposed to UV light in a recording region pattern and a preformat pattern, and developed to form a resist pattern in stripes of 12 μm in pitch and 7 μm and 2 μm in width. By utilizing this resist pattern as the mask, the electroconductive layer was etched to prepare an original plate having a patterned electroconductive Al layer to be used for forming a recording layer and a preformat layer.

A cationic photosensitive resin composition was prepared as below. An organic polymer was prepared by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer binder, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

To 80% by weight of the electrodeposition resin composition prepared as above, 20% by weight of phthalocyanine having particle diameters of 0.1 to 0.3 μm as a recording material was added and dispersed therein to prepare an electrodeposition paint for recording layer formation. The original plate prepared above was immersed in the electrodeposition paint, and DC voltage of 30 V was applied for one minute by employing the electroconductive layer for recording layer formation as the cathode to form an electrodeposit layer for the recording layer.

On the other hand, for preformat layer formation, to 80% by weight of the same electrodeposition resin composition as used above, 20% by weight of particulate nickel having an average particle diameter of 0.1 μm was added and dispersed therein to prepare an electrodeposition paint for preformat layer formation. In the same manner as above a preformat layer was formed further on the original plate.

The original plate having a recording layer and a preformat pattern formed sequentially as above was washed sufficiently with water, and the layers are cured by irradiation of light of a high-pressure mercury lamp (200 mJ/cm$^2$) to form a recording layer of 3.0 μm and a preformat layer on the patterning original plate substrate.

The patterning original plate having the electrodeposit layer was bonded to a transparent substrate made of polymethyl methacrylate of 0.4 mm thick with the electrodeposit layer held inside by an ethylene-ethyl acrylate copolymer sheet by means of a laminator at a roller temperature of 130° C.

The substrate was separated from the patterning original plate to transfer the electrodeposit layers to the transparent polymethyl methacrylate substrate. The phthalocyanine content in the recording layer was 25% by weight, and the Ni content in the preformat layer was 30% by weight.

On the substrate having the patterned recording layer and the preformat pattern layer, a hot-melt adhesive composed of an ethylene-ethyl acrylate copolymer, and a 0.3 mm-thick polymethyl methacrylate substrate as a protecting layer were laminated sequentially.

The laminated article was cut in an optical card size (86 mm×54 mm) to complete an optical card.

Example 38

An optical card original plate which has a recording layer composed of an electrodeposit layer and a preformat layer composed of an electrodeposit layer was prepared in the same manner as in Example 37. A casting mold unit was prepared by using the resulting original plate as shown in FIG. 15.

A liquid resin having the blending composition shown below was filled into the mold unit, and was cured at 120° C. for 10 hours to prepare an optical card substrate. The substrate exhibited little birefringency caused by molding strain, since it was formed by cast molding. The phase difference was 0.1 to 0.3 nm.

Blending Composition
Methyl methacrylate: 70 parts
t-Butyl methacrylate: 25 parts
Polyethylene glycol dimethacrylate (molecular weight: 620): 5 parts Onto the substrate having the patterned recording layer and the preformat pattern layer, another substrate made of 0.3 mm-thick methyl methacrylate resin was bonded with an adhesive. The bonded article was cut in an optical card size (86 mm×54 mm) to complete an optical card.

Example 39

An original plate having an electroconductive Al layer for recording layer formation and another electroconductive Al layer for preformat layer formation was prepared in the same manner as in Example 37.

An electrodeposition resin composition was prepared in the same manner as in Example 37.

To 80% by weight of the above electrodeposition resin composition, 20% by weight of particulate Te (tellurium) having particle diameters of 0.1 to 0.3 μm as a recording material was added and dispersed therein to prepare an electrodeposition paint for recording layer formation.

Separately, to 80% by weight of the same electrodeposition resin composition as used above, 20% by weight of particulate carbon black having particle diameters of 0.1-0.5 μm was added and dispersed therein to prepare an electrodeposition paint for preformat layer formation.

By use of the above electrodeposition paints, electrodeposit layers were formed on the patterning original plate in the same manner as in Example 37.

With the original plate having the electrodeposit layers formed thereon, a casting mold unit was constructed in the same manner as in Example 38. Therein a liquid resin of the blending composition below was filled, and cured at 100° C. for 10 hours.

Blending Composition
Bisphenol A type epoxy resin: 100 parts by weight
Methylhexahydrophthalic anhydride: 88 parts by weight
2-Ethyl-4-methylimidazole: 0.5 parts by weight
2,6-Di-t-butyl-p-cresol: 1.0 part by weight The cured matter was released from the casting mold cell. Then the projection of the resin corresponding to the resin inlet was cut off by means of a sander. Thus an optical card substrate was obtained which comprises a transparent epoxy resin composition having a recording layer composed of an electrodeposit layer and a preformat layer composed of another electrodeposit layer.

The substrate exhibited only a little birefringency caused by molding strain since it was formed by cast molding. The phase difference in the substrate was 0.1–0.5 nm (double paths).

Onto the resulting recording layer and preformat pattern layer on the substrate, an hot-melt type adhesive and a protecting substrate were sequentially laminated, and bonded by means of a laminator, and the laminated article was cut in an optical card size to complete an optical card.

The content of the particulate Te in the recording layer was 35% by weight, and the content of the carbon black in the preformat layer was 25% by weight.

The values of the maximum, the minimum, and the average of the contrast of the track-traversing signals were measured of the optical cards of Examples 30 to 39 in the same manner as in Example 4. The results are shown in Table 9.

Example 40

A transparent electrode of In$_2$O$_3$ was formed by sputtering on a glass substrate of 0.5 thick, 10 long, and 6 cm wide.

A resist pattern corresponding a tracking track in a spiral shape of 0.6 μm wide and 1.6 μm pitch was formed on the In$_2$O$_3$ layer. By utilizing this mask, a transparent electrode was patterned by direct etching of the In$_2$O$_3$.

In this Example, an electrodeposition paint for formation of a recording layer was prepared by mixing and dispersing 80% by weight of an anionic acryl-melamine resin (trade name: Hani Bright C-IL, made by Hani Kaset K.K.) and 20% by weight of phthalocyanine having particle diameter of 0.1 to 0.3 μm and diluting the resulting dispersion with deionized water to a solid content of 15% by weight. The above patterned original plate was immersed into this electrodeposition paint. Electrodeposition was conducted by employing the transparent electrode as the anode. The electrodeposited matter was washed with water and heat-treated at 97° C. for 60 minutes for curing to prepare an original plate having an electrodeposit layer of 3 μm wide formed thereon.

On a disk-shaped acrylic substrate of 5 inches in diameter and 1.2 mm in thickness, a UV-curable resin (trade name UVX-SS120, made by Three Bond K.K.) was applied. This substrate was put on the original plate having electrodeposit layer with the electrodeposit layer and the adhesion layer held inside, and the adhesion layer and the electrodeposit layer were cured and bonded by irradiation of light of a metal halide lamp from the top over the entire layer at the intensity of 500 J/cm$^2$. Then the substrate was separated from the patterning original substrate to transfer the electrodeposit layer onto the acrylic substrate. The content of phthalocyanine was 25% by weight.

On the face of the substrate having the transferred electrodeposit layer, an acrylic substrate of 1.2 mm thick was bonded as a protecting layer with interposition of spacers having an average particle diameter of 0.3 mm to prepare a disk-shaped recording medium which has tracks comprising a recording layer (phthalocyanine layer) of 1 μm wide arranged in pitch of 1.6 μm.

Example 41

A glass plate of 5 mm thick, 100 mm long, and 100 wide was mirror-finished at one face. On the minor-finished face, Al was vapor-deposited in a thickness of 300 Å as an electroconductive layer.

On the Al layer, a photoresist (trade name: WAY-COAT HPR204, made by Fuji Hanto Electronics Technology K.K.) was applied in a thickness of 2 μm by a spin coater, and the applied photoresist was pre-baked at 100° C. for 20 minutes. The photoresist layer was then exposed to UV light in a recording-region pattern and a preformat pattern, and developed to form a resist pattern in stripes of 1.6 μm in pitch and 1 μm and 2 μm in width. By utilizing this resist pattern as the mask, the electroconductive layer was etched to form an original plate having an electroconductive Al layer patterned for an recording layer and for preformat layer formation respectively.

A cationic photosensitive resin composition was prepared as below. An organic polymer was prepared by copolymerization of N,N-diethylaminoethyl methacrylate, styrene, ethyl acrylate, and a compound derived by equimolar reaction of p-hydroxybenzoic acid with glycidyl acrylate. The organic polymer was constituted of the above monomer in molar ratio of 3:2:4:1, and had a weight-average molecular weight of 70,000. 80 parts by weight of the above organic polymer, 0.5 part by weight of 2,2-dimethoxy-2-phenylacetophenone, and 14.5 parts by weight of trimethylolpropane triacrylate were mixed to prepare a cationic photosensitive resin composition. This composition was diluted with ethylene glycol monobutyl ether to have a volatile matter content of 80% by weight, and neutralized with 0.5 equivalent of acetic acid, and further diluted with pure water to a volatile matter content of 90% by weight.

For recording layer formation, to 80% by weight of the electrodeposition resin composition prepared as above, 20% by weight of particulate tellurium having particle diameters of from 0.1 to 0.3 μm as a recording material was added and dispersed therein to prepare an electrodeposition paint. The original plate prepared above was immersed in the electrodeposition paint, and DC voltage of 30 V was applied for one minute by employing the electroconductive layer for recording layer formation as the cathode to form an electrodeposit layer for the recording layer.

On the other hand, for preformat layer formation, 15% by weight of particulate carbon black of a particle diameter of from 0.1 to 0.5 μm was dispersed in 80% by weight of the same resin composition as above to prepare a electrodeposition paint for preformat layer formation. A preformat pattern was formed in the same manner as above.

The substrate having recording layer and the preformat pattern successively laminated thereon was washed sufficiently with water. Then the electrodeposit layer was cured by irradiation with light of a high-pressure mercury lamp (200 mJ/cm$^2$) to form a recording layer and a preformat layer each having a thickness of 3.0 μm on the original plate substrate.

A substrate made of polymethyl methacrylate of 1.2 mm thick was covered with a UV-curable resin (trade name: UVX-SS120, made by Three Bond K.K.) by spinner coating in a thickness of 2 to 4 μm. The uncured coated layer was put on the top of the electrodeposit layer of the patterning original plate substrate. Curing was conducted by irradiation of light of a metal halide lamp (120 W/cm) at an intensity of 500 J/cm$^2$ to bond the electrodeposit layer to the substrate. The substrate was separated from the original plate substrate, thereby the electrodeposit layer being transferred onto the acrylic substrate. The content of tellurium in the recording layer was 35% by weight, and the content of carbon black in the preformat layer was 20% by weight.

Thereon, an ethylene-vinyl acetate copolymer type adhesive, and polymethyl methacrylate of 1.2 mm thick as a protecting layer were laminated sequentially. The laminated article was cut in a disk shape of 5 inches in diameter to complete an optical disk.

The track-traversing signals was measured with the optical disks of Examples 40 and 41 in the same manner as in Example 1. The resulting are shown in Table 10.

The optical cards prepared in Examples 37 and 38 were used for recording information on the recording layer under the conditions of the recording light wavelength of 830 nm, the beam diameter of 2.5 μm, the laser power of 18 mW, the card moving speed of 480 mm/sec, and the duty of 1:1, and reproducing the recorded information under the conditions of the recording light wavelength of 780 nm, the beam diameter of 3 μm, and the laser power of 0.1 mW by means of an optical card recording-reproducing apparatus (made by Canon K.K.).

The contrast of the reproduction signals was 40 dB for the optical card of Example 37, and 48 dB for the one of Example 38. The both cards were capable of reproduction of signals with satisfactory C/N.

TABLE 1

| | Contrast | | |
|---|---|---|---|
| | $r_{150}$ | $r_{70}$ | $r_{30}$ |
| Example | | | |
| 1 | 0.61 | 0.59 | 0.58 |
| 2 | 0.60 | 0.57 | 0.59 |
| 3 | 0.41 | 0.40 | 0.41 |
| Comparative Example | | | |
| 1 | 0.62 | 0.42 | 0.59 |
| 2 | 0.37 | 0.40 | 0.27 |

TABLE 2

| | Contrast | | | | | |
|---|---|---|---|---|---|---|
| | C | | | D | | |
| | Max. | Min. | Av. | Max. | Min. | Av. |
| Example 4 | 0.40 | 0.36 | 0.38 | 0.39 | 0.35 | 0.37 |
| Comparative Example 3 | 0.40 | 0.30 | 0.35 | 0.30 | 0.19 | 0.26 |

TABLE 3 - (1)

| | Contrast | | |
|---|---|---|---|
| | $r_{150}$ | $r_{70}$ | $r_{30}$ |
| Example 5 | 0.50 | 0.53 | 0.51 |

TABLE 3 - (2)

| | Contrast | | | | | |
|---|---|---|---|---|---|---|
| | C | | | D | | |
| | Max. | Min. | Av. | Max. | Min. | Av. |
| Example 6 | 0.41 | 0.38 | 0.39 | 0.42 | 0.38 | 0.40 |

TABLE 4

| Example | Reflectivity of Recording Layer (%): $R_1$ | Reflectivity of Preformat Pattern Portion (%): $R_2$ | Contrast |
|---|---|---|---|
| 7 | 15 | 30 | 0.5 |
| 8 | 15 | 4 | 0.73 |
| 9 | 25 | 4 | 0.84 |
| 10 | 15 | 40 | 0.63 |
| 11 | 25 | 50 | 0.5 |
| 12 | 15 | 4 | 0.73 |
| 13 | 12 | 60 | 0.8 |
| 14 | 14~15 | 60~70 | 0.75~0.8 |
| 15 | 25 | 4 | 0.68 |
| 16 | 15 | 60 | 0.75 |
| 17 | 20 | 30 | 0.33 |
| 18 | 20 | 60 | 0.67 |

TABLE 5 - (1)

| | Contrast | | | | | |
|---|---|---|---|---|---|---|
| | C | | | D | | |
| Example | Max. | Min. | Av. | Max. | Min. | Av. |
| 7 | 0.51 | 0.47 | 0.49 | 0.52 | 0.50 | 0.51 |
| 8 | 0.72 | 0.70 | 0.71 | 0.75 | 0.74 | 0.75 |
| 9 | 0.85 | 0.82 | 0.84 | 0.85 | 0.80 | 0.84 |
| 10 | 0.61 | 0.58 | 0.60 | 0.67 | 0.64 | 0.66 |
| 11 | 0.49 | 0.47 | 0.48 | 0.52 | 0.51 | 0.52 |
| 12 | 0.72 | 0.69 | 0.70 | 0.77 | 0.75 | 0.76 |
| 17 | 0.32 | 0.32 | 0.32 | 0.34 | 0.34 | 0.34 |

TABLE 5 - (2)

| | Contrast | | |
|---|---|---|---|
| Example | $r_{150}$ | $r_{70}$ | $r_{30}$ |
| 13 | 0.77 | 0.79 | 0.82 |
| 14 | 0.75 | 0.8 | 0.77 |
| 15 | 0.66 | 0.68 | 0.70 |
| 16 | 0.77 | 0.73 | 0.75 |
| 18 | 0.67 | 0.66 | 0.69 |

TABLE 6

| Example | Reflectivity of Recording Layer (%) | Reflectivity of Preformat Pattern Portion (%) |
|---|---|---|
| 20 | 15 | 4 |
| 21 | 15 | 5 |
| 22 | 15 | 5 |
| 23 | 15 | 5 |
| 24 | 16 | 4 |
| 25 | 25 | 6 |

TABLE 7

| | Contrast | | | | | | Peeling of electrodeposition layer after flection test |
|---|---|---|---|---|---|---|---|
| | C | | | D | | | |
| Example | Max. | Min. | Av. | Max. | Min. | Av. | |
| 20 | 0.73 | 0.72 | 0.73 | 0.74 | 0.72 | 0.73 | no |
| 21 | 0.69 | 0.66 | 0.67 | 0.68 | 0.65 | 0.67 | no |
| 22 | 0.69 | 0.65 | 0.66 | 0.68 | 0.65 | 0.67 | no |
| 23 | 0.68 | 0.64 | 0.67 | 0.69 | 0.65 | 0.68 | no |
| 24 | 0.76 | 0.73 | 0.74 | 0.75 | 0.74 | 0.75 | no |
| 25 | 0.79 | 0.72 | 0.77 | 0.77 | 0.73 | 0.74 | no |

TABLE 8

| | Contrast | | |
|---|---|---|---|
| Example | $r_{150}$ | $r_{70}$ | $r_{30}$ |
| 27 | 0.73 | 0.72 | 0.73 |
| 28 | 0.77 | 0.79 | 0.80 |

TABLE 9

| | Contrast | | | | | |
|---|---|---|---|---|---|---|
| | C | | | D | | |
| Example | Max. | Min. | Av. | Max. | Min. | Av. |
| 30 | 0.41 | 0.39 | 0.4 | 0.4 | 0.39 | 0.4 |
| 31 | 0.82 | 0.78 | 0.8 | 0.81 | 0.76 | 0.78 |
| 32 | 0.67 | 0.66 | 0.67 | 0.68 | 0.65 | 0.66 |
| 33 | 0.66 | 0.64 | 0.65 | 0.67 | 0.64 | 0.65 |
| 34 | 0.68 | 0.65 | 0.67 | 0.68 | 0.65 | 0.66 |
| 35 | 0.72 | 0.68 | 0.70 | 0.72 | 0.69 | 0.71 |
| 36 | 0.69 | 0.66 | 0.68 | 0.70 | 0.66 | 0.68 |
| 37 | 0.72 | 0.67 | 0.70 | 0.72 | 0.68 | 0.71 |
| 38 | 0.73 | 0.72 | 0.73 | 0.73 | 0.71 | 0.72 |
| 39 | 0.85 | 0.80 | 0.82 | 0.87 | 0.81 | 0.85 |

TABLE 10

| | Contrast | | |
|---|---|---|---|
| Example | $r_{150}$ | $r_{70}$ | $r_{30}$ |
| 40 | 0.63 | 0.65 | 0.65 |
| 41 | 0.85 | 0.82 | 0.83 |

What is claimed is:

1. An optical recording medium comprising: a substrate, a recording layer, and a protecting layer, said substrate comprising an electrodeposit layer arranged in a pattern on the surface of said substrate, the electrodesposit layer pattern being one of (i) a preformat pattern and (ii) an inverse of the preformat pattern.

2. The optical recording medium of claim 1, wherein said electrodeposit layer constitutes the preformat pattern.

3. The optical recording medium of claim 1, wherein said electrodeposit layer constitutes the inverse pattern of the preformat pattern.

4. The optical recording medium of claim 1, wherein said medium further comprises an adhesive layer formed on said recording layer, and wherein the thickness of the electrodeposit layer is substantially equal to a value of $\lambda/4n_{OP}$ times an odd number or a value of $\lambda/8n_{OP}$ where $\lambda$ represents the wavelength of a recording and/or reproducing light beam passing through the protecting layer to irradiate the optical recording medium and $n_{OP}$ represents the refractive index of said adhesive layer.

5. The optical recording medium of claim 1, wherein the thickness of the electrodeposit layer is substantially equal to a value of $\lambda/4n_{ED}$ times an odd number or a value of $\lambda/8n_{ED}$ where $\lambda$ represents the wavelength of a recording and/or reproducing light beam passing through the substrate to irradiate the optical recording medium and $n_{ED}$ represents the refractive index of said electrodeposit layer.

6. The optical recording medium of claim 1, wherein said electrodeposit layer is provided on the surface of said substrate with interposition of a transfer-assisting layer.

7. The optical recording medium of claim 1, wherein said electrodeposit layer has a reflectivity different from a reflectivity of the recording layer with respect to a light beam for information recording or information reproduction introduced to the optical recording medium.

8. The optical recording medium of claim 7, wherein said electrodeposit layer has a reflectivity lower than the reflectivity of said recording layer.

9. The optical recording medium of claim 8, wherein said recording layer has a reflectivity in a range of from 10 to 60% to light of wavelength of from 780 to 830 nm.

10. The optical recording medium of claim 9, wherein said electrodeposit layer contains carbon black at a content in a range of from 2 to 75% by weight.

11. The optical recording medium of claim 8, wherein said electrodeposit layer contains light-scattering particles.

12. The optical recording medium of claim 11, wherein said light-scattering particles comprises glass beads or diamond particles.

13. The optical recording medium of claim 11, wherein said light-scattering particles have an average particle diameter in a range of from 0.05 to 5 $\mu$m.

14. The optical recording medium of claim 11, wherein said electrodeposit layer contains said light-scattering particles at a content in a range of from 5 to 50% by weight.

15. The optical recording medium of claim 11, wherein said recording layer has a reflectivity in a range of from 10 to 60% to light of wavelength of from 780 to 830 nm.

16. The optical recording medium of claim 8, wherein said electrodeposit layer is porous.

17. The optical recording medium of claim 16, wherein said electrodeposit layer has a void ratio in a range of from 10 to 50%.

18. The optical recording medium of claim 16, wherein said recording layer has a reflectivity in a range of from 10 to 60% to light of wavelength of from 780 to 830 nm.

19. The optical recording medium of claim 7, wherein said electrodeposit layer has a reflectivity substantially higher than the reflectivity of said recording layer, and a reflective layer is provided on said substrate with interposition of the recording medium.

20. The optical recording medium of claim 19, wherein said recording layer has a reflectivity in a range of from 10 to 60% to light of wavelength of from 780 to 830 nm.

21. The optical recording medium of claim 19, wherein said reflective layer is composed of aluminum or gold.

22. The optical recording medium of claim 1, wherein said electrodeposit layer has a reflectivity higher than a reflectivity of said recording layer.

23. The optical recording medium of claim 22, wherein said electrodeposit layer contains particulate metal.

24. The optical recording medium of claim 23, wherein said the electrodeposit layer contains said particulate metal in an amount of from 2 to 75% by weight.

25. The optical recording medium of claim 22, wherein said electrodeposit layer contains powdery nonmetal metallized at the surface.

26. The optical recording medium of claim 25, wherein said electrodeposit layer contains powdery nonmetal metallized at the surface at a content of from 1 to 40% by weight.

27. The optical recording medium of claim 26, wherein said powdery nonmetal is at least one selected from powdery ceramics, powdery natural mica, and powdery resins.

28. The optical recording medium of claim 25, wherein said powdery nonmetal has an average diameter in a range of from 0.05 to 0.5 $\mu$m.

29. The optical recording medium of claim 25, wherein said metallized powdery nonmetal has a metal layer in a thickness ranging from 0.03 to 0.2 $\mu$m on the surface.

30. The optical recording medium of claim 22, wherein said recording layer has a reflectivity in a range of from 5 to 40% to light of wavelength of from 780 to 830 nm.

31. An optical recording medium, comprising:
a substrate, an electroconductive layer on said substrate, and an electrodeposit layer in a pattern provided on said electroconductive layer, the electrodeposit layer pattern being one of (i) a preformat pattern and (ii) an inverse of the preformat pattern.

32. The optical recording medium of claim 31, wherein said electrodeposit layer has a reflectivity different from the reflectivity of said electroconductive layer with respect to a light beam for information recording or information reproduction introduced to said optical recording medium.

33. The optical recording medium of claim 32, wherein said electrodeposit layer has a reflectivity lower than the prescribed reflectivity of said electroconductive layer.

34. The optical recording medium of claim 33, wherein said electrodeposit layer contains carbon black.

35. The optical recording medium of claim 31, wherein said electroconductive layer is a recording layer.

36. The optical recording medium of claim 35, wherein said recording layer has a reflectivity in a range of from 10 to 60% to light of wavelength of from 780 to 830 nm.

37. The optical recording medium of claim 36, wherein said recording layer contains a metal or a metal oxide.

38. The optical recording medium of claim 37, wherein said recording layer contains TeO.

39. An optical recording medium, comprising:
a substrate, and a recording layer comprising an electrodeposit layer in a pattern provided on said substrate, the electrodeposit layer pattern being one of (i) a preformat pattern and (ii) an inverse of the preformat pattern.

40. The optical recording medium of claim 39, wherein said electrodeposit layer contains a recording material.

41. The optical recording medium of claim 40, wherein said recording material contains at least one material selected from organic dyes, carbon black, metals, and semimetals.

42. The optical recording medium of claim 41, wherein said organic dye is phthalocyanine.

43. The optical recording medium of claim 40, wherein said electrodeposit layer contains the recording material at a content in a range of from 5 to 50% by weight.

44. The optical recording medium of claim 39, wherein said optical recording medium is an optical disk.

45. The optical recording medium of claim 39, wherein said optical recording medium is an optical card.

46. The optical recording medium of claim 39, wherein said recording layer is provided on the substrate with interposition of a transfer-assisting layer.

47. An optical recording medium, comprising: a substrate, and a preformat layer comprising an electrodeposit layer in a pattern and a recording layer comprising another electrodeposit layer provided on said substrate, the electrodeposit layer pattern being one of (i) a preformat pattern and (ii) an inverse of the preformat pattern.

48. The optical recording medium of claim 47, wherein said recording layer is provided in a pattern corresponding to the preformat pattern.

49. The optical recording medium of claim 48, wherein said electrodeposit layer constituting said recording layer contains a recording material.

50. The optical recording medium of claim 47, wherein said recording layer has a reflectivity in a range of from 5 to 40%, and said preformat layer has a reflectivity substantially higher than that of said recording layer, with respect to light of wavelength of 780 to 830 nm.

51. The optical recording medium of claim 50, wherein said recording layer contains phthalocyanine, and said preformat layer contains a powdery metal or a powdery nonmetal coated with a metal at the surface.

52. The optical recording medium of claim 47, wherein said recording layer has a reflectivity in a range of from 10 to 60%, and said preformat layer has a reflectivity substantially lower than that of said recording layer, with respect to light of wavelength of 780 to 830 nm.

53. The optical recording medium of claim 52, wherein said recording layer contains Te, and the preformat layer contains carbon black.

54. The optical recording medium of claim 52, wherein said recording layer contains Te, and said preformat layer is porous.

55. An optical recording medium comprising:
a recording layer comprising an electrodeposit layer provided in a pattern, said recording layer being embedded in a substrate without protruding from a surface of the substrate, and the electrodeposit layer pattern being one of (i) a preformat pattern and (ii) an inverse of the preformat pattern.

56. An optical recording medium, comprising:
a recording layer comprising an electrodeposit layer and a preformat layer comprising another electrodeposit layer provided in a pattern, said recording layer and said preformat layer being embedded in a substrate without protruding from a surface of the substrate, and the electrodeposit layer pattern being one of (i) a preformat pattern and (ii) an inverse of the preformat pattern.

57. An optical recording medium, comprising:
a substrate, and an electrodeposit layer formed on said substrate in a pattern, the electrodeposit layer pattern being one of (i) a preformat pattern and (ii) an inverse of the preformat pattern.

58. The optical recording medium of claim 57, wherein said electrodeposit layer is embedded in and substrate without protruding from a surface of said substrate.

* * * * *

UNITED STATES PATENT AND TRADEMARK OFFICE
CERTIFICATE OF CORRECTION

PATENT NO. : 5,447,767
DATED : September 5, 1995
INVENTOR(S) : Tanabe et al

It is certified that error appears in the above-indentified patent and that said Letters Patent is hereby corrected as shown below:

Column 1

Line 61, "X ray" should read --X-rays--.

Column 3

Line 37, "the" (second occurrence) should be deleted.

Column 5

Line 20, "prefermat," should read --preformat,--;
    Line 24, "prefermat" should read --preformat--;
    Line 30, "prefermat" should read --preformat--; and
    Line 55, "step" should read --step.--.

Column 9

Line 36, "functional" (second occurrence) should be deleted.

Column 11

Line 1, "thermoserring" should read --thermosetting--; and
    Line 12, "may" should read --may be--.

UNITED STATES PATENT AND TRADEMARK OFFICE
CERTIFICATE OF CORRECTION

PATENT NO. : 5,447,767
DATED : September 5, 1995
INVENTOR(S) : Tanabe et al

It is certified that error appears in the above-indentified patent and that said Letters Patent is hereby corrected as shown below:

Column 12

Line 19, "thermoser-" should read --thermoset- --;
   Line 20, "ring" should read --ting--; and
   Line 63, "FIG. B," should read --FIG. 5B,--.

Column 15

Line 18, "an" should read --a--; and
   Line 22, "an" (second occurrence) should read --a--.

Column 18

Line 5, "form" should read --from--.

Column 19

Line 18, "particles," should --read particle,--; and
   Line 34, "migrates" should read --migrate--.

Column 28

Line 58, "Kaset" should read --Kasei--.

Column 31

Line 63, "weight" should read --weight.--.

UNITED STATES PATENT AND TRADEMARK OFFICE
CERTIFICATE OF CORRECTION

PATENT NO. : 5,447,767
DATED : September 5, 1995
INVENTOR(S) : TANABE ET AL.

It is certified that error appears in the above-indentified patent and that said Letters Patent is hereby corrected as shown below:

Column 32

Line 40, "curing-agentcontaining" should read --curing-agent-containing--.

Column 35

Line 23, "0.6 82 m" should read --0.6 $\mu$m--; and
Line 25, "being" should read --been--.

Column 37

Line 10, "weight" should read --weight.--.

Column 38

Line 21, "microscofe, and" should read --microscope, and--.

Column 42

Line 31, "recoring" should read --recording--.

UNITED STATES PATENT AND TRADEMARK OFFICE
CERTIFICATE OF CORRECTION

PATENT NO. : 5,447,767
DATED : September 5, 1995
INVENTOR(S) : TANABE ET AL.

It is certified that error appears in the above-indentified patent and that said Letters Patent is hereby corrected as shown below:

Column 43

Line 18, "recoring" should read --recording--;
Line 54, "1000Å:" should read --

1000Å:

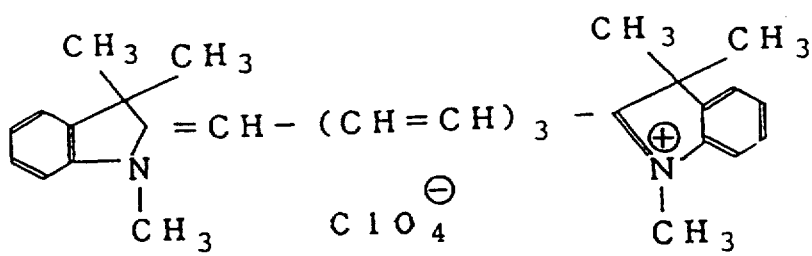

Column 45

Line 43, "refectivity" should read --reflectivity--.

Column 47

Line 67, "500%" should read --500 Å--.

UNITED STATES PATENT AND TRADEMARK OFFICE
CERTIFICATE OF CORRECTION

PATENT NO. : 5,447,767
DATED : September 5, 1995
INVENTOR(S) : TANABE ET AL.

It is certified that error appears in the above-indentified patent and that said Letters Patent is hereby corrected as shown below:

Column 48

Line 33, "on" should read --an--; and
Line 38, "an" should read --a--.

Column 49

Line 27, "laminatot" should read --laminator--.

Column 51

Line 1, "an" should read --a--.

Column 54

Line 33, "an" should read --a--.

Column 56

Line 39, "resulting" should read --results--.

Column 59

Line 42, "comprises" should read --comprise--.

Column 60

Line 15, "the" should be deleted.

UNITED STATES PATENT AND TRADEMARK OFFICE
CERTIFICATE OF CORRECTION

PATENT NO. : 5,447,767
DATED : September 5, 1995
INVENTOR(S) : Tanabe et al

It is certified that error appears in the above-indentified patent and that said Letters Patent is hereby corrected as shown below:

Column 61

Line 29, "comprising: a sub-" should read
--comprising: a sub- --.

Column 62

Line 41, "and" should read --said--.

Signed and Sealed this

Twenty-seventh Day of February, 1996

Attest:

BRUCE LEHMAN

Attesting Officer     Commissioner of Patents and Trademarks